US007925833B2

(12) United States Patent
Sato et al.

(10) Patent No.: US 7,925,833 B2
(45) Date of Patent: *Apr. 12, 2011

(54) APPARATUS, METHOD, COMPUTER PROGRAM AND MOBILE TERMINAL FOR PROCESSING INFORMATION

(75) Inventors: Shunta Sato, Tokyo (JP); Atsushi Imai, Tokyo (JP)

(73) Assignee: Sony Ericsson Mobile Communications Japan, Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/718,723

(22) Filed: Mar. 5, 2010

(65) Prior Publication Data
US 2010/0161903 A1 Jun. 24, 2010

Related U.S. Application Data

(63) Continuation of application No. 11/764,457, filed on Jun. 18, 2007, now Pat. No. 7,702,854.

(30) Foreign Application Priority Data

Jun. 19, 2006 (JP) ................ 2006-169066

(51) Int. Cl.
*G06F 13/00* (2006.01)
(52) U.S. Cl. ................ 711/118; 711/E12.057
(58) Field of Classification Search ................ None
See application file for complete search history.

(56) References Cited

U.S. PATENT DOCUMENTS

| 2002/0087403 A1* | 7/2002 | Meyers et al. ................ 705/14 |
| 2003/0163646 A1 | 8/2003 | O'Neil |
| 2004/0170386 A1* | 9/2004 | Mikawa ................ 386/69 |
| 2006/0095859 A1* | 5/2006 | Bocking et al. ................ 715/764 |
| 2006/0159109 A1* | 7/2006 | Lamkin et al. ................ 370/401 |
| 2006/0206582 A1* | 9/2006 | Finn ................ 709/217 |
| 2006/0288340 A1* | 12/2006 | Raz ................ 717/168 |
| 2009/0198907 A1* | 8/2009 | Speight et al. ................ 711/137 |

FOREIGN PATENT DOCUMENTS

| JP | 2003-37804 | 2/2003 |
| JP | 2004-118305 | 4/2004 |
| JP | 2004-288208 | 10/2004 |
| JP | 2005-18441 | 1/2005 |
| JP | 2005-20070 | 1/2005 |

* cited by examiner

*Primary Examiner* — Matt Kim
*Assistant Examiner* — Sean Rossiter
(74) *Attorney, Agent, or Firm* — Oblon, Spivak, McClelland, Maier & Neustadt, L.L.P.

(57) ABSTRACT

An apparatus for processing information, includes a memory storing a plurality of content items different in type and metadata containing time information of the content items, a cache processor for fetching from the memory the content item and the metadata of the content item to be displayed on a display and storing the fetched content item and the metadata thereof on a cache memory, a display controller for displaying on the display the metadata of the content items from the cache memory arranged in accordance with the time information and a selection operator selecting metadata corresponding to a content item desired to be processed, out of the metadata displayed, and a content processor for fetching from the cache memory a content item corresponding to the metadata selected by the selection operator by referencing the cache memory in response to the selected metadata, and for performing a process responsive to the fetched content item.

18 Claims, 31 Drawing Sheets

FIG. 3

| TYPE OF CONTENT | METADATA | COOPERATING APPLICATION PROGRAM |
|---|---|---|
| STILL IMAGE CONTENT | • PHOTOGRAPHING TIME/ STORAGE TIME<br>• THUMBNAIL IMAGE<br>• MANAGEMENT TITLE<br>• ICON FILE-TYPE (STILL IMAGE ICON)<br>• FILE SIZE ICON<br>• SOURCE ICON | CAMERA CONTROL PROGRAM (VIEWER FUNCTION) |
| RECEIVED E-MAIN CONTENT | • ICON FILE-TYPE (RECEIVED MAIL ICON)<br>• RECEPTION TIME<br>• FROM ICON<br>• TRANSMISSION SOURCE NAME / TRANSMISSION SOURCE ADDRESS<br>• ATTACHED DATA ICON<br>• SUBJECT ICON<br>• SUBJECT DATA<br>• TRANSMISSION SOURCE IMAGE | E-MAIL MANAGEMENT PROGRAM |
| TRANSMITTED E-MAIL CONTENT | • ICON FILE-TYPE (TRANSMITTED MAIL ICON)<br>• TRANSMISSION TIME<br>• TO ICON<br>• DESTINATION NAME / DESTINATION ADDRESS<br>• ATTACHED DATA ICON<br>• SUBJECT ICON<br>• SUBJECT DATA<br>• DESTINATION IMAGE<br>• ICON PLURAL-PERSON | E-MAIL MANAGEMENT PROGRAM |
| SCHEDULE CONTENT | • START TIME<br>• ICON FILE-TYPE (SCHEDULE ICON)<br>• TYPE ICON<br>• SCHEDULE SUMMARY/CONTENT<br>• ALARM ICON<br>• ALARM SETTING DATA<br>• HOLIDAY SETTING DATA | SCHEDULE MANAGEMENT PROGRAM |
| BIRTHDAY CONTENT | • BIRTHDAY DATE<br>• USER NAME<br>• ICON FILE-TYPE (BIRTHDAY ICON)<br>• FRAME IMAGE (OUTLINE IMAGE)<br>• THUMBNAIL IMAGE | APPLICATION PROGRAM FOR TELEPHONE BOOK OR APPLICATION PROGRAM FOR PERFORMING DISPLAY MANAGEMENT OF PERSONA INFORMATION OF CELLULAR PHONE |

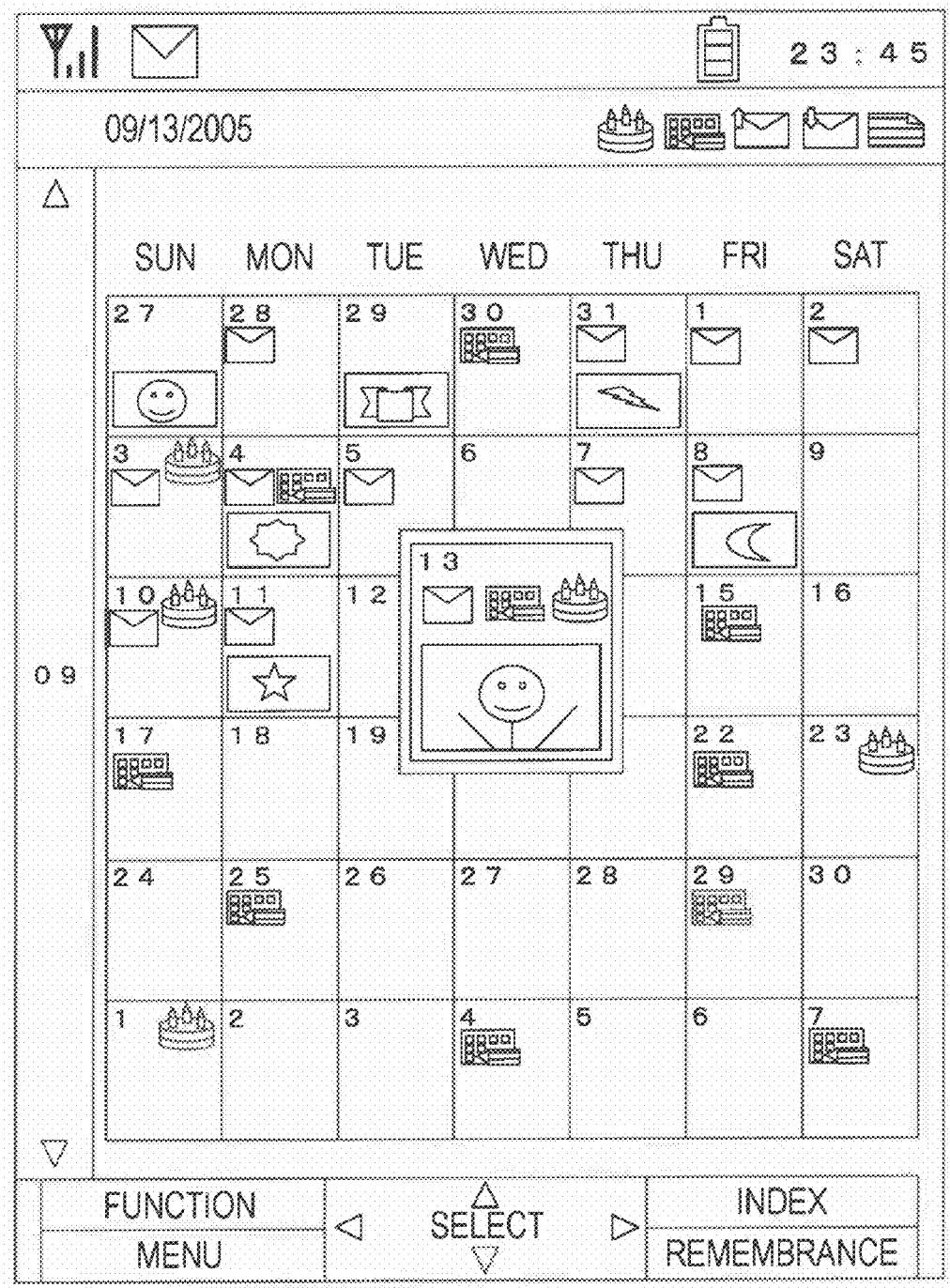

11

| ID | TIME | TITLE | TYPE | POINTER TO CONTENT |
|---|---|---|---|---|
| S-000 | 10/26/2005 21:00 | aaa | STILL IMAGE CONTENT | C:/aaa/ |
| S-001 | 10/27/2005 12:35 | eee | STILL IMAGE CONTENT | C:/eee/ |
| S-002 | 10/29/2005 15:22 | ggg | STILL IMAGE CONTENT | C:/ggg/ |
| S-003 | 11/01/2005 16:00 | 555 | STILL IMAGE CONTENT | C:/555/ |
| S-004 | 11/03/2005 11:15 | 156 | STILL IMAGE CONTENT | C:/156/ |
| S-005 | 11/03/2005 11:30 | f28 | STILL IMAGE CONTENT | C:/f28/ |
| S-006 | 11/03/2005 12:05 | g89 | STILL IMAGE CONTENT | C:/g89/ |
| S-007 | 11/05/2005 16:00 | 234 | STILL IMAGE CONTENT | C:/234/ |

STILL IMAGE CONTENT

13

| ID | TIME | TITLE | TYPE | POINTER TO CONTENT |
|---|---|---|---|---|
| S-000 | 10/26/2005 21:00 | aaa | STILL IMAGE CONTENT | D:/aaa/ |
| JD-003 | 10/26/2005 23:00 | 000 | RECEIVED E-MAIL CONTENT | D:/000/ |
| SD-005 | 10/27/2005 08:19 | a12 | TRANSMITTED E-MAIL CONTENT | D:/a12/ |
| JD-004 | 10/27/2005 08:30 | 050 | RECEIVED E-MAIL CONTENT | D:/050/ |
| S-001 | 10/27/2005 12:35 | eee | STILL IMAGE CONTENT | D:/eee/ |
| T-005 | 10/28/2005 | f13 | BIRTHDAY CONTENT | D:/f13/ |
| S-002 | 10/29/2005 15:22 | ggg | STILL IMAGE CONTENT | D:/ggg/ |

CACHE CONTENT

FIG. 30A

| ID | TIME | TITLE | TYPE | POINTER TO CACHE CONTENT |
|---|---|---|---|---|
| S-000 | 10/26/2005 21:00 | aaa | STILL IMAGE CONTENT | D:/aaa/ |
| JD-003 | 10/26/2005 23:00 | 000 | RECEIVED E-MAIL CONTENT | D:/000/ |
| SD-005 | 10/27/2005 08:19 | a12 | TRANSMITTED E-MAIL CONTENT | D:/a12/ |
| JD-004 | 10/27/2005 08:30 | 050 | RECEIVED E-MAIL CONTENT | D:/050/ |
| S-001 | 10/27/2005 12:35 | eee | STILL IMAGE CONTENT | D:/eee/ |
| SD-006 | 10/28/2005 | f13 | BIRTHDAY CONTENT | D:/f13/ |
| S-002 | 10/29/2005 15:22 | ggg | STILL IMAGE CONTENT | D:/ggg/ |

FIG. 30B

| ID | TIME | TITLE | TYPE | POINTER TO CONTENT | |
|---|---|---|---|---|---|
| S-001 | 10/27/2005 21:00 | eee | STILL IMAGE CONTENT | D:/eee/ | |
| T-005 | 10/28/2005 | f13 | BIRTHDAY CONTENT | D:/f13/ | |
| S-002 | 10/29/2005 15:22 | ggg | STILL IMAGE CONTENT | D:/ggg/ | |
| S-003 | 11/01/2005 16:00 | 555 | STILL IMAGE CONTENT | D:/555/ | |
| S-004 | 11/03/2005 11:15 | 156 | STILL IMAGE CONTENT | D:/156/ | NEWLY FETCHED FROM CONTENT TABLE OF MEMORY 11 |
| S-005 | 11/03/2005 11:30 | f28 | STILL IMAGE CONTENT | D:/f28/ | |
| S-006 | 11/03/2005 12:05 | g89 | STILL IMAGE CONTENT | D:/g89/ | |

APPARATUS, METHOD, COMPUTER PROGRAM AND MOBILE TERMINAL FOR PROCESSING INFORMATION

CROSS REFERENCES TO RELATED APPLICATIONS

This application is a continuation of and is based upon and claims the benefit of priority under 35 U.S.C. §120 for U.S. Ser. No. 11/764,457, filed Jun. 18, 2007, and claims the benefit of priority under 35 U.S.C. §119 from Japanese Patent Application JP2006-169066, filed Jun. 19, 2006 the entire contents of each which are incorporated herein by reference.

BACKGROUND OF THE INVENTION

1. Field of the Invention

The present invention relates to an apparatus, method, computer program and mobile terminal for processing information appropriately for use as mobile devices such as a cellular phone, a personal handyphone system (PHS) phone, a personal digital assistant (PDA), or a notebook personal computer.

2. Description of the Related Art

Basic data processing functions of computer systems include fetching (data acquisition), decoding (analysis), and execution. With today's advanced central processing units (CPUs), decoding and execution are performed at a high speed. But the fetching process still remains to be a factor delaying data processing at any layer of the computer system. More specifically, the factors affecting the data processing speed include a delay in data fetching between the CPU and memory (von Neumann bottleneck), a delay in data fetching between a personal computer and an external storage, a delay in data fetching between a server and a client terminal, etc.

A reduction in the data processing speed is improved by pre-fetching data expected to be processed later onto a cache memory in accordance with a predetermined algorithm. The cache memory typically permits high-speed accessing. The data typically has temporal locality and spatial locality. Whenever data is used, the same data is mostly likely to be used again in the near future (temporal locality). Whenever data at an address is to be processed, data to be processed next is mostly likely present at an address in the vicinity of the first address (spatial locality).

To process data in accordance with an algorithm based on the temporal locality, the CPU stores the processed data onto a cache memory, and reads the data from the cache memory for processing when the processing of the same data is requested next time. High speed processing is achieved in this way.

To process data in accordance with an algorithm based on the spatial locality, the CPU stores, on the cache memory, together with the data to be currently processed, data at a nearby address highly likely to be processed next. The CPU is thus prepared for a next data processing request.

As related cache memory techniques, Japanese Unexamined Patent Application Publication No. 2004-118305 discloses a cache memory controller and Japanese Unexamined Patent Application Publication No. 2005-018441 discloses a memory device.

SUMMARY OF THE INVENTION

A plurality of content items different in type is grouped into content groups falling within the same time range according to time information contained in each content item. If cache processing is performed based on the time locality or the spatial locality in response to a request to process a content item, mishit is likely to occur.

Repeated request to process the same content is relatively low. For example, repeated viewing of the same still image content is less likely. The probability of mishit increases if the cache process is performed based on the above-described time locality.

The content items might be grouped into content groups falling within the same time range. A content item to be processed next is likely to be the one falling within the same time range. If the cache process is performed based on the spatial locality, a content item at an address close to the content item previously processed is cache processed. The content item at the close address is less likely to fall within the same time range of the processed content item. The probability of mishit becomes high if the cache process is performed based on the spatial locality.

It is thus desirable to provide an information processing apparatus, an information processing method, an information processing program, and a mobile terminal for performing high-speed content processing by grouping a plurality of content items different in type into content groups falling within the same time range based time information of each content item, and by performing a cache process on a content item desired to be processed.

In accordance with one embodiment of the present invention, an apparatus for processing information includes a memory storing a plurality of content items different in type and metadata containing time information of the content items, a cache processor for fetching from the memory the content item and the metadata of the content item to be displayed on a display and storing the fetched content item and the metadata thereof on a cache memory, a display controller for displaying on the display the metadata of the content items from the cache memory arranged in accordance with the time information and a selection operator selecting metadata corresponding to a content item desired to be processed, out of the metadata displayed, and a content processor for fetching from the cache memory a content item corresponding to the metadata selected by the selection operator by referencing the cache memory in response to the selected metadata when the selection operator selects the metadata, and for performing a process responsive to the fetched content item.

In accordance with one embodiment of the present invention, a method of processing information, includes steps of fetching a content item and metadata of the content item to be displayed on a display from a memory storing a plurality of content items different in type and metadata containing time information of the content items, storing the fetched content item and the metadata thereof on a cache memory, fetching the metadata of each content item from the cache memory, displaying on the display the metadata of the content items from the cache memory arranged in accordance with the time information and a selection operator selecting metadata corresponding to a content item desired to be processed, out of the metadata displayed, fetching from the cache memory a content item corresponding to the metadata selected by the selection operator by referencing the cache memory in response to the selected metadata when the selection operator selects the metadata, and performing a process responsive to the fetched content item.

In accordance with one embodiment of the present invention, a computer program for causing a computer to process information, includes steps of fetching a content item and metadata of the content item to be displayed on a display from a memory storing a plurality of content items different in type and metadata containing time information of the content items, storing the fetched content item and the metadata thereof on a cache memory, fetching the metadata of each content item from the cache memory, displaying on the display the metadata of the content items from the cache memory arranged in accordance with the time information and a selection operator selecting metadata corresponding to a content item desired to be processed, out of the metadata displayed, fetching from the cache memory a content item corresponding to the metadata selected by the selection operator by referencing the cache memory in response to the selected metadata when the selection operator selects the metadata, and performing a process responsive to the fetched content item.

In accordance with one embodiment of the present invention, a mobile terminal includes a memory for storing a plurality of content items different in type and metadata containing time information of the content items, a cache memory for storing a content item and metadata of the content item to be displayed on a display, a cache processor for fetching from the memory the content item and the metadata of the content item to be displayed on the display and storing the fetched content item and the fetched metadata thereof on the cache memory, a display controller for displaying on the display the metadata of the content items from the cache memory arranged in accordance with the time information and a selection operator selecting metadata corresponding to a content item desired to be processed, out of the metadata displayed, an operation unit for shifting the selection operator, and a content processor for fetching from the cache memory a content item corresponding to the metadata selected by the selection operator by referencing the cache memory in response to the selected metadata when the selection operator shifted by the operation unit selects the metadata, and for performing a process responsive to the fetched content item.

If the metadata of the content items is displayed in accordance with the time information of the content items, a content item to be selected subsequent to the selection of a first content item is likely to be the one close in time period to the first content item. In accordance with embodiments of the present invention, a cache process is performed on the selected content item while the cache process is also performed on content items having time information prior to and subsequent to time indicated by the time information of the first content item. The content is thus processed at high speed with a cache hit rate increased.

In accordance with embodiments of the present invention, a plurality of content items different in type are grouped into content groups falling within the same time range based on the time information of the content items, and a content desired is thus processed. An optimum cache process is thus performed, permitting the content items to be processed at a high speed.

BRIEF DESCRIPTION OF THE DRAWINGS

FIG. 3 illustrates a variety of content items handled by a life time calendar function arranged in the cellular phone in accordance with one embodiment of the present invention;

FIG. 5 illustrates a display example of a calendar-format life time calendar of the cellular phone in accordance with one embodiment of the present invention;

FIGS. 30A and 30B illustrate an update process of the cache table arranged in the cache memory of the cellular phone in accordance with one embodiment of the present invention.

DESCRIPTION OF THE PREFERRED EMBODIMENTS

The present invention is applicable to a cellular phone.

Figure 1:
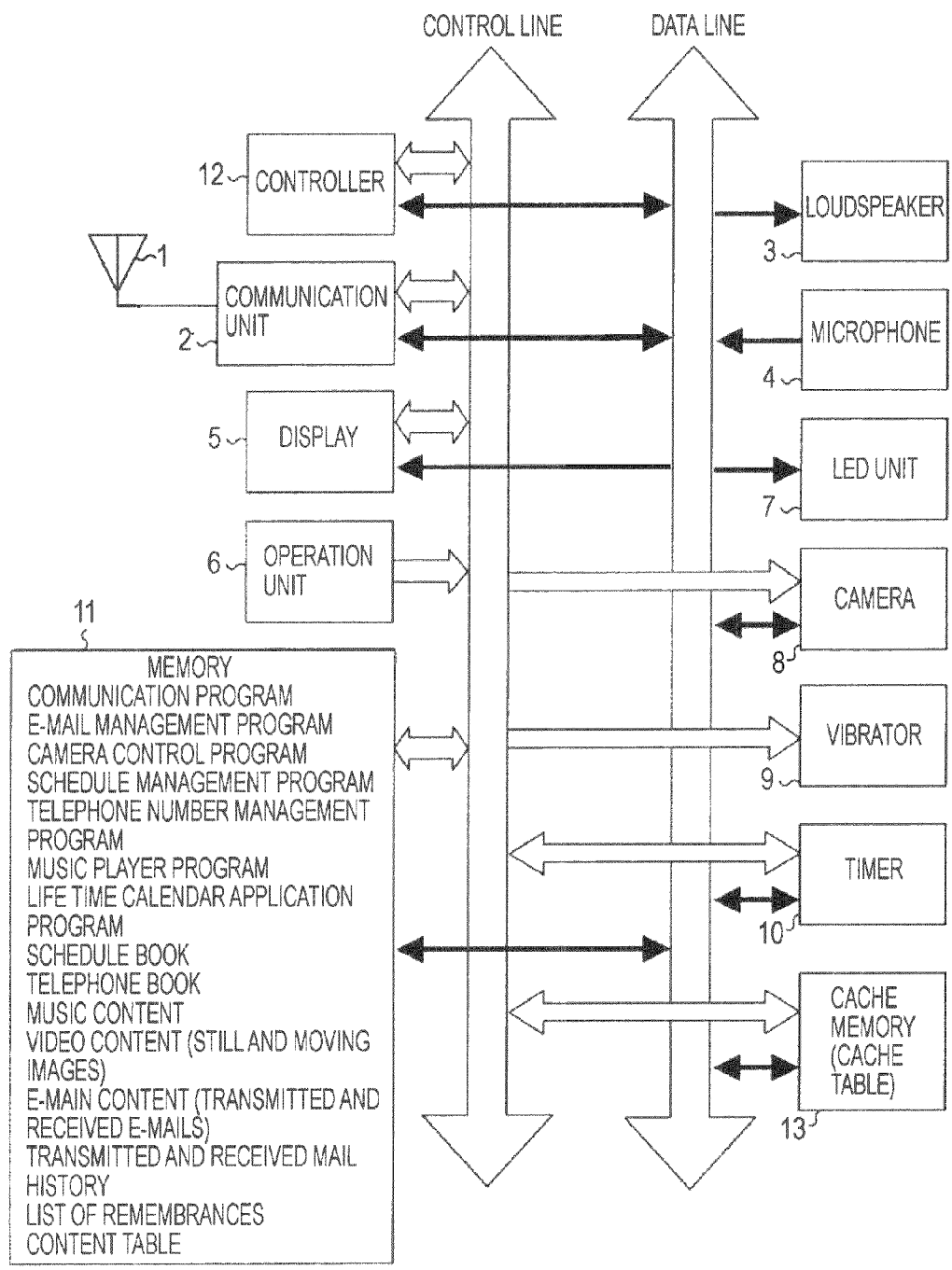
FIG. 1 is a block diagram of a cellular phone in accordance with one embodiment of the present invention.

As shown in FIG. 1, a cellular phone 1 as one embodiment of the present invention includes an antenna 1 and a communication unit 2 for performing wireless communication with a base station, a loudspeaker 3 for outputting an audio sound such as a ring alert or a receiver sound, a microphone 4 for picking up a transmission sound, and a display 5 for displaying images (still and moving images), characters, and a "life time calendar" to be discussed later.

The cellular phone includes an operation unit 6 for inputting characters and selecting an item in a menu, a light-emitting diode (LED) unit 7 for alerting a user to the arrival of a message by light, a camera 8 for photographing a still image or a moving image of a desired subject, and a vibrator 9 for alerting the user to the arrival of a message by vibrating the body of the cellular phone.

The cellular phone further includes a timer 10 for measuring the present time, a memory 11 for storing a communication program for wireless communication via a base station and a variety of application programs, and a variety of data (content items) handled by these application programs, a controller 12 for controlling the entire cellular phone, and a cache memory 13 for storing a content item to be processed.

The memory 11 stores an e-mail management program for controlling production, transmission and reception of an e-mail, a camera control program for controlling the photographing operation of the camera 8, and providing a viewer function for viewing a moving image and a still image received via a network or an input terminal, a schedule management program for managing a schedule book having a user schedule registered therein, a telephone management program for managing a telephone book, and a music player program for reproducing a music content item.

The memory 11 stores a life time application program. The life time application program, functioning as a so-called launcher software program, causes a "life time calendar" to be displayed on the display 5, and selects an application program from among the variety of application programs for signal processing designated based on the "life time calendar" and initiates the selected application program.

The memory 11 stores a schedule book registering a user's desired schedule (schedule content item), a telephone book registering a still image of the user's acquaintance or friend, a friend's telephone number, a friends e-mail address, and a friend's birthday, music content to be reproduced in accordance with the music player program, still image content and moving image content to be reproduced in accordance with the viewer function of the camera control program, e-mail content transmitted or received, telephone and e-mail transmission and reception history, a remembrance list as a history of a "remembrance popup displays" to be discussed later, etc.

Each of the schedule content, the music content, the still image content, the moving image content, the transmitted e-mail content, and the received e-mail content contains time information as one unit of metadata to be discussed later. The memory 11 contains a content table of each content item, for example, a content table for the schedule content, a content table for the music content, a content table for the still image content, a content table for the moving image content, a content table for the transmitted e-mail content, and a content table for received e-mail content. As will be described in detail later, each content table lists metadata of the content items arranged in accordance with time information of the content items (see FIG. 28).

The cache memory 13 stores a cache table. The cache table is produced by selecting the metadata of the content falling within a predetermined time range from the content table. The cache memory 13 also stores each content item corresponding to the metadata stored in the cache table (see FIG. 29). Displaying of each content item falling within a predetermined time range is performed at a high speed as described in detail later.

Figure 2A:
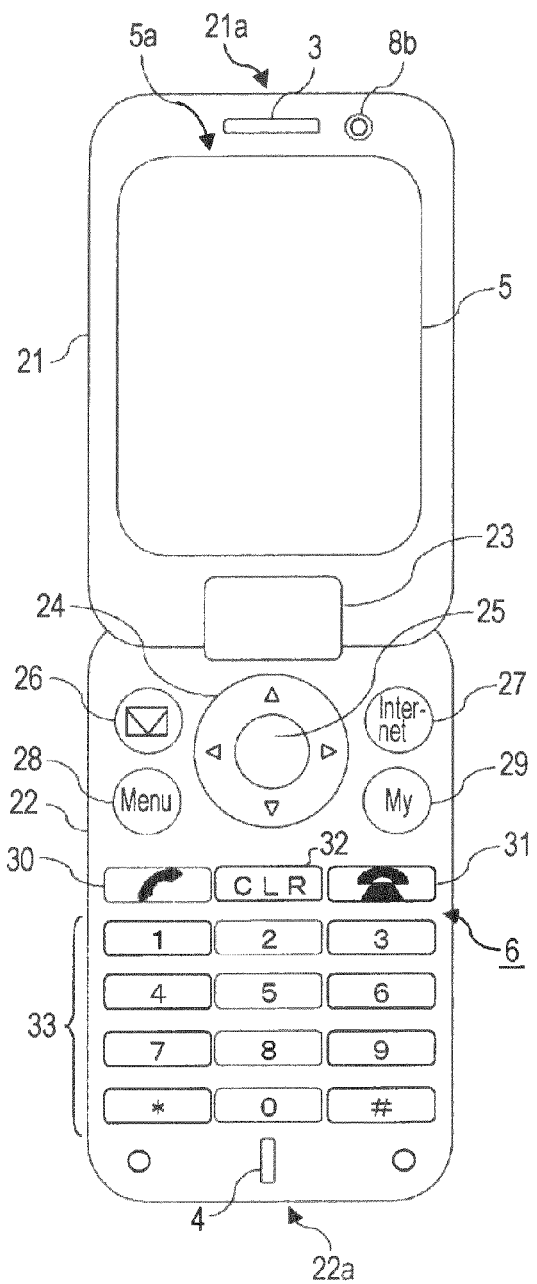
FIGS. 2A and 2B are external views of the cellular phone in accordance with one embodiment of the present invention.
Figure 2B:
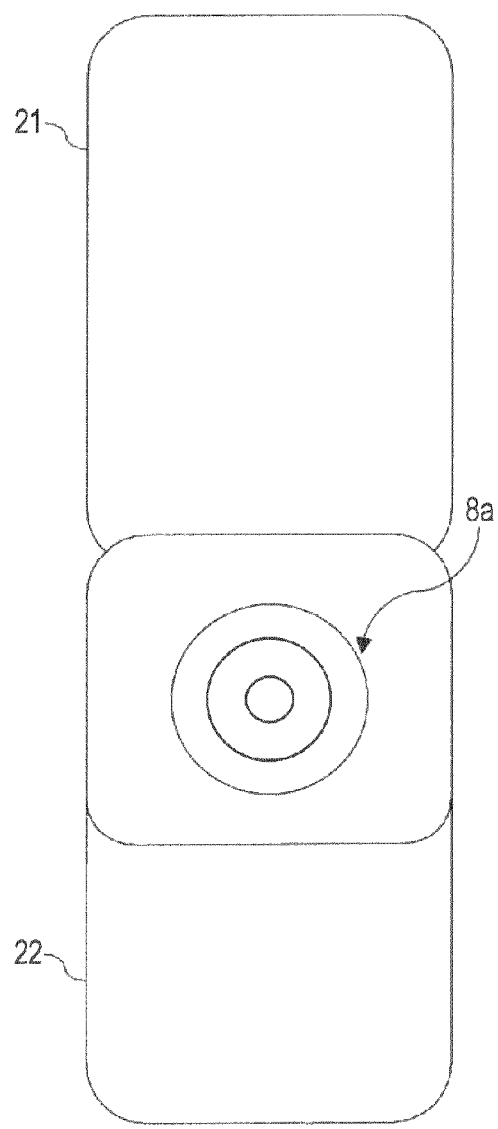

The cellular phone of this embodiment is a flip phone type. As shown in FIGS. 2A and 2B, an upper body 21 and lower body 22 are flipped open from each other and closed to each other about a hinge 23. FIG. 2A illustrates inner surfaces of the cellular phone (the surfaces meeting face to face in the closed state of the cellular phone). FIG. 2B illustrates external surfaces of the cellular phone in the open state thereof.

As shown in FIG. 2A, the cellular phone includes the display 5 in the upper body 21 thereof. The cellular phone further includes the loudspeaker 3 and a second camera (in-camera) 8b between a top edge 21a of the upper body 21 and a top edge 5a of the display 5. The cellular phone also includes the operation unit 6 in the lower body 21, and the microphone 4 between the operation unit 6 and a bottom edge 22a of the lower body 22.

The operation unit 6 includes a cross key 24 designed to be pressed on each of upper, lower, left and right portions thereof, and an entry key 25 arranged in the center of the cross key 24. The operation unit 6 includes a first soft key 26 typically designed to be pressed to start the e-mail management program, and a second soft key 27 typically designed to be pressed to issue a network connection command to the Internet, for example. The operation unit 6 further includes a third soft key 28 typically designed to be pressed to issue a main menu display command, and a fourth soft key 29 that is typically assigned a desired command.

The operation unit 6 further includes an off-hook key 30 typically designed to be pressed to transmit or receive a telephone call, an on-hook key 31 typically designed to be pressed to switch on main power, switch off main power, or end a telephone conversation, a clear key 32 typically designed to be pressed to delete an input character or to correct an already input operation command, and 12 character keys 33 that are assigned numbers 0 through 9, alphabets, a star sign (*), a pound sign (#), etc.

As shown in FIG. 2B, the cellular phone includes a first camera 8a (main camera) on the back of the lower body 22 (on the surface opposed to the operation unit 6). The cellular phone thus includes two cameras, namely, the main camera 8a and the in-camera 8b. The main camera 8a is typically used to photograph another user or a scene. The in-camera 8b is typically used to photograph the face of the user of the cellular phone in videophone. In the videophone, telephone conversation is going on with video and voice exchanged.

The cellular phone of one embodiment of the present invention has a function of displaying a "life time calendar" (life time calendar display function) that lists content items in a time-series fashion. In the life time calendar function, the cellular phone handles collectively video content (including a still image and a moving image), the e-mail content, the schedule content, and the telephone book content. These content items are usually separately handled by the dedicated application programs thereof.

The life time calendar is displayed when the controller 12 operates in accordance with a life time application program stored on the memory 11. The life time application program is a content launcher software program cooperating with the application programs of the content items. More specifically, when a list of content items displayed on the life time calendar is edited, a dedicated application program corresponding to a content item to be edited is initiated.

The user can select any content item displayed on the life time calendar using a "display setting function," and a "filter setting function" to be discussed later.

The life time calendar application program has a "rating function" to select randomly a typical content item from a plurality of content items using a random number. For example, a large number of still image content items to be displayed is present, and cannot be displayed at a time on the life time calendar. Using the rating function of the life time calendar application program, the controller 12 selects a representing still image content item, and displays the selected still image content item on the life time calendar.

When all content items cannot be displayed on the life time calendar at a time, the typical content to be displayed is updated at a predetermined timing based on the rating function. A content item other than the already displayed content item is selected and displayed as a representing content.

The cellular phone of one embodiment of the present invention focuses on the life time calendar in response to an operation of the operation unit 6 in order to operate the life time calendar. The verbs "focuses on" means displaying an outline surrounding a selected menu or a selected content item or an entire area of the selected menu or the selected content item in a brightness or a color different from the unselected menus or unselected content items.

Focusing on a selected menu or a content item helps the user to recognize easily the selected menu or the selected content item. Alternatively, a cursor may be used to help the user to recognize the selected menu or the selected content item.

When the operation unit 6 focuses on any date on the life time calendar, a content item corresponding to a date before the in-focus date (a date one year before the in-focus date or a date one month before the in-focus date) is displayed in a popup window partially superimposed on the life time calendar (remembrance popup function).

FIG. 3 illustrates content types and metadata of each content item handled by the life time calendar application program.

As shown in FIG. 3, the life time calendar application program handles "still image content," "received e-mail content," "transmitted e-mail content," "schedule content," and "birthday content" registered in the telephone book.

As the content items to be handled by the life time calendar application program, FIG. 3 lists the still image content, the transmitted and received e-mail content, the schedule content, and the birthday content registered in the telephone book. The life time calendar application program further handles moving image content, music content, etc.

Handled as the still image content on the life time calendar are photographing time/storage time data, a thumbnail image, a management title, a file-type icon (still image icon), a file size icon, and a source icon.

The controller 12 retrieves time information measured by the timer 10 and attaches the time information to the still image as the photographing time data when the still image photographed by the camera 8 is stored on the memory 11.

Some of still images downloaded from a predetermined web site may not have the photographing time data attached thereto. In such a case, the controller 12 retrieves time information (storage time) from the timer 10 and attaches the time information to the downloaded still image when the still image content is stored on the memory 11. The "photographing time/storage time" of FIG. 3 mean such times.

The thumbnail image is produced on a real time basis from the original still image content stored on the memory 11 when the thumbnail image is displayed on the life time calendar. The thumbnail image has a size of 120 pixels by 160 pixels, for example. When a thumbnail image of the moving image content is displayed on the life time calendar, the controller 12 produces a thumbnail image of a size of 120 pixels by 160 pixels from a first frame of the moving image content and displays the thumbnail image on the life time calendar on a real time basis.

The management title indicates a title name of the still image content. When the still image photographed by the camera 8 is stored on the memory 11, the controller 12 automatically attaches to the still image content the photographing date and the photographing time corresponding to current time information retrieved from the timer 10 as the management title. More specifically, the photographing date and the photographing time are automatically attached to the still image content as the management title at first.

The management title can be edited subsequent to the storage of the still image content on the memory 11. To edit the management title, the user displays an editing screen of the management title at a predetermined timing, and inputs a desired management title by operating the operation unit 6. The controller 12 causes the management title input by the user to overwrite the photographing date and the photographing time automatically attached to the still image content. In this way, the management title of the still image content is modified to a management title desired by the user.

From among still image content items downloaded from a predetermined web site, some still image content items may have a management title attached thereto. The controller 12 leaves the already attached management title intact. If a still image content item has no management title, the controller 12 automatically attaches to that still image content item the date and time of downloading as the management title. The automatically attached management title may be modified to any management title on the editing screen of the management title by the user.

The life time calendar function can handle a variety of video formats including Joint Photographic Experts Group (JPEG), Graphic Interface Format (GIF) including animation GIF, Shockwave Flash® (SWF), and stamp and frame (IFM).

The file-type icon (still image icon) indicates a still image content item in any of the above-described video formats. The file size icon indicates a file size of the still image content.

The source icon indicates a source of the still image content. In the case of the still image content photographed by the camera 8, an icon indicating that the camera 8 is the source is displayed on the life time calendar. In the case of the still image content downloaded from the predetermined web site, an icon indicating that the predetermined web site is the source is displayed on the life time calendar.

When the displaying of the still image content is requested on the life time calendar, the controller 12 displays the requested still image content based on the viewer function of the camera control program stored on the memory 11.

Handled as the "received e-mail content" on the life time calendar function are reception time data, an file-type icon (received main icon), a from icon, a transmission source name/transmission source address, an attached data icon, a transmission source image, a subject icon, and subject data.

The reception time data indicates reception time of a received mail. The controller 12 retrieves the time information from the timer 10 at the moment of the reception of the e-mail, and stores on the memory 11 the received e-mail with the retrieved time information attached thereto. The controller 12 displays the time information attached to the e-mail as the reception time data on the life time calendar.

The file-type icon (received mail icon) indicates that an received e-mail content item is present. The icon is typically represented by an image of a sealed cover with a downward looking arrow thereon. The downward looking arrow means reception.

The from icon indicates a display window of a transmission source name, and has a label "From" thereon.

The transmission source image is an image of each user registered in the telephone book. In other words, the telephone book stored on the memory 11 contains a registration box of the image of the user. The user of the cellular phone typically registers an image of each user photographed by the camera 8 in the registration box of the telephone book. The controller 12 searches the telephone book in accordance with an e-mail address attached to the received e-mail content, thereby detecting the photographed image of the user serving as a transmission source of the received e-mail content and displaying the image on the life time calendar. If the image size registered in the telephone book is different from a display size on the life time calendar, the controller 12 expands or contracts the image registered in the telephone book to an image having a size of 120 pixels by 160 pixels, and then displays the expanded or contracted image on the life time calendar.

The transmission source name/address indicates a transmission source of the received e-mail. The controller 12 displays one of the transmission source image, the transmission source name and the transmission source address as data indicating the transmission source of the received e-mail on the life time calendar.

The controller 12 displays on the life time calendar the transmission source image, the transmission source name and the transmission source address in that priority order. If the transmission source image, the transmission source name and the transmission source address of the received e-mail are registered in the telephone book, the controller 12 displays the transmission source image on the life time calendar. If the telephone book registers the transmission source name and the transmission source address with the transmission source image of the received e-mail left unregistered, the controller 12 causes the transmission source name to be displayed on the life time calendar. If only the transmission source address is registered or unregistered in the telephone book with both the transmission source image and the transmission source name of the received e-mail left unregistered, the controller 12 causes the transmission source address to be displayed on the life time calendar.

The attached data icon is displayed on the life time calendar by the controller 12 when data, such as video data or music data, is attached to the received e-mail. For example, the controller 12 indicates to the user the presence of the attached data by displaying an icon of an image of a clip on the life time calendar.

The subject icon indicates a display window of a subject title (name) of the received e-mail content. The subject data is a title (name) attached to the received e-mail content. The controller 12 displays the subject data attached to the received e-mail next to the subject icon on the life time calendar.

When the displaying of the received e-mail content on the life time calendar is requested, the controller 12 starts the e-mail management program stored on the memory 11, thereby displaying a text of the e-mail requested.

If the displaying of the data attached to the received e-mail content on the life time calendar is requested, the controller 12 starts an application program corresponding to the attached data to display the requested attached data. For example, a still image may be attached, and the displaying of the attached data on the life time calendar may be requested. Using the viewer function of the camera control program stored on the memory 11, the controller 12 displays the still image as the attached data. The attached data may be a music content item, and the displaying of the attached data on the life time calendar may be requested. The controller 12 reproduces the music content as the attached data in accordance with the music player program stored on the memory 11.

Handled as the "transmitted e-mail content" on the life time calendar are metadata including transmission time data, an file-type icon (transmitted mail icon), a to icon, destination name/address, an plural-person icon, an attached data icon, a subject icon, and subject data.

The transmission time data indicates transmission time of an e-mail. The controller 12 retrieves time information from the timer 10 at the timing of transmission of the e-mail and stores the transmitted e-mail with the retrieved time information attached thereto on the memory 11. The controller 12 displays the time information attached to the e-mail on the life time calendar as the transmission time data.

The file-type icon (transmitted mail icon) indicates whether the transmitted e-mail content is present. For example, the file-type icon is typically represented by an image of a sealed cover with an upward looking arrow thereon. The upward looking arrow means transmission.

The to icon indicates a display box of a user name (address name) of a partner to whom the e-mail has been sent, and has a label "To."

The destination image is an image of each user registered in the telephone book. The image of each user registered in the telephone book is handled as the "transmission source image" and the "destination image" on the life time calendar. If a size of the image registered in the telephone book is different from a display size of the image handled on the life time calendar, the controller 12 expands or contracts the image registered in the telephone book and then displays the expanded image or the contracted image on the life time calendar as previously discussed.

The destination name/address indicates a destination of the transmitted e-mail. The controller 12 displays one of the destination image, the destination name and the destination address as the data indicating the destination of the transmitted e-mail on the life time calendar.

The controller 12 displays the destination image, the destination name and the destination address in that priority order on the life time calendar. If the destination image, the destination name and the destination address of the transmitted e-mail are registered in the telephone book, the controller 12 displays the destination image. If the destination name and the destination address are registered in the telephone book with the destination image of the transmitted e-mail left unregistered, the controller 12 displays the destination name on the life time calendar. If the destination address is registered or unregistered in the telephone book with both the destination image and the destination name of the transmitted e-mail left unregistered, the controller 12 displays the destination address on the life time calendar.

The plural-person icon appears when an e-mail is simultaneously transmitted to a plurality of users. For example, the plural-person icon may be an icon of three persons to help the user to recognize intuitively that the e-mail has been transmitted to a plurality of persons.

The plural-person icon appears in response to the transmitted e-mail content that has been transmitted to the plurality of users. If a received e-mail is the one transmitted to a plurality of users, a plural-person icon may also appear to indicate that that received e-mail has been simultaneously transmitted to the plurality of users.

The attached data icon appears when data is attached to the transmitted e-mail. As described above, the attached data icon is an image of a clip.

The subject icon is a display box of the title (subject name) attached to the transmitted e-mail content. The subject data is the title attached to the transmitted e-mail content. The controller 12 displays the subject data attached to the transmitted e-mail next to the subject icon on the life time calendar.

If the displaying of the transmitted e-mail content on the life time calendar is requested, the controller 12 starts the e-mail management program stored on the memory 11, thereby displaying a text of the requested e-mail.

When the displaying of the data attached to the transmitted e-mail content on the life time calendar is requested, the controller 12 starts an application program for the attached data, and displays the requested attached data. For example, a still image may be attached, and the displaying of the attached data on the life time calendar may be requested. Using the viewer function of the camera control program stored on the memory 11, the controller 12 displays the still image as the attached data. The attached data may be a music content item, and the displaying of the attached data on the life time calendar may be requested. The controller 12 reproduces the music content as the attached data in accordance with the music player program stored on the memory 11.

Handled as the "schedule content" on the life time calendar is metadata including start time data of a schedule, a file-type icon (schedule icon), a type icon, schedule summary/content data, an alarm icon, alarm on/off setting data, and holiday setting data.

The start time data of the schedule indicates start time of the schedule registered in the schedule book. To display the schedule on the life time calendar, the controller 12 searches for the start time of the schedule registered in the schedule book, and displays the start time on the life time calendar.

The file-type icon (schedule icon) indicates the presence of the schedule. For example, the schedule icon is an image in the motif of a calendar and a pencil displayed on the life time calendar.

The type icon indicates a type of the schedule registered. To register the schedule in the schedule book, the user selects one from among type icons shown in a list corresponding to the registered schedule. The controller 12 displays the type icon, selected during the registration of the schedule, together with the start time of the schedule on the life time calendar.

The schedule summary/content data is input in an item of the schedule title when the user registers the schedule. The controller 12 displays the input date in the item of the title on the life time calendar as a summary of the schedule.

If no data is input in the item of the schedule, the controller 12 displays, on the life time calendar, leading ten characters of a character string input in an item of the content of the schedule. The "schedule summary/content" of FIG. 3 means this input data.

The alarm icon is an image in the motif of a bell. The alarm on/off setting data indicates whether an alarm is set on the schedule. When an alarm is set on the schedule, the controller 12 displays a label "ON" next to the alarm icon of the image of the bell. When no alarm is set on the schedule, the controller 12 displays a label "OFF" next to the alarm icon of the image of the bell.

The holiday setting data indicates a holiday specified by the user in the schedule book. For example, if the user personally takes a day off on a business day, that day may be registered as a personal holiday in the schedule book. The controller 12 determines from the schedule book whether any holiday is set on the days displayed on the life time calendar. If a holiday is set on the displayed days, a display manner may be changed, for example, a date box may be changed in color on the life time calendar.

If the displaying of the schedule on the life time calendar is requested, the controller 12 starts the schedule management program stored on the memory 11 to display the content of the requested schedule.

When the schedule is registered in the schedule book, a venue where the schedule is expected to be performed, for example, a "company," a "school" or a "home" may be input. In such a case, the controller 12 reads from the schedule book the venue where the schedule is expected to be performed, and displays the venue on the life time calendar.

Handled as the "birthday content" on the life time calendar is metadata including birthday data, a user name, a file-type icon (birthday icon), a frame image (outline image), and a thumbnail image.

In the cellular phone of one embodiment of the present invention, the telephone book includes registration boxes accommodating the still image of the user, the frame image (outline image) and the birthday of the user, in addition to the user name, the telephone number and the e-mail address of the user.

Besides the telephone book, the cellular phone also has personal information registration boxes accommodating the still image, the frame image (outline image), the address, the e-mail address, the cellular phone number, and the birthday of the user of the cellular phone.

Based on a variety of information registered in the telephone book and the personal information registration box, the controller 12 may display a variety of information in the display box dated with the birthday of the user registered in the telephone book and in the display box dated with the birthday of a holder of a cellular phone registered in the personal information registration box. The variety of information to be displayed may contain a birthday icon associated with an image of a cake, a frame image serving as an outline of an image of flowers (including a frame image selected by the user as the holder of the cellular phone), a still image of the face of the user reaching his birthday, a still image of the face of the holder of the cellular phone, a user name reaching the birthday, or a user name as the holder of the cellular phone.

When the "birthday content" is selected on the life time calendar, the controller 12 starts the application program of the telephone book to control the displaying of the personal information registration box of the user responsive to the "birthday content" or starts the application program for displaying the personal information of the holder of the cellular phone to control the displaying of the personal information registration box of the holder of the cellular phone responsive to the "birthday content."

Whether to display a variety of content items on the life time calendar and time to display the content items are set on a setting screen of the life time calendar. For setting on the life time calendar, a general setting menu is displayed on the display 5. The user operates the operation unit 6 to select a setting menu of the life time calendar from the general setting menu. When the operation unit 6 is operated, the controller 12 displays a life time calendar (LTC setting screen) of FIG. 4A on the display 5.

The LTC setting screen includes a "display setting" menu, a "filter setting" menu, and a "remembrance display time" menu. In response to the cross key 24 of FIG. 2 operated by the user, the controller 12 shifts a focusing area among the display setting menu, the filter setting menu, and the remembrance display time menu.

Figure 4A:
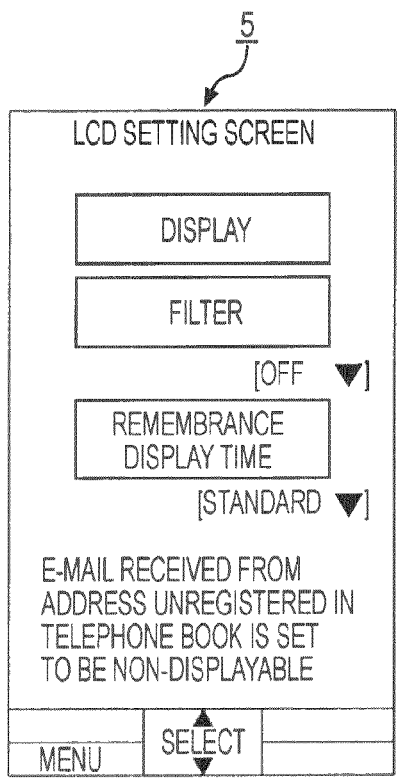
FIGS. 4A and 4B illustrate a variety of setting screens in the life time calendar function of the cellular phone in accordance with one embodiment of the present invention.

When the controller 12 focuses on any of the setting menus, a description text of the in-focus setting menu is provided. More specifically, as shown in FIG. 4A, the controller 12 focuses on the "filter setting" menu. The controller 12 displays in the margin of the display 5 the description text for the filter setting menu reading "E-mail received from address unregistered in telephone book is set to be non-displayable." The description text to each in-focus setting menu is thus provided so that the user may recognize the content of the in-focus setting menu. The user can thus easily select a setting menu desired.

The user can shift the focusing area to any desired setting menu from among the display setting menu, the filter setting menu and the remembrance display time menu by operating the cross key 24.

Figure 4B:
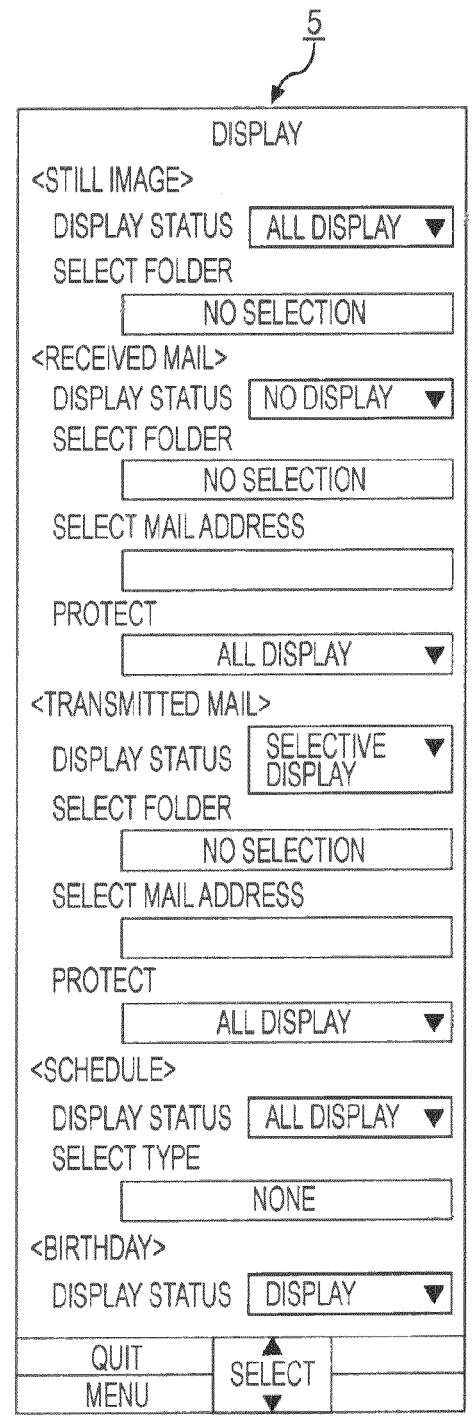

Upon detecting the selection of the entry key 25 with the display setting menu being in-focus, the controller 12 displays the display setting menu of FIG. 4B on the display 5. The display setting menu is used to set whether to display each of the still image content, the received e-mail content, the transmitted e-mail content, the schedule content, and the birthday content on the life time calendar.

More specifically, the controller 12 displays, as the display setting menu, a setting menu for each of the still image content, the received e-mail content, the transmitted e-mail content, the schedule content, and the birthday content.

The setting menu for the still image content is used to set a determination as to whether to display a still image on the life time calendar and to select a folder storing the still image to be displayed.

To select any still images to be displayed on the life time calendar without limitation, the user selects an "all display" setting from a pulldown menu of "all display/selective display/no display." If the "all display" is selected, the controller 12 selects a still image from among all still images stored on the cellular phone and displays the selected still image on the life time calendar.

If the displaying of the images on the life time calendar is not needed, the user selects a "no display" setting from the pulldown menu of "all display/selective display/no display." When the "no display" setting is selected, the controller 12 excludes all still images stored on the cellular phone as an object to be displayed on the life time calendar. Therefore, when the "no display" setting is selected, none of the still images is displayed on the life time calendar.

To select a folder storing a still image to be displayed on the life time calendar, the user selects a "selective display" setting from the pulldown menu of "all display/selective display/no display." When the "selective display" setting is selected, the controller 12 displays the selection box for the "select folder" at full brightness level. If one of the "all display" setting and the "no display" setting is selected, the controller 12 displays the selection box for the "select folder" at half-brightness level (gray display) to alert the user that the selection box for the "select folder" is non-active. If the "selective display" setting is selected, the controller 12 displays the selection box for the "select folder" at full-luminance level, thereby alerting the user that the selection box for the "select folder" is currently active.

The cellular phone of one embodiment of the present invention allows the user to sort the still images according to photographing date and time and title and store the sorted still images in a plurality of still image folders arranged on the memory 11. The still images to be stored on the memory 11 include a still image photographed by the camera 8, a still image downloaded via a network, and a still image attached to an e-mail. When the selection box for the "select folder" is set to be active, the user selects a desired folder. When the folder is selected, the controller 12 displays only still image content stored in the folder selected by the user.

The setting menu for the received e-mail content is used to set a determination as to whether to display a corresponding received e-mail on the life time calendar and to set a folder storing the received e-mail to be displayed, the e-mail address, and the type of the e-mail.

To display all received e-mails on the life time calendar, the controller 12 selects the all display setting from the pulldown menu of "all display/selective display/no display." When the all display setting is selected, the controller 12 selects a received e-mail from all received e-mails stored on the cellular phone and displays the selected received e-mail on the life time calendar.

If the displaying of the received e-mail content on the life time calendar is not needed, the user selects the no display setting from the pulldown menu of "all display/selective display/no display." When the no display setting is selected, the controller 12 excludes all received e-mail content stored on the cellular phone as an object to be displayed on the life time calendar. Therefore, when the no display setting is selected, none of the received e-mail content is displayed on the life time calendar.

To display only a selected received e-mail content item on the life time calendar, the user selects the selective display setting from the pulldown menu of "all display/selective display/no display." When the selective display setting is selected, the controller 12 displays the selection box for the "select folder", a selection box for "select mail address," and a selection box for "protect" at full-brightness level.

More specifically, when one of the all display setting and the no display setting is selected, the controller 12 displays the select folder selection box, the select mail address selection box, and the protect selection box at half-brightness level (gray level) to alert the user that these selection boxes are non-active. In contrast, if the selective display setting is selected, the controller 12 displays the select folder selection box, the select mail address selection box, and the protect selection box at full-brightness level to alert the user that these selection boxes are active.

The cellular phone of one embodiment of the present invention allows a plurality of received e-mail folders to be arranged on the memory 11. The user sorts the received e-mails according to the reception date of each received e-mail and according to the user who has transmitted the received e-mail, and then stores the sorted received e-mails in the respective folders. The user selects a desired folder from among the folders containing the sorted received e-mails, using the pulldown menu. If received e-mails in all folders can be displayed, the user may select all folders. When the folder is selected, the controller 12 displays only a received e-mail stored in only the folder selected by the user on the life time calendar.

To select a mail address, the user selects an e-mail address of a user as a sender of the e-mail. The user can select the mail address by specifying a desired user (desired e-mail address) from the telephone book, a transmission ranking list (listing the users in the order from high to low mail transmission frequency), a reception ranking list (listing the users in the order from high to low mail reception frequency). Also, the user can directly input the mail address by operating the operation unit 6. When the mail address is selected, the controller 12 displays only the received e-mail content containing the e-mail address selected by the user on the life time calendar.

The cellular phone of one embodiment of the present invention allows a desired received e-mail from among the received e-mails to be protected from inadvertent deletion. From among the received e-mails stored on the cellular phone, only the received e-mail set to be protected can be selected as a received e-mail content item to be displayed on the life time calendar.

Selection boxes for "protect" include "all display" setting and "protected mail only" setting. To display all received e-mails stored on the cellular phone, the user selects the all display setting. When the all display setting is selected, the controller 12 displays the received e-mail content on the life time calendar regardless of whether the received e-mail is protected or not. To display the protected received e-mail only, from among all received e-mails stored on the cellular phone, the user selects the protected mail only setting.

The cellular phone of one embodiment of the present invention allows the received e-mail content being displayed on the life time calendar to be subject to the display conditions as to whether the folder is selected, whether the received e-mail is to be protected, etc. When a plurality of display conditions is set, the controller 12 causes only a received e-mail content item satisfying all display conditions to be displayed on the life time calendar.

The setting menu for the transmitted e-mail content is used to set whether to display a transmitted e-mail on the life time calendar and to set a folder storing the transmitted e-mail to be displayed, the e-mail address, and the type of the e-mail.

To display the transmitted e-mails on the life time calendar without any limitation, the user selects the all display setting from the pulldown menu of "all display/selective display/no display." When the all display setting is selected, the controller 12 selects a transmitted e-mail from among all transmitted e-mails stored on the cellular phone and displays the selected transmitted e-mail on the life time calendar.

If the displaying of the transmitted e-mails is not needed, the user selects the no display setting from the pulldown menu of "all display/selective display/no display." When the no display setting is selected, the controller 12 excludes all transmitted e-mails stored on the cellular phone as an object to be displayed on the life time calendar. Therefore, when the no display setting is selected, none of the transmitted e-mails is displayed on the life time calendar.

To display a selected transmitted e-mail on the life time calendar, the user selects the selective display setting from the pulldown menu of "all display/selective display/no display." When the selective display setting is selected, the controller 12 displays the select folder selection box, the select mail address selection box and the protect selection box at full-brightness level, thereby alerting the user that each selection box becomes active.

Similarly, a plurality of transmitted e-mail folders can be arranged on the memory 11. The user sorts the transmitted e-mails according to transmission date and time of each transmitted e-mail and a transmission destination of each transmitted e-mail, and stores the transmitted e-mail in the respective folder thereof. The user may select a desired folder storing a sorted transmitted e-mail from among the folders storing the sorted transmitted e-mails, or all folders if the transmitted e-mails stored in all folders can be displayed. When the folder is selected, the controller 12 displays only the transmitted e-mail stored in the folder selected by the user on the life time calendar.

The user selects an e-mail address as a destination of the transmitted e-mail. The user can select the mail address by specifying a desired user (desired e-mail address) from the telephone book, a transmission ranking list (listing the users in the order from high to low mail transmission frequency), and a reception ranking list (listing the users in the order from high to low mail reception frequency).

The user can also directly input the mail address by operating the operation unit 6. When the mail address is selected, the controller 12 displays the transmitted e-mail content containing the e-mail address selected by the user on the life time calendar.

The cellular phone of one embodiment of the present invention allows a desired transmitted e-mail from among the transmitted e-mails to be protected from inadvertent deletion. From among the transmitted e-mails stored on the cellular phone, only the transmitted e-mail set to be protected can be selected as a transmitted e-mail content item to be displayed on the life time calendar.

Selection boxes for "protect" include "all display" setting and "protected mail only" setting. To display all transmitted e-mails stored on the cellular phone, the user selects the all display setting. When the all display setting is selected, the controller 12 displays the transmitted e-mail content on the life time calendar regardless of whether the transmitted e-mail is protected or not.

To display the protected transmitted e-mail only, from among all transmitted e-mails stored on the cellular phone, the user selects the protected mail only setting. When the protected transmitted e-mail only is selected, the controller 12 displays the protected transmitted e-mail only on the life time calendar.

The cellular phone of one embodiment of the present invention allows the transmitted e-mail content being displayed on the life time calendar to be subject to the display conditions as to whether the folder is selected, whether the transmitted e-mail is to be protected, etc. When a plurality of display conditions is set, the controller 12 causes only a transmitted e-mail content item satisfying all display conditions to be displayed on the life time calendar.

The setting menu for the schedule content is used to set a determination as to whether to display a schedule on the life time calendar and to set the type of the schedule to be displayed.

To display all schedules on the life time calendar without any limitation, the user selects the all display setting from the pulldown menu of "all display/selective display/no display." When the all display setting is selected, the controller 12 selects a schedule from among all schedules registered in the schedule book and displays the selected schedule on the life time calendar.

If the displaying of the schedules is not needed, the user selects the no display setting from the pulldown menu of "all display/selective display/no display." When the no display setting is selected, the controller 12 excludes all schedules registered in the telephone book registered in the telephone book as an object to be displayed on the life time calendar. Therefore, when the no display setting is selected, none of the schedules is displayed on the life time calendar.

To display a selected schedule on the life time calendar, the user selects the selective display setting from the pulldown menu of "all display/selective display/no display." When the selective display setting is selected, the controller 12 displays a "select type" setting at full-brightness level, thereby alerting the user that the selection box is active.

In the cellular phone of one embodiment of the present invention, the schedule is sorted according to schedule type, such as company, school, lunch party, driving, sport, etc. The user can select a desired type of schedule. When the schedule type is selected, the controller 12 displays only the schedule of a type selected by the user on the life time calendar from among all schedules registered in the schedule book.

The setting menu for the birthday content is used to set a determination as to whether to display birthday content on the life time calendar. The user selects the all display setting from the pulldown menu of "all display/selective display/no display" if the user permits the birthday content of all users registered in the telephone book and the birthday content registered in the personal information registration box. When the all display setting is selected, the controller 12 recognizes and displays as an object to be displayed on the life time calendar the birthday content of all users registered in the telephone book and the birthday content registered in the personal information registration box.

If the user does not want to display the birthday content on the life time calendar, the user selects the no display setting from the pulldown menu of "all display/selective display/no display." When the no display setting is selected, the controller 12 excludes as an object to be displayed on the life time calendar the birthday content of all users registered in the telephone book and the birthday content registered in the personal information registration box. Therefore, when the no display setting is thus selected, the birthday content is not displayed on the life time calendar.

The controller 12 activates an "ON/OFF" pulldown menu when the entry key 25 is pressed with the filter setting menu of FIG. 4A being in-focus. The filter setting menu is used to set a determination as to whether to display a received e-mail having an e-mail address unregistered in the telephone book on the life time calendar.

The user selects an "OFF" setting from the "ON/OFF" pulldown menu not to display the received e-mail content having an e-mail address unregistered in the telephone book on the life time calendar. When the OFF setting is selected, the controller 12 excludes as an object to be displayed on the life time calendar the received e-mail content having an e-mail address unregistered in the telephone book. The received e-mail content having an e-mail address unregistered in the telephone book is not displayed on the life time calendar.

To display the received e-mail content having an e-mail address unregistered in the telephone book on the life time calendar, the user selects an "ON" setting from the "ON/OFF" pulldown menu. When the ON setting is selected, the controller 12 displays the received e-mail content on the life time calendar regardless of whether the e-mail address is registered in the telephone book or not.

The filter setting menu is used to set a determination as to whether to display the received e-mail content having the e-mail address unregistered in the telephone book. The filter setting menu may be used to set a determination as to whether to display the transmitted e-mail content having the e-mail address unregistered in the telephone book.

The cellular phone of one embodiment of the present invention has a remembrance popup function to display a popup window in the margin of each content item dated with a day one year before the in-focus date on the life time calendar. The "remembrance display time" setting menu is used to set a determination as to whether to display a remembrance popup window, and to set time to the displaying of the remembrance popup window.

The controller 12 activates a "no display/quick/standard/slow" menu if a selection of the entry key 25 is detected with the remembrance display time menu of FIG. 4A being in-focus. When the displaying of the remembrance popup window is not needed, the user presses the entry key 25 with the no display setting selected from the pulldown menu. Therefore, when the no display setting is selected, the controller 12 does not display the remembrance popup window on the life time calendar.

Each setting of the "quick/standard/slow" menu is used to set the time of the displaying of the remembrance popup window. More specifically, if any date is continuously in focus on the life time calendar longer than a predetermined period time (a predetermined time has elapsed with no operational input applied), the controller 12 displays in the remembrance popup window the content dated with a date before the in-focus date.

The quick/standard/slow menu is used to set time to the time before the appearance of the remembrance popup window. The user may select any setting from the quick/standard/slow menu.

When the fast setting is selected, the controller 12 displays the remembrance popup window about 5 seconds after the stopping of the user operation. When the standard setting is selected, the controller 12 displays the remembrance popup window about 7.5 seconds after the stopping of the user operation. When the slow setting is selected, the controller 12 displays the remembrance popup window about 10 seconds after the stopping of the user operation. The user can thus select the desired setting from the quick/standard/slow menu as a time duration in the displaying of the life time calendar from the start of no user input to the displaying of the remembrance popup window.

The display operation of the life time calendar is described below. For simplicity, displayed on the life time calendar are the still image content, the schedule content, the birthday content, the transmitted e-mail content, and the received e-mail content with the moving image content and the music content remaining undisplayed.

To display the life time calendar, the user selects to start the life time calendar from a main menu using the operation unit 6. When the life time calendar is selected, the controller 12 causes a calendar-format life time calendar of FIG. 5 on the display 5 as a default display in accordance with the life time calendar application program stored on the memory 11.

Figure 6:
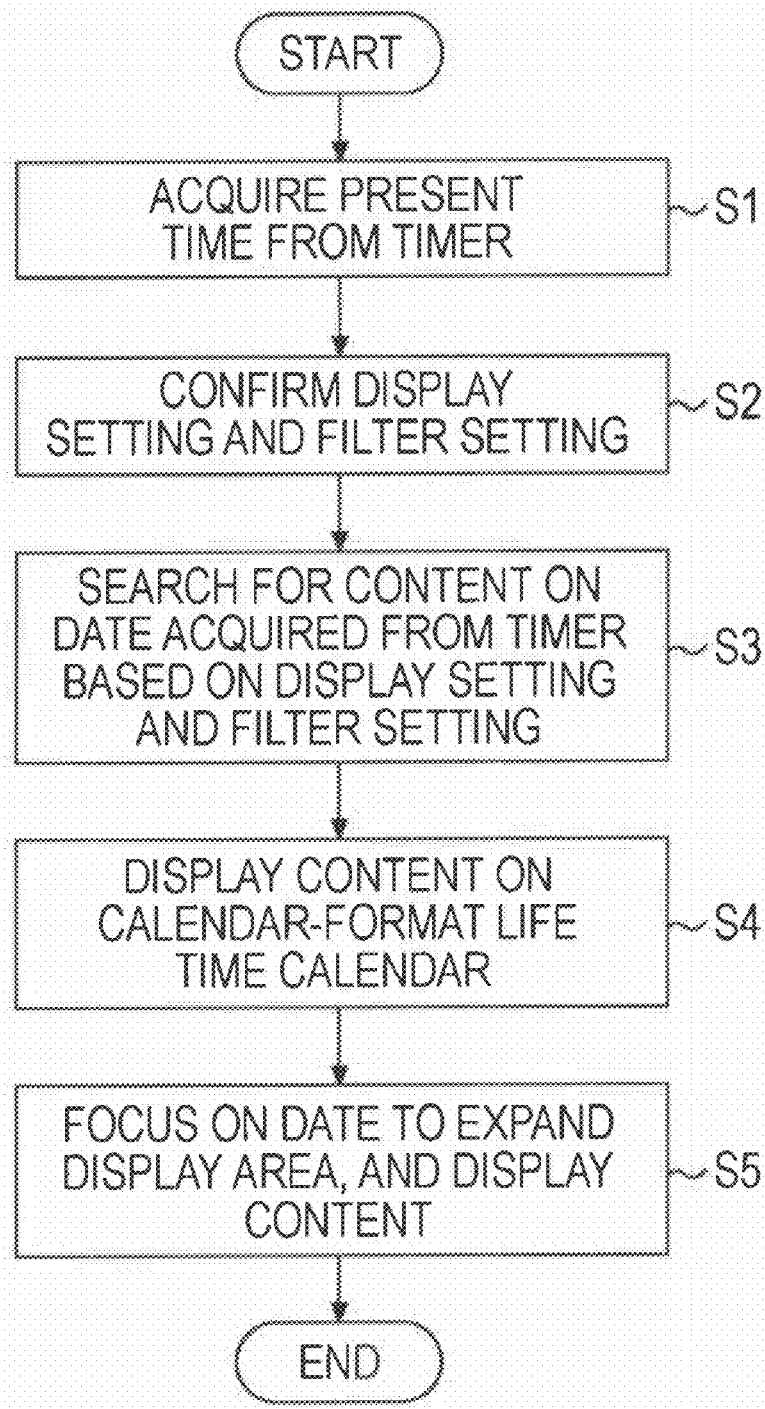
FIG. 6 is a flowchart illustrating a display operation of the calendar-format life time calendar of the cellular phone in accordance with one embodiment of the present invention.

FIG. 6 is a flowchart illustrating a display control process performed by the controller 12 to display the calendar-format life time calendar. The display control process is started in accordance with the life time calendar application program stored on the memory 11 when the controller 12 detects a start command of the life time calendar input on the operation unit 6 by the user.

In step S1, the controller 12 retrieves the time information indicating the present date and time measured by the timer 10. Processing proceeds to step S2. In step S2, the controller 12 reads the display setting and the filter setting discussed with reference to FIGS. 4A and 4B and stored on the memory 11. Processing proceeds to step S3.

In step S3, the controller 12 searches for the content dated with the present year and month read from the timer 10 in step S1, from among the content items permitted to be displayed on the life time calendar, in accordance with the display setting and the filter setting read from the memory 11.

More specifically, in accordance with the display setting and the filter setting, the still image content, the schedule content, the birthday content, the transmitted e-mail content and the received e-mail content are permitted to be displayed. If the present date retrieved from the timer 10 is Sep. 13, 2005, the controller 12 searches the memory 11 for the still image content having time information or storage information dated with September 2005, the received e-mail content having reception time dated September 2005, the transmitted e-mail content having transmission time dated September 2005, the schedule content having start time dated September 2005, and the birthday content having birthday dated September 2005.

Similarly, only the still image content and the birthday content may be permitted to be displayed in accordance with the display setting and the filter setting, and the present date retrieved from the timer 10 may be Oct. 1, 2006. The controller 12 searches the memory 11 for a still image content item having time information or storage information dated October 2006 and a birthday content item having birthday dated October 2006.

In step S4, the controller 12 displays the calendar-format life time calendar on the display 5, and then displays the above-described content items in the calendar-format life time calendar. In step S5, a display area of the present day (a display area of a date on which the life time calendar is started) is expanded to be larger than other display areas. The controller 12 focuses on the expanded display area, and the process of the flowchart of FIG. 6 thus ends.

The calendar-format life time calendar displayed as a result of the process represented in the flowchart of FIG. 6 is shown in FIG. 5. FIG. 5 illustrates the calendar-format life time calendar in September 2005. The controller 12 focuses on Thursday, Sep. 13, 2005.

As shown in FIG. 5, the controller 12 displays, in the calendar-format life time calendar, date "Sep. 13, 2005" as the in-focus date and a variety of icons indicating the type of content items permitted to be displayed in accordance with the display setting and the filter setting (the variety of icons indicating current setting status). The controller 12 displays the present month in numerical form (month index) on the left edge portion of the display area. Since the present month is September, "09" is displayed. The controller 12 displays the present date box different in color from the other dates for the user to recognize easily the present date.

FIG. 5 illustrates a variety of icons indicating setting states (the variety of icons displayed next to each date). An icon of the birthday content is represented by an image of a cake with candles standing thereon. An icon of the schedule content is represented by an image of a calendar and a pencil. An icon of the transmitted e-mail content is represented by an image of a sealed cover with an upward looking arrow thereon. An icon of the received e-mail content is represented by an image of a sealed cover with a downward looking arrow thereon. An icon of the still image content is represented by an image of a rectangle with the top right corner thereof bent inwardly. The controller 12 displays, from these icons, any icon of the content permitted to be displayed by the user in color, and any icon of the content not permitted to be displayed by the user in gray (at half-brightness level). Such a difference in display manner allows the user to recognize at a glance the type of the content permitted to be displayed on the life time calendar.

The controller 12 displays an icon of the content detected in step S3 and/or a thumbnail image of the still image content in a display area of each date in the calendar-format life time calendar.

If a plurality of still image content items to be displayed in the display area of the same date is present, the controller 12 selects a single still image content item from among the plurality of still image content items using a random number, and displays the thumbnail image of the selected still image content item in the display area of the corresponding date. The displayed thumbnail image thus selected may be updated at a predetermined timing using a "rating function" to be discussed later.

The controller 12 expands the display area of the in-focus date, namely, Wednesday Sep. 13, 2005 to be larger than display areas of the other dates, and displays in the expanded display area the icon of the content and/or the thumbnail image of the still image content.

As shown in FIG. 5, only a sealed cover icon is displayed in the display area of Friday Sep. 1, 2005, indicating that one of a transmitted e-mail content item and a received e-mail content item is present on Friday Sep. 1, 2005. A sealed cover icon and a birthday content icon are displayed on Sunday Sep. 3, 2005, indicating that one of a transmitted e-mail content item and a received e-mail content item is present on Friday Sep. 3, 2005 and that Friday September 3 is the birthday of one of persons and the user himself of the cellular phone. A sealed cover icon, a schedule content icon, and a thumbnail image of still image content are displayed in the display area of Monday Sep. 4, 2005, indicating that one of a transmitted e-mail content item and a received e-mail content item, a schedule content item, and a still image content item are present on Monday Sep. 4, 2005.

The display area of the in-focus date, namely, Wednesday Sep. 13, 2005, is displayed in an expanded scale to be larger than the display areas of the other dates. Displayed in the expanded display area are a sealed cover icon, a schedule content icon, a birthday content icon, and a thumbnail image of a still image content item. The expanded display area thus shows that one of a transmitted e-mail content item and a received e-mail content item, and a schedule content item are present on Wednesday Sep. 13, 2005 and that Wednesday September 13 is the birthday of one of persons and the user himself of the cellular phone.

When the thumbnail image of the still image content is displayed in the expanded display area, the controller 12 displays a thumbnail image expanded to be larger than thumbnail images displayed in the display areas of the other dates. The user can thus easily recognize the still image content of the in-focus date. The icons, other than that thumbnail image, displayed in the expanded display area have the same scale as the icons displayed in the display areas of the other dates.

When the calendar-format life time calendar is displayed, the controller 12 displays an icon of each content item and/or a thumbnail image of a still image content item. The icon and the thumbnail image displayed in the calendar-format life time calendar thus allows the user to recognize the presence of each content item of each date at a glance.

If no content is present, neither icon nor thumbnail image is present either. The display area of any date having no content is naturally blank in the calendar-format life time calendar. As shown in FIG. 5, Saturday Sep. 9, 2005 is a date having no content. By finding a blank display area of any date, the user can quickly recognize that that date has no corresponding content.

The received e-mail content item and the transmitted e-mail content item are present as e-mails. If one of the received e-mail content item and the transmitted e-mail content item is present, the controller 12 displays a sealed cover item in the calendar-format life time calendar to indicate that the received e-mail content item and/or the transmitted e-mail content item is present.

In other words, when the calendar-format life time calendar is displayed, the controller 12 indicates in a simple form the presence of the received e-mail content item and/or the transmitted e-mail content item by displaying the sealed cover icon. When a deview-format life time calendar to be discussed later is displayed, a sealed cover icon with an upward looking arrow indicates the presence of a transmitted e-mail content item, and a sealed cover icon with a downward looking arrow indicates the presence of a received e-mail content item.

Since the display area for each date is limited, the presence of a received e-mail content item and/or a transmitted e-mail content item is representatively displayed using a sealed cover image icon. When a larger display area becomes available in the displaying of the deview-format life time calendar to be discussed later, a received e-mail content item and a transmitted e-mail content item are separately displayed.

The user can shift a focusing area to any desired date in the life time calendar by operating the operation unit 6. As shown in FIG. 5, the controller 12 focuses on September 13 as the present day in a default state. If the user presses the right portion of the cross key 24 on the operation unit 6, the controller 12 shifts the focusing area from 13th day, to 14th day, to the 15th day, to 16th day, to 17th day . . . in that order. If the user presses the left portion of the cross key 24 on the operation unit 6 with 13th day being in-focus, the controller 12 shifts the focusing area from 13th day, to 12th day, to 11th day, to 10th day, to 9th day, . . . in that order. If the user presses the upper portion of the cross key 24 on the operation unit 6 with the 13th day being in-focus, the controller 12 shifts the focusing area from 13th day, to 6th day, to August 30th day, . . . in that order. If the user presses the lower portion of the cross key 24 on the operation unit 6 with the 13th day being in-focus, the controller 12 shifts the focusing area from 13th day, to 20th day, to 27th day, to October fourth day, . . . in that order.

Each time the cross key 24 is pressed, the controller 12 shifts the focusing area. If the cross key 24 is continuously pressed, the controller 12 continuously performs focusing area shifting control in this way throughout the pressing period. In the focusing area shifting control, the controller 12 successively detects content responsive to each date displayed on the display 5, and displays the icon and the thumbnail image. The life time calendar is thus scrolled on the display 5 in response to focusing area shifting.

The user can shift the focusing area by day in the calendar-format life time calendar by operating the cross key 24. The user may wish to switch the content items displayed in the life time calendar by month or by year.

In this case, the user may press the second soft key 27 of FIG. 2. Upon detecting the pressing of the second soft key 27 with the calendar-format life time calendar displayed on the display 5, the controller 12 displays the life time calendar as an index screen of the calendar view of FIG. 7 on the display 5.

Figure 7:
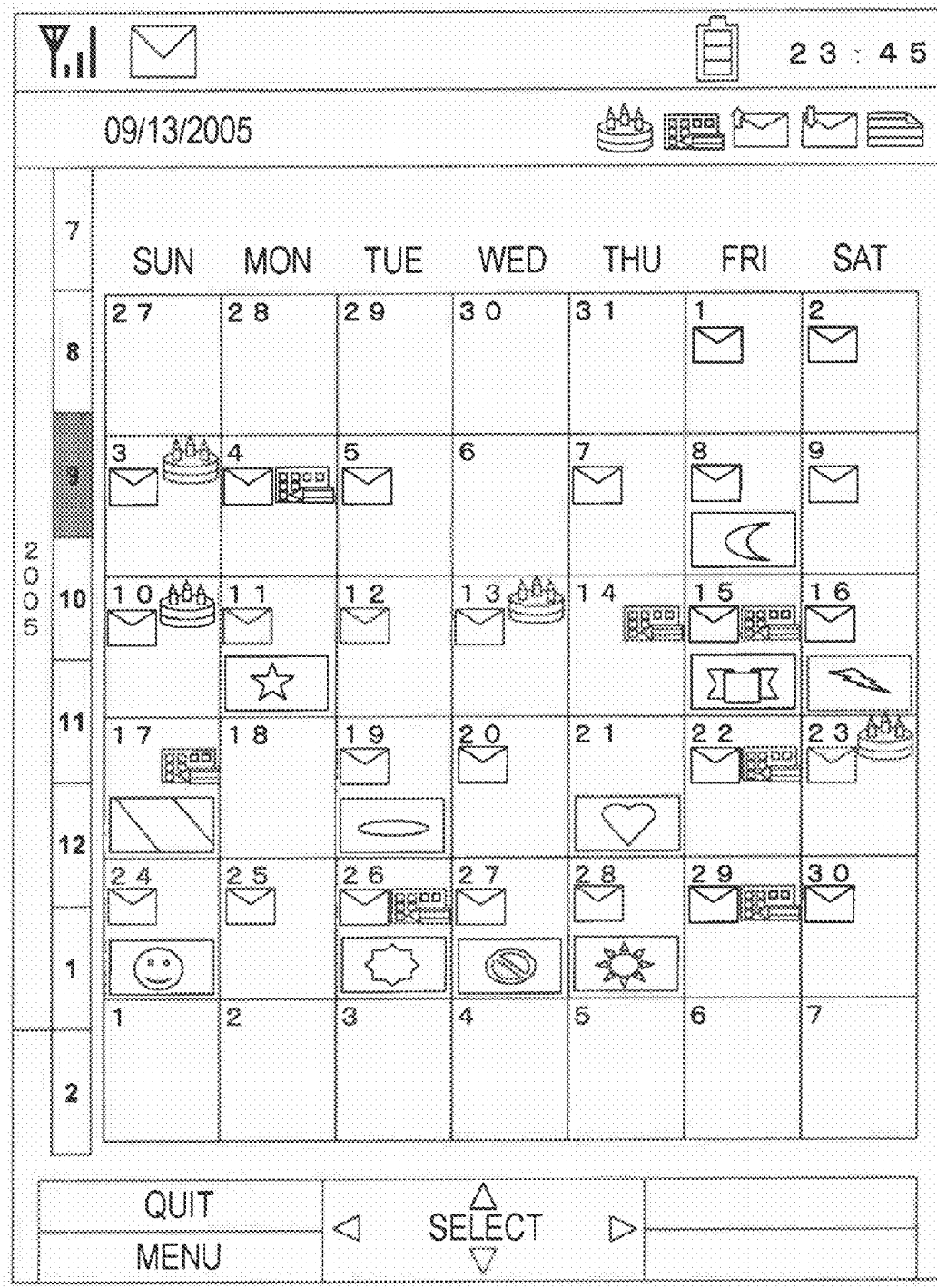
FIG. 7 illustrates a month index and a year index displayed in the calendar-format life time calendar in accordance with one embodiment of the present invention.

In comparison of FIG. 5 with FIG. 7, upon detecting the pressing of the second soft key 27, the controller 12 displays vertically months in numerical form (month index) in the left edge portion of the calendar-format life time calendar and year in numerical form (year index) in the left edge portion of the calendar-format life time calendar. The year here indicates the year the months displayed on the display 5 belong to.

The controller 12 focuses the display area of the month the in-focus date belongs to the moment of the pressing of the second soft key 27. FIG. 7 illustrates the example of the life time calendar at the moment the second soft key 27 is pressed with any date of September 2005 being in focus. The controller 12 focuses here on the display area of September in numerical form.

The focusing area may be shifted along the month index by month and along the year index by year. To shift the focusing area by month, the user presses the upper portion or lower portion of the cross key 24 with any month in focus. If the user presses the upper portion of the cross key 24 with September being in focus as shown in FIG. 7, the controller 12 shifts the focusing area from 9 (September), to 8 (August), to 7 (July), to 6 (June) . . . in that order. If the user presses the lower portion of the cross key 24 with September being in focus, the controller 12 shifts from 9 (September) to 10 (October), to 11 (November), to 12 (December) . . . in that order.

When the in-focus month is shifted along the month index, the controller 12 searches the memory 11 for the content items corresponding to a target (currently in-focus) month. The controller 12 displays the icon and the thumbnail image of the detected content on the calendar-format life time calendar of the target month. In this way, the icon and the thumbnail image displayed on the calendar-format life time calendar are switched.

With the focusing area shifting from month to month, the controller 12 switches the content in the calendar-format life time calendar by month. Alternatively, the content is not switched while the focusing area is shifting from month to month and but switched after the entry key 25 is pressed. In other words, the controller 12 displays in the calendar-format life time calendar the content of the month being in focus at the moment the entry key 25 is pressed.

The user shifts the focusing area to a desired month (with the content remaining unswitched), and then presses the entry key 25 with the focusing area reaching the desired month. The controller 12 thus recognizes that the content of the in-focus month is selected by the user, detects the content of the in-focus month from the memory 11, and returns the display screen from the index screen of the calendar view of FIG. 7 to the standard screen of the calendar view of FIG. 5. The icon and the thumbnail image corresponding to the content are thus displayed in the calendar-format life time calendar. Since the content is switched in the calendar-format life time calendar subsequent to the pressing of the entry key 25, the controller 12 is set free from the workload involved in content switching performed at each focusing area shifting cycle.

With any month in focus, the display area of each date (the display area of the icon and the thumbnail image for each content item) may be displayed at half-brightness level, for example. The user can thus easily recognize that the in-focus month is active.

To shift the focusing area by year, the user presses the left portion of the cross key 24 with the display area of any month being in focus. Upon detecting the pressing of the left portion of the cross key 24 with the display area of any month being in focus, the controller 12 focuses on the display area of the year the in-focus month belongs to. In this way, the display screen can be switched by year.

Upon detecting the pressing of the upper portion of the cross key 24 with the year being in focus, the controller 12 shifts the focusing area from 2005 to 2004, to 2003, . . . in that order as shown in FIG. 7. Similarly, upon detecting the pressing of the lower portion of the cross key 24 with the year being in focus, the controller 12 shifts the focusing area from 2005, to 2006, to 2007, . . . in that order. By performing the focusing area shifting control by year, the controller 12 detects from the memory 11 the content of the in-focus month immediately prior to the focus shifting from the month index to the year index, and displays the icon and the thumbnail image of the detected content in the calendar-format life time calendar.

More specifically, the user may shift the focusing area to the display area of 2005 in the year index with September being in focus in the month index. The controller 12 detects a variety of content items for September 2005 from the memory 11, and displays the content and the thumbnail image for the detected content item in the calendar-format life time calendar.

Similarly, the user may shift the focusing area to the display area of 2004 in the year index with July being in focus in the month index. The controller 12 detects a variety of content items for July 2004 from the memory 11, and displays the icon and the thumbnail image of the detected content item in the calendar-format life time calendar. The user may shift the focusing area from the display area of 2004 to the display area of 2003 in the year index. The controller 12 detects a variety of content items of July 2003 and displays the content and the thumbnail image of the detected content item in the calendar-format life time calendar. In this way, the icon and the thumbnail image displayed in the calendar-format life time calendar are switched and displayed by year.

The controller 12 here switches the content displayed in the calendar-format life time calendar while the focusing area is shifted in the year index. Alternatively, the content displayed in the calendar-format life time calendar is not switched while the focusing area is being shifted in the year index but switched as discussed below.

With any year being in focus in the year index, the controller 12 performs the focusing area shifting control on the month index at the timing the pressing of the entry key 25 is detected. With any month being in focus in the month index, the controller 12 detects the pressing of the entry key 25 on the year index and the month index and displays the content of the year and the month being in focus at the detection timing in the calendar-format life time calendar.

In other words, the user presses the entry key 25 after shifting the focusing area to a desired year in the year index (with the content remaining unswitched), and then presses the entry key 25 after shifting the focusing area to a desired month in the month index (with the content still remaining unswitched).

The controller 12 recognizes that the content of the year and the month being in focus at the detection of the pressing of the entry key 25 is selected by the user. The controller 12 thus detects the content corresponding to the year and the month being in focus from the memory 11, returns the display screen from the index screen of the calendar view of FIG. 7 to the standard screen of the calendar view of FIG. 5, and then displays the icon and the thumbnail image corresponding to the content in the calendar-format life time calendar. Since the content is displayed in the calendar-format life time calendar after the pressing of the entry key 25, the controller 12 is set free from the workload involved in content switching performed at each focusing area shifting cycle.

While the focusing area is in the year index and the month index, the display area of each date (the display area of the icon and the thumbnail image for each content) may be displayed at half-brightness level, for example. The user can thus easily recognize that the year index and the month index are active.

The cellular phone of one embodiment of the present invention allows the calendar-format life time calendar to be on a standby screen mode. The user might set the life time calendar to be on a standby screen mode using the operation unit 6. To display the standby screen on the display 5, the controller 12 detects from the memory 11 the content matching the display setting and the filter setting from among content items of the present date retrieved from the timer 10 as described with reference to FIG. 6. The controller 12 displays the icon and/or the thumbnail image of the still image content found in the memory 11 in the calendar-format life time calendar corresponding to the present year and the present month. The controller 12 also focuses on the display area of the present day.

Figure 8:
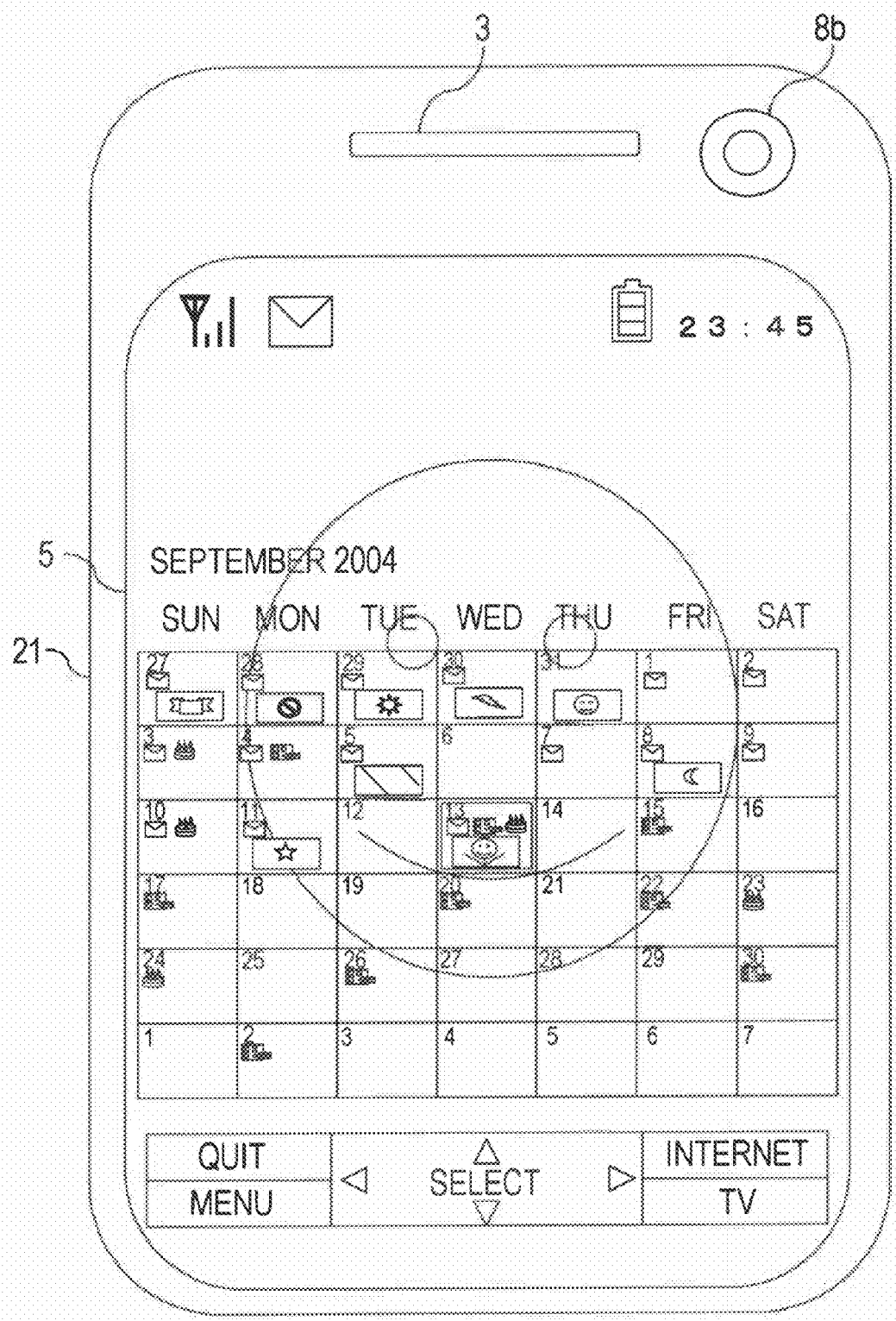
FIG. 8 illustrates a calendar-format life time calendar set on a standby screen in accordance with one embodiment of the present invention.

FIG. 8 illustrates an example of a calendar-format life time calendar displayed as a standby screen. As shown in FIG. 8, the present date retrieved from the timer 10 is Sep. 13, 2004. The controller 12 displays the calendar-format life time calendar of September 2004 as a standby screen on the display 5. The controller 12 now focuses on the present date, namely, September 13.

When the user sets beforehand a predetermined standby image, the controller 12 displays the standby image at half-brightness level, superimposed in the calendar-format life time calendar. In standby screen displayed on the display 5, the standby image is seen through the calendar-format life time calendar.

The thumbnail image displayed in the calendar-format life time calendar, including the life time calendar having the standby screen set therewithin, is updated every predetermined time.

If a plurality of still image content items is displayed on the display area of the same date, the controller 12 selects a single still image content item from the plurality of still image content items using a random number, and then displays the selected still image content item on the display area. The controller 12 updates the thumbnail image of the still image content item to a thumbnail image of another still image content item at a predetermined timing based on the "rating function."

Figure 9:
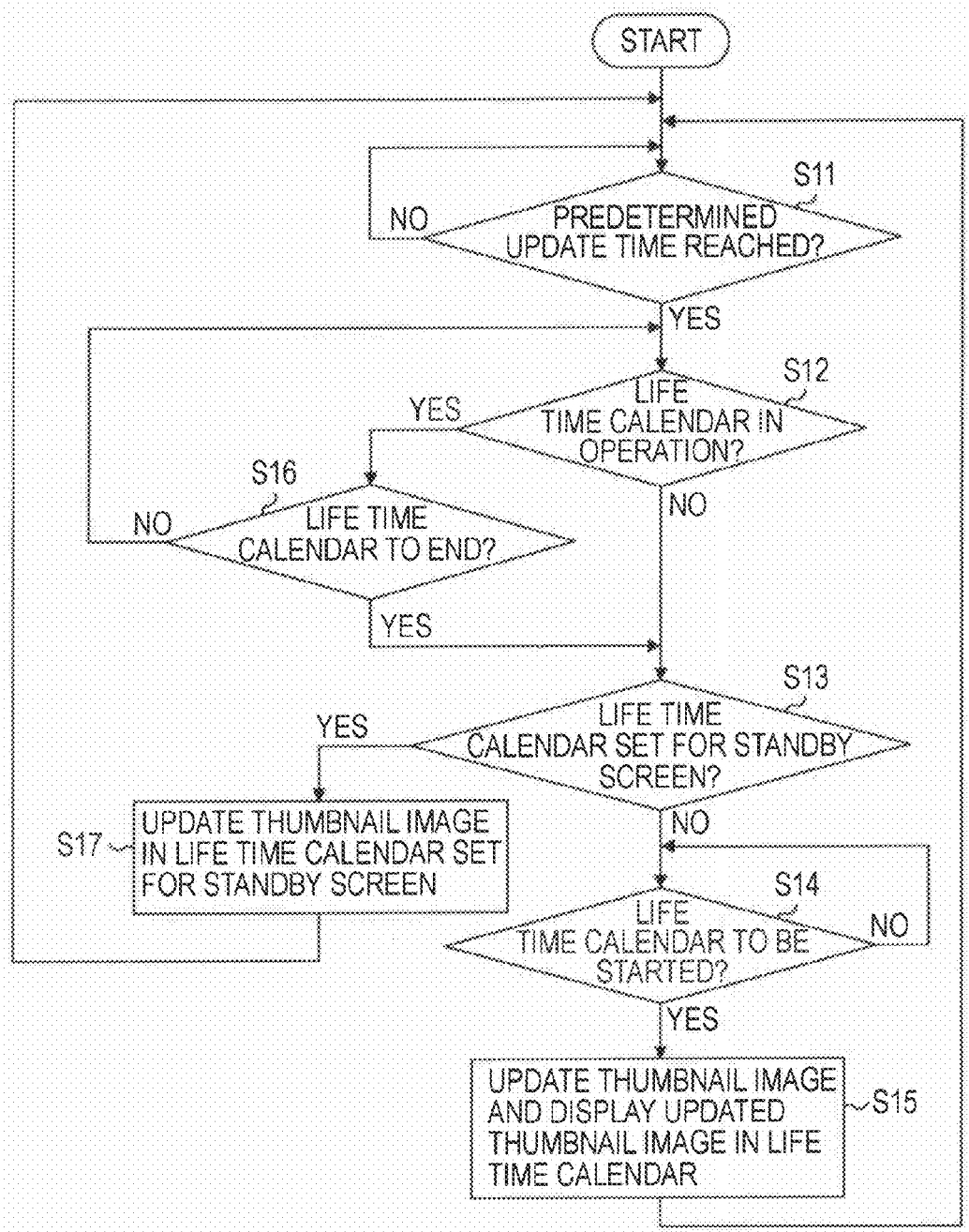
FIG. 9 is a flowchart illustrating an update process in which a thumbnail image is updated every predetermined time period when the cellular phone of one embodiment of the present invention shows the calendar-format life time calendar.

When the user starts the life time calendar application program, the controller 12 updates the thumbnail image (see FIG. 5) displayed in the calendar-format life time calendar and the thumbnail image (see FIG. 8) displayed in the calendar-format life time calendar set as a standby screen. FIG. 9 is a flowchart illustrating a periodic update process of the thumbnail image.

Regardless of whether the main power of the cellular phone is switched on or not, the controller 12 continuously performs the periodic update process of FIG. 9 in accordance with the life time calendar application program.

For example, the cellular phone of one embodiment of the present invention performs the periodic update process twice a day, at 00:00 at midnight and 12:00 at noon. In step S11, the controller 12 monitors the present time counted by the timer 10, and proceeds to step S12 at the moment the present time reaches 00:00 at midnight or 12:00 at noon as an update time of the thumbnail image.

In step S12, the controller 12 determines whether the life time calendar is currently in operation. If it is determined in step S12 that the life time calendar is currently in operation, processing proceeds to step S16. If it is determined in step S12 that the life time calendar is currently not in operation, processing proceeds to step S13.

Since the life time calendar is currently in operation, the controller 12 waits in step S16 until the end of the displaying of the life time calendar. The controller 12 then proceeds to step S13. While the life time calendar is in operation, the controller 12 does not update the thumbnail image. It is perfectly acceptable that the controller 12 may update the thumbnail image even if the life time calendar is in operation.

If it is determined in step S12 that the life time calendar is not in operation, or if the end of displaying of the life time calendar is detected in step S16, processing proceeds to step S13. The controller 12 determines whether the life time calendar is set for the standby screen (see FIG. 8). If it is determined in step S13 that the life time calendar is set for the standby screen, processing proceeds to step S17. If it is determined in step S13 that the life time calendar is not set for the standby screen, processing proceeds to step S14.

In step S17, the controller 12 detects all dates, each date having a plurality of still image content items, from among dates having a thumbnail image displayed on the life time calendar of the standby screen. For each detected date, the controller 12 detects one still image content item from the still image content items other than the currently displayed still image content item using a random number, produces a thumbnail image of the detected still image content item, and then displays the thumbnail image on the display area of the corresponding date.

The thumbnail image displayed in the calendar-format life time calendar set for the standby screen is updated at the timing of 00:00 and at midnight and 12:00 at noon.

In step S14, the controller 12 waits on standby for the start operation of the life time calendar by the user.

Upon detecting the start operation of the life time calendar by the user in step S14, the controller 12 proceeds to step S15. The calendar-format life time calendar is displayed on the display 5 as previously discussed with reference to FIG. 6. On each date having a plurality of still image content items, the controller 12 detects one still image content item using a random number from among the still image content items other than the still image content item displayed prior to the start operation, produces the thumbnail image of the detected still image content item, and then displays the thumbnail image on the display area of the corresponding date.

If the life time calendar is started across 00:00 at midnight or 12:00 at noon, one of one thumbnail image prior to the start time and another thumbnail image subsequent to the start time, different from each other, is displayed in the calendar-format life time calendar.

Figure 10:
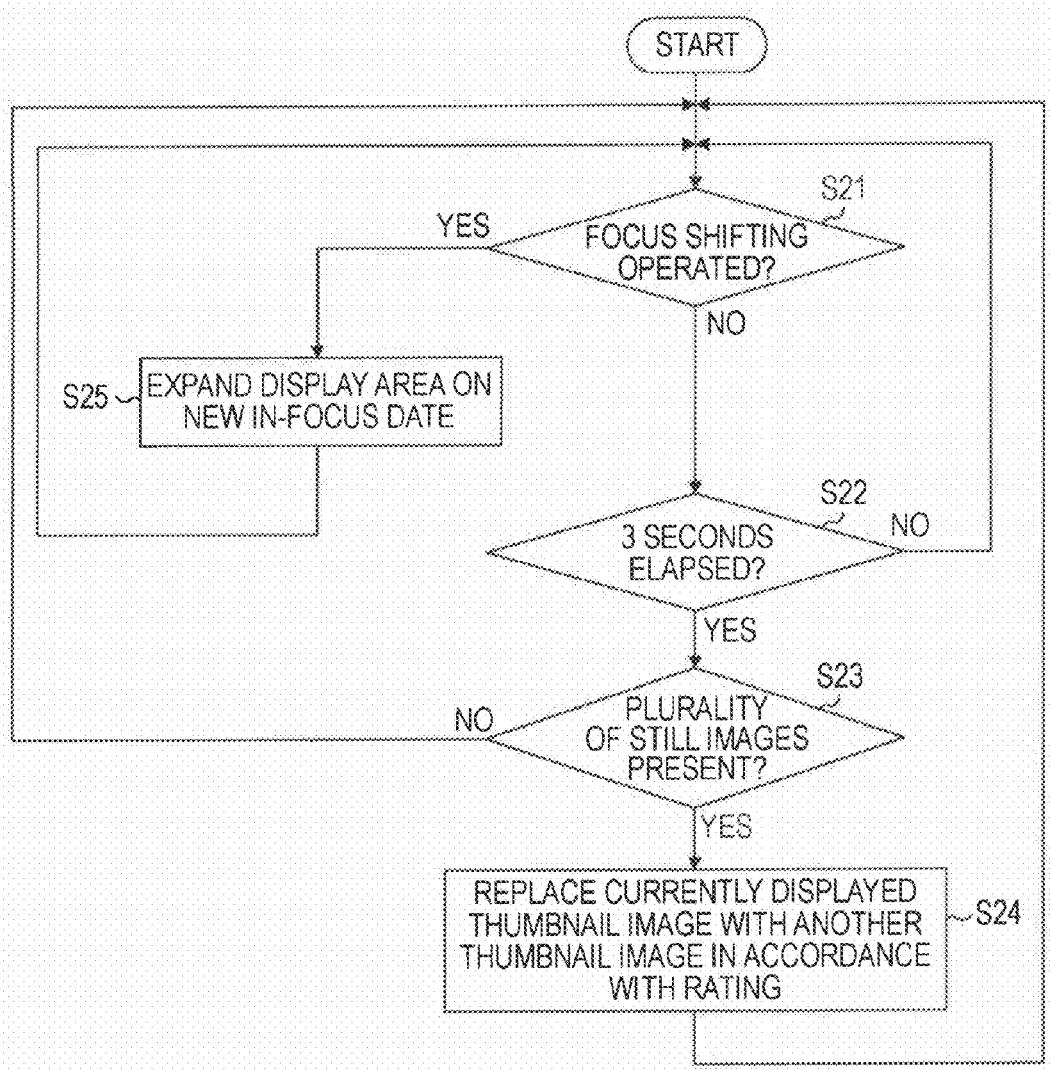
FIG. 10 is a flowchart illustrating an update process in which a thumbnail image of an in-focus date is updated every predetermined time period when the cellular phone of one embodiment of the present invention shows the calendar-format life time calendar.

The focusing area might stay on one of the display area of each of the dates in the calendar-format life time calendar and a plurality of still image content items might be present on the in-focus date. The controller 12 updates the thumbnail image, displayed on the display area of the in-focus date, every predetermined time. FIG. 10 is a flowchart illustrating the update process of the thumbnail image. The update process of FIG. 10 is started in accordance with the life time calendar application program stored on the memory 11 when the calendar-format life time calendar is displayed on the display 5.

In step S21, the controller 12 monitors the operational status of the operation unit 6, thereby determining whether the focusing area shifting operation has been performed. More specifically, when the calendar-format life time calendar is displayed, the controller 12 focuses on the display area of the present day (display area of September 13 in the example of FIG. 5) in a default setting. The focusing area can be shifted leftward, rightward, up or down by operating the cross key 24 of FIG. 2A. In step S21, the controller 12 monitors the operational status of the cross key 24, thereby determining whether the focusing area shifting operation has been performed. If it is determined in step S21 that no focusing area shifting operation has been performed, processing proceeds to step S22. If it is determined in step S21 that the focusing area shifting operation has been performed, processing proceeds to step S25.

In step S25, the controller 12 controls the shifting of the focusing area displayed on the display 5 in response to the operation of the entry key 25 by the user. The controller 12 displays the display area of the target date, namely, the in-focus date in an expanded scale larger than the display areas of the other dates, displays the icon and the thumbnail image of the corresponding content in the expanded display area of the target date, and then returns to step S21.

In step S22, the controller 12 determines, based on the time information measured by the timer 10, whether 3 seconds have elapsed since the focusing area shifting operation was not detected. More specifically, in step S22, the controller 12 monitors the continuous focusing area stay-put time. If it is determined in step S22 that a continuous focusing area stay-put time of 3 seconds has not elapsed, processing returns to step S21. At the moment a continuous focusing area stay-put time of 3 seconds has elapsed, processing proceeds to step S23.

In step S23, the controller 12 searches the memory 11 for the still image content of the in-focus date, thereby determining whether the in-focus date has a plurality of still image content items. If it is determined in step S23 that the in-focus date does not have a plurality of still image content items, processing returns to step S21. If it is determined in step S23 that the in-focus date has a plurality of still image content items, processing proceeds to step S24.

In step S24, the controller 12 randomly selects a still image content item other than the currently displayed still image content item from the plurality of still image content items of the in-focus date using a random number. The controller 12 then produces a thumbnail image of the selected still image content item. The controller 12 updates the thumbnail image currently displayed on the display area of the in-focus date with the newly produced thumbnail image and then returns to step S21.

If the focusing area continuously stays on the in-focus date having the plurality of still image content items, the thumbnail image is updated every 3 seconds. By simply allowing the focusing area to stay continuously on the display area of a desired date, the user can watch the thumbnail image updated every 3 seconds, and check the still image content items on the date.

In this way, if the focusing area continuously stay on the display area of the same date for 3 seconds or longer, the update process of the thumbnail image is performed. The time period of "3 seconds" is one example only. The thumbnail image update process may be performed if the focusing area continuously stays on the same date for 5 seconds or more, or the thumbnail image update process may be performed if the focusing area continuously stays on the same date for 10 seconds or more. This update threshold time may be freely set by the user in the setting menu.

The user can recognize the "presence" of a variety of content items of each date by watching the icon and the thumbnail image displayed on the display area of the date in the calendar-format life time calendar. To recognize the "content" of each content item of each date, the user can display a deview of the life time calendar. Titles of each content item corresponding to each date are displayed in the deview-format life time calendar. The user can thus roughly check a desired content item by viewing the deview-format life time calendar.

To check the "detailed content" of a desired content item, the user selects the desired content item on the life time calendar. An application program dedicated to the content selected by the user is thus started. The selected content is thus displayed or reproduced. The user can recognize the "detailed content" of the content item of interest.

Figure 11:
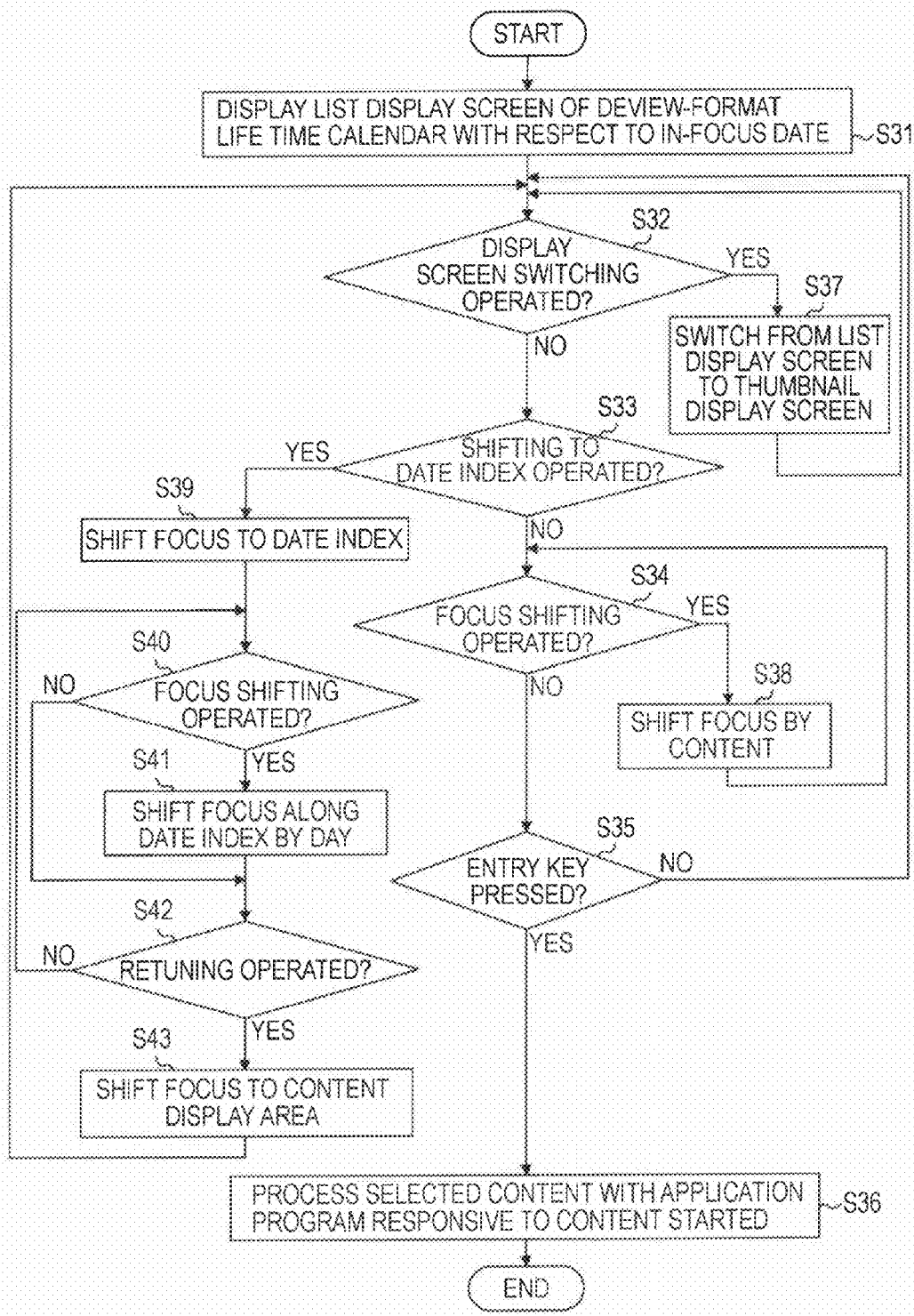
FIG. 11 is a flowchart illustrating a process flow from displaying the deview-format life time calendar to initiating an application program corresponding to a selected content item in the cellular phone in accordance with one embodiment of the present invention.

FIG. 11 is a flowchart illustrating a process from the selection of a content item in the deview-format life time calendar to the processing of the selected content item on the dedicated application program. The process of the flowchart of FIG. 11 is started in accordance with the life time calendar application program stored on the memory 11 when the controller 12 detects the pressing of the entry key 25 during the displaying of the deview-format life time calendar.

Figure 12:
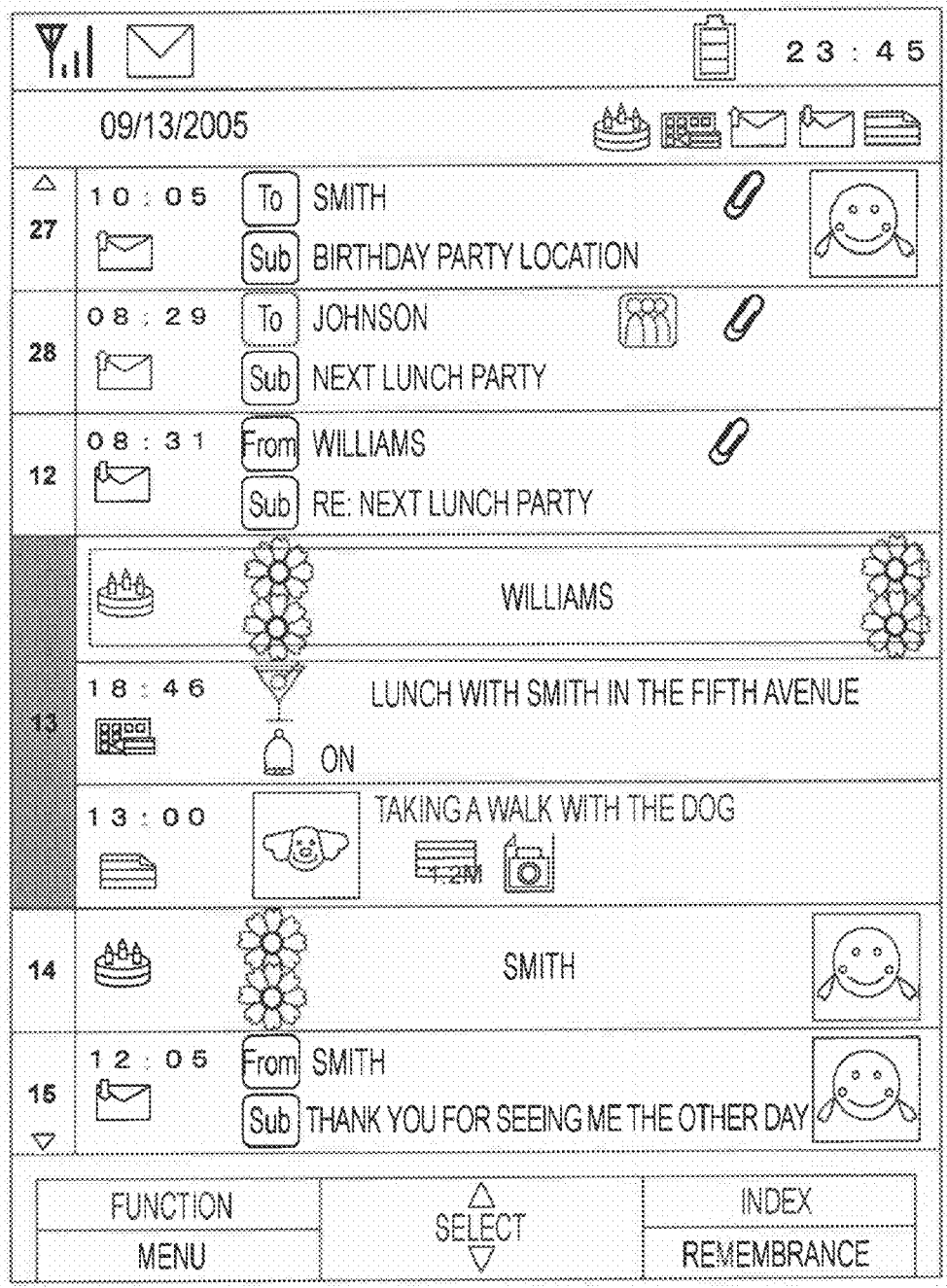
FIG. 12 illustrates the deview-format life time calendar in a list display screen in accordance with one embodiment of the present invention.

In step S31, the controller 12 displays the deview-format life time calendar on the display 5 referenced to the date that is in-focus in the calendar-format life time calendar at the detection of the pressing of the entry key 25. If a date has a plurality of content items, the controller 12 vertically arranges the content items in the order of predetermined priority from top to bottom on the display 5. In a default setting, the controller 12 focuses the top content item (having the highest order of priority) of the content items of the in-focus date. FIG. 12 illustrates such a deview-format life time calendar.

Figure 13:
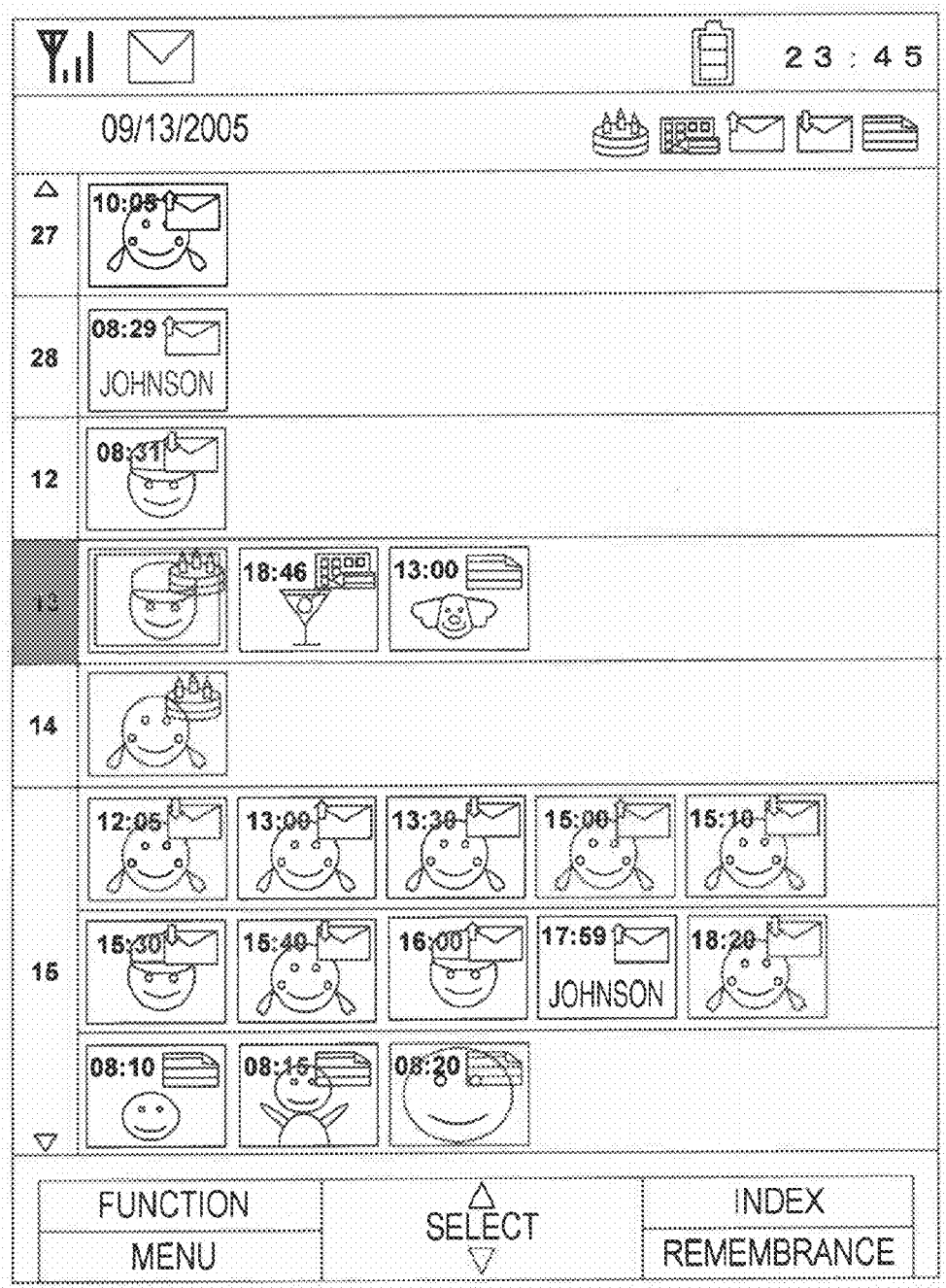
FIG. 13 illustrates the deview-format life time calendar in a thumbnail display screen in accordance with one embodiment of the present invention.

The deview-format life time calendar may be displayed as a "list display screen" of FIG. 12 and a "thumbnail display screen" of FIG. 13. To switch the life time calendar from the calendar-format life time calendar to the deview-format life time calendar, the controller 12 displays the list display screen of FIG. 12.

FIG. 12 illustrates a list display screen of the deview-format life time calendar referenced to Sep. 13, 2005 as the in-focus date in the calendar-format life time calendar. As shown in FIG. 12, the controller 12 displays, in the deview-format life time calendar, the present day such as "Sep. 13, 2005" and a birthday content icon and a schedule content icon the user permits to be displayed in accordance with the display setting and the filter setting.

The controller 12 vertically displays the day index in the left-edge portion of the display 5 corresponding to the number of content items. As shown in FIG. 12, September 12 includes a single content item, and the day index of September 12 has a day index having a vertical length corresponding to a single content item. In contrast, September 13 has three content items, and the length of the day index of September 13 has a vertical length of three content items.

If no content is present, the controller 12 displays no dates in the day index. As shown in FIG. 12, no content items are present between August 28 and September 12, and the controller 12 displays the content item on August 28 and the content items on September 12 next to each other. This arrangement prevents blank areas from being caused in the deview-format life time calendar even if many dates are without content.

If a plurality of content items is present on a date like September 13 as shown in FIG. 12, the controller 12 displays the content items in accordance with the priority order. As one example, the priority order in the displaying of the content items is set as described below.

If a plurality of content items of the same date is different in time information (time of each content item of the same date is different), the controller 12 arranges the content items in the following order:
1. birthday content,
2. schedule content for all day long, and
3. photographing time (storage time) of still image content/ start time of schedule/reception time of received e-mail content/transmission time of transmitted e-mail content.

If a plurality of content items of the same date has the same time information, the controller 12 arranges the content items in the following order:
1. still image content,
2. received e-mail content,
3. transmitted e-mail content, and
4. schedule content.

If a plurality of content items has the time information indicating the same time, the controller 12 arranges and displays the content items in the order that is applied in the application program for reproducing the content items. If a plurality of schedule content items for all day long is present, the controller 12 arranges and displays the schedule content items in the order of registration in the schedule book (i.e., in the registration order from new to old). If a plurality of schedule content items having the same start time is present, the controller 12 arranges and displays the schedule content items in the order of registration in the schedule book (i.e., in the registration order from new to old). If a plurality of birthday content items of the same day is present, the controller 12 arranges and displays the birthday content items in the order of registration in the telephone book (i.e., in the registration order in the telephone book). If the date of the birthday content item of a person registered in the telephone book is identical the date of the user birthday content item registered in the personal information registration box (birthday content item of the user himself), the controller 12 places a priority to the date of the user birthday content item registered in the personal information registration box.

The controller 12 indicates the content of each content item by displaying the following metadata.

To display the "birthday content," the controller 12 display a user name, a birthday content icon (an icon of an image of a birthday cake with candles standing thereon), a frame image (an image serving as an outline of the user name), and a thumbnail image of the user registered in the telephone book.

To display the "still image content," the controller 12 displays photographing time/storage time, a thumbnail image, a management title, a file-type icon, and a source icon.

To display the "received e-mail content," the controller 12 displays a received e-mail icon, reception time, a from icon, transmission source name/transmission source address, an attached data icon, a transmission source image registered in the telephone book, a subject icon, and subject data.

To display the "transmitted e-mail content," the controller 12 displays a transmitted mail icon, transmission time, a to icon, destination name/destination address, a plural-person icon, an attached data icon, a destination image registered in the telephone book, a subject icon, and subject data.

To display the "schedule content," the controller 12 displays a schedule icon, start time of a schedule, a type icon, data representing schedule summary/content, an alarm icon, and data indicating alarm ON/OFF setting.

As shown in FIG. 12, the controller 12 displays the content items on date September 13 in the above-described priority order, i.e., the birthday content, the schedule content, and the still image content in that order. When the birthday content is displayed, the controller 12 displays the birthday icon of an image of a cake with candles standing thereon and a frame image as a display outline, and further a user name "Williams" in the center of the frame image. Upon viewing the deview-format life time calendar, the user can immediately recognize that September 13 is Williams's birthday.

To display the schedule content, the controller 12 displays the start time of a schedule such as "18:46," an image of a calendar and a pencil as a schedule icon, an image of a cocktail glass as a type icon indicating the type of the schedule, schedule summary/content data such as "lunch with Smith in the Fifth Avenue," an image of a bell as an alarm icon, and data indicating the alarm ON/OFF setting. Upon viewing the deview-format life time calendar, the user can immediately recognize that he is going to have lunch with Smith in the Fifth Avenue from 18:46 on September 13.

When a character string is displayed, the controller 12 truncates the character string to the predetermined number of characters. The text reading "lunch with Smith in the Fifth Avenue" can be incomplete. The character size may be contracted so that a full text may be displayed or the text may be scrolled using the cross key 24.

To display the still image content, the controller 12 displays the photographing time/storage time such as "13:00," a still image icon indicating that the content is a still image item, a thumbnail image of the still image content, a management title such as "taking a walk with the dog," a file-type icon indicating a file type and a file size, and a source icon indicating that the still image content has been photographed by the camera 8. Upon viewing the deview-format life time calendar, the user can immediately recognize that a still image content item photographed at September 13, 3:00 during a walk with the dog is present.

If a plurality of users, for example, Williams and Johnson, have the same birthday, September 13 registered in the telephone book and the personal information registration box, the controller 12 displays the birthday content of Williams and Johnson on the display area of September 13. Similarly, if there is a plurality of still image content items on September 13, the controller 12 arranges and displays the still image content items in the order of photographing time.

The user can check roughly the "content" of a desired content item because the content of the desired item is displayed when the screen is switched from calendar-format life time calendar to the deview-format life time calendar.

In step S31 of FIG. 11, the list display screen of the deview-format life time calendar is displayed. The controller 12 proceeds to step S32. In step S32, the controller 12 monitors the operational status of the operation unit 6, thereby determining whether the display screen is switched.

The display screen of the deview-format life time calendar includes the "list display screen" of FIG. 12 and the "thumbnail display screen" of FIG. 13. The user can switch the screen switching by pressing the first soft key 26 of FIG. 2. In step S32, the controller 12 thus determines whether the screen switching is performed by determining whether the first soft key 26 has been pressed. If it is determined in step S32 that the first soft key 26 has been pressed, processing proceeds to step S37. If it is determined in step S32 that the first soft key 26 has not been pressed, processing proceeds to step S33.

In step S37, the controller 12 switches the display screen from the list display screen of FIG. 12 to the thumbnail display screen of FIG. 13.

When the deview-format life time calendar is displayed in the thumbnail display screen, the controller 12 displays the presence of each content item mainly by the thumbnail image and the icon. FIG. 13 illustrates the deview-format life time calendar in the thumbnail display screen. If an e-mail content item received September 12, 8:31 is present as shown in FIG. 13, the controller 12 searches the telephone book for a user as a source of the received e-mail, and displays the thumbnail image of another user on the display area of September 12. The reception time and the received e-mail icon are displayed on the thumbnail image. Upon viewing the deview-format life time calendar in the thumbnail image, the user recognizes the presence of the received e-mail content item received September 12, 8:31, from the other user represented by the thumbnail image.

If a birthday content item of a user who has the birthday on September 13 is present, the controller 12 searches the telephone book for the thumbnail image of the user having the birthday on September 13, and displays the thumbnail image on the display area of September 13. The controller 12 also displays the birthday icon on the thumbnail image. Upon viewing the deview-format life time calendar in the thumbnail display screen, the user immediately recognizes that September 13 is the birthday of another user represented by the thumbnail image.

If a schedule content item having the start time at September 13, 18:46 is present, the controller 12 displays a type icon of that schedule on the display area on September 13. The controller 12 displays on the type icon the start time of the schedule and a schedule icon indicating that the content is the schedule content. Upon viewing the thumbnail display screen, the user recognizes that the schedule represented by the type icon is planned at September 13, 18:46.

If a still image content item photographed at September 13, 13:00 is present, the controller 12 displays a thumbnail image of the still image content item on the display area of September 13. The controller 12 displays on the thumbnail image the photographing time and a still image icon indicating that the content is a still image. Upon viewing the thumbnail image, the user recognizes that a still image content item photographed at September 13, 13:00 is present.

If the thumbnail image of the user corresponding to the birthday content is registered in neither the telephone book nor the personal information registration box, the controller 12 displays the user name registered in the telephone book or the personal information registration box instead of the thumbnail image.

If the thumbnail image of the user corresponding to the received and transmitted e-mail content items is not registered in the telephone book, the controller 12 displays the user name registered in the telephone book instead of the thumbnail image.

If the type icon indicating the type of the schedule content is not registered in the schedule book, the controller 12 displays only the start time of the schedule and the schedule icon.

The list display screen of FIG. 12 shows the thumbnail image, the icon, and the title representing each content item, thereby permitting the user to recognize roughly the content of each content item. The list display screen of FIG. 12 is unable to show many content items at a time. The thumbnail display screen of FIG. 13 shows the content items using the thumbnail image and the icon, thereby permitting many content items to be displayed at a time.

If it is determined in step S32 in the flowchart of FIG. 11 that no screen switching between the list display screen and the thumbnail display screen is detected, processing proceeds to step S33. The controller 12 determines whether the focusing area is shifted to the day index.

When the controller 12 detects the pressing of the second soft key 27 with any content item being in focus in the dieview-format life time calendar in the list display screen, processing proceeds to step S39. The controller 12 shifts the focusing area to the date in the day index corresponding to the in-focus content.

Upon detecting the pressing of the second soft key 27 with the focusing area staying on the birthday content of Williams of FIG. 12, the controller 12 focuses on September 13 as the date on the day index showing the birthday content of Williams. If the date on the day index is set to be in focus, the focusing area shifting by day can be performed.

When the focusing area shifting is performed by day, the user shifts the focusing area to the day index and then presses the upper or lower portion of the cross key 24. In step S40, the controller 12 detects the pressing of the upper or lower portion of the cross key 24. Upon detecting the pressing of the upper or lower portion of the cross key 24, the controller 12 shifts the focusing area on the day index by day.

Upon detecting the upper portion of the cross key 24 with the focusing area staying on the 13th day on the day index in FIG. 12, the controller 12 successively shifts the focusing area on the dates on the day index from 13th day, to 12th day, to August 28th day, to August 27th day, . . . in that order.

Upon detecting the lower portion of the cross key 24 with the focusing area staying on the 13th day on the day index in FIG. 12, the controller 12 successively shifts the focusing area on the dates on the day index from 13th day, to 14th day, to 15th day, . . . in that order.

The content items displayed in the dieview-format life time calendar are thus updated by day.

In the cellular phone of one embodiment of the present invention, the entry key 25 is designed to be pressed in order to return the focusing area moving around the day index back to the display area of the content items. In step S42, the controller 12 monitors a return operation. When the entry key 25 is pressed, the controller 12 proceeds to step S43. The focusing area is thus shifted from the day index top the display area of each content item.

If it is determined in step S33 that the shifting of the focusing area to the day index is not detected, the controller 12 proceeds to step S34 to determine whether the focusing area shifting has been performed. The focusing area focusing on the display area of each content item can be shifted in response to the pressing of the upper or lower portion of the cross key 24. In step S34, the controller 12 monitors the pressing of the upper or lower portion of the cross key 24. Upon detecting the pressing of the upper or lower portion of the cross key 24, the controller 12 proceeds to step S38. In response to the detection of the upper or lower portion of the cross key 24, the controller 12 shifts the focusing area by content item.

The controller 12 might detect the pressing of the upper portion of the cross key 24 with the birthday of Williams' being in focus as shown in FIG. 12. The controller 12 then shifts the focusing area from the birthday content of Williams' to the e-mail content received from Williams to the transmitted e-mail content transmitted to Johnson . . . in that order by content item.

The controller 12 might detect the pressing of the lower portion of the cross key 24 with the birthday of Williams' being in focus as shown in FIG. 12. The controller 12 then shifts the focusing area from the schedule content having a title of "lunch with Smith in the Fifth Avenue" to a still image content item having a title "taking a walk with the dog" to a birthday content of Smith, . . . in that order by content item.

The dieview-format life time calendar shows roughly the "content" of each content item. To view the "detailed content" of a desired content item, the user shifts the focusing area by day or by content item as described above, and presses the entry key 25 with the focusing area focusing the desired content item. In step S35 of FIG. 11, the controller 12 determines whether the entry key 25 has been pressed. More specifically, in step S35, the controller 12 determines whether the entry key 25 has been pressed to display the detailed content of the in-focus content item or reproduce the in-focus content. If it is determined in step S35 that the entry key 25 has been pressed, processing proceeds to step S36. The controller 12 starts an application program dedicated to the in-focus content item from the memory 11, processes the in-focus content item in accordance with the application program, and thus completes the entire process illustrated in the flowchart of FIG. 11.

More specifically, upon detecting the pressing of the entry key 25 with the focusing area focusing on the still image content in the dieview-format life time calendar, the controller 12 starts the camera control program stored on the memory 11, and displays the still image content on the display 5 using the viewer function of the camera control program. In this way, the user can recognize the detail content of the still image content item selected in the dieview-format life time calendar.

When the pressing of the entry key 25 is detected with the focusing area focusing on one of the received e-mail content item and the transmitted e-mail content item in the dieview-format life time calendar, the controller 12 starts the e-mail management program stored on the memory 11, and displays the body of one of the received e-mail content item and the transmitted e-mail content item in accordance with the e-mail management program. The user can thus recognize the detail content of the received e-mail content item and the transmitted e-mail content item selected in the dieview-format life time calendar.

Similarly, when the pressing of the entry key 25 is detected with the focusing area focusing on the schedule content in the dieview-format life time calendar, the controller 12 starts the schedule management program stored on the memory 11, and displays the content of the schedule content item in accordance with the schedule management program. The user can thus recognize the detail content of the schedule content item selected in the dieview-format life time calendar.

Similarly, when the pressing of the entry key 25 is detected with the focusing area focusing on the birthday content in the dieview-format life time calendar, the controller 12 displays on the display 5 the user registration box corresponding to the birthday content stored in the telephone book on the memory 11 or the personal information registration box of the user in the cellular phone. In this way, the telephone number and the e-mail address of the user corresponding to the birthday content are displayed on the display 5. Via telephone or e-mail, the user can easily contact a friend of the user's.

In the above discussion, the controller 12 starts the application program corresponding to the desired content when the entry key 25 is pressed with the focusing area focusing on the desired content on the dieview-format life time calendar in the list display screen. The same is true of the dieview-format life time calendar in the thumbnail display screen. More specifically, upon detecting the pressing of the entry key 25 with the thumbnail display screen of FIG. 13 presented, the controller 12 starts the application program corresponding to the content being in focus on the thumbnail display screen. The user can recognize the detailed content of the in-focus content item in the thumbnail display screen as in the list display screen.

The display area of a date, such as September 9, having no content remains blank as shown in FIG. 5. The entry key 25 might be pressed with the focusing area shifted to the date having no content in the calendar-format life time calendar. In such as case, the controller 12 displays a "new schedule production content item" to be discussed below.

Figure 14:
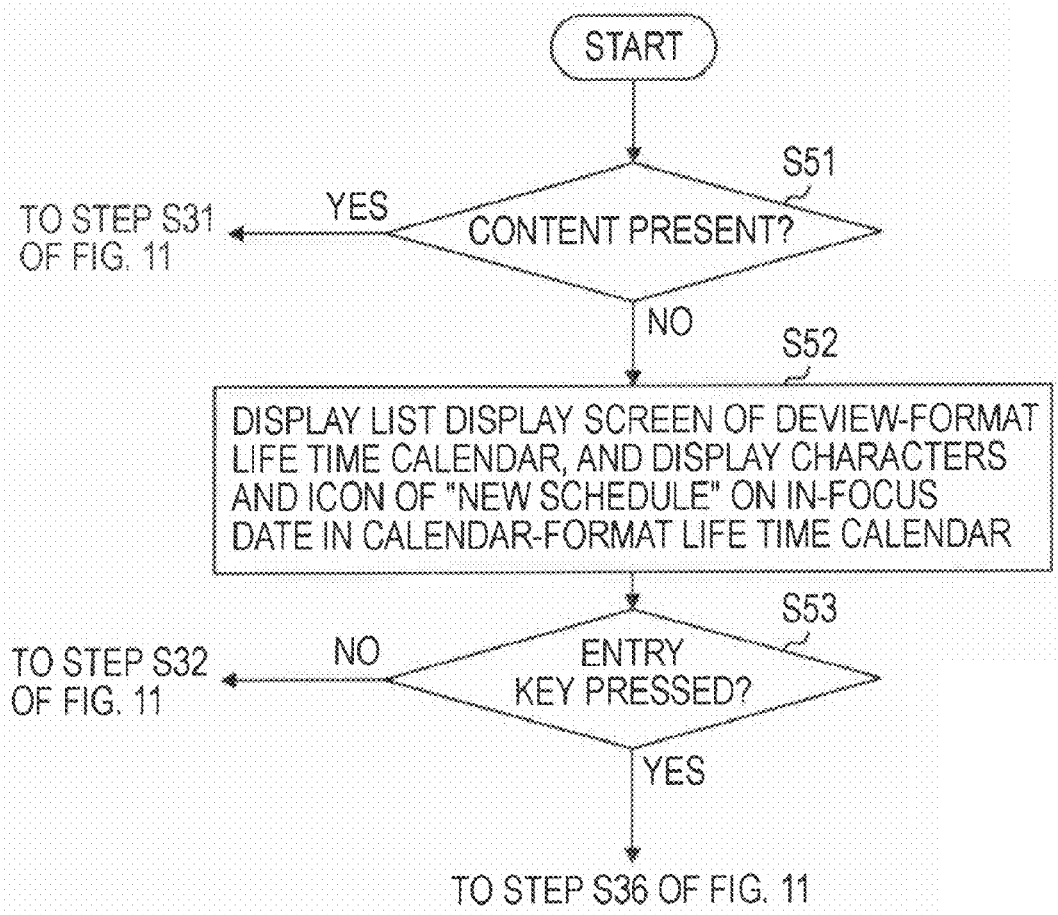
FIG. 14 is a flowchart illustrating a display process in which a new schedule content item is displayed in the deview-format life time calendar when a date having no content is selected in the calendar-format life time calendar.

FIG. 14 is a flowchart illustrating a display process of the new schedule production content item. The display process is started in accordance with the life time calendar application program when the controller 12 detects the pressing of the entry key 25 with the focusing area focusing on any date in the calendar-format life time calendar.

In step S51, the controller 12 determines whether there is a content item corresponding to a date selected in the calendar-format life time calendar (an in-focus date). If it is determined in step S51 that any content item corresponding to the date being in focus is present in the calendar-format life time calendar, the controller 12 proceeds to step S31 in the flowchart of FIG. 11 to display the deview-format life time calendar in the list display screen on the display 5.

Figure 15:
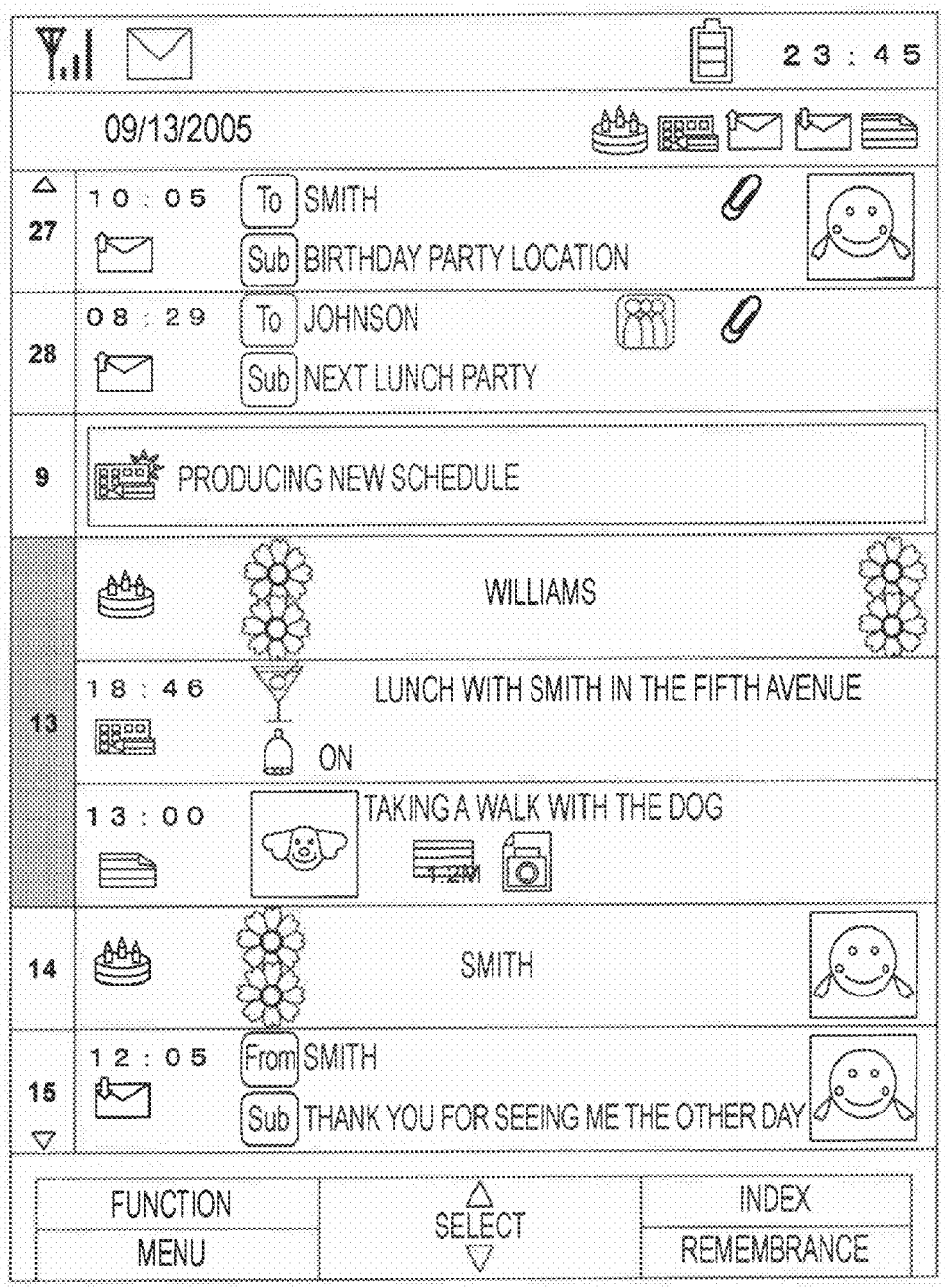
FIG. 15 illustrates the deview-format life time calendar in the list display screen displaying the new schedule content.

If it is determined in step S51 that there is no content item corresponding to the in-focus item in the calendar-format life time calendar, the controller 12 proceeds to step S52. As shown in FIG. 15, the controller 12 displays the deview-format life time calendar in the list display screen on the display 5. The controller 12 newly arranges in the deview-format life time calendar a display area of the in-focus date in the calendar-format life time calendar, and displays a text message "producing new schedule" and an icon on the newly arranged the display area.

In the case of the deview-format life time calendar, the controller 12 does not display the display area of any date having no content. When a date having no content is selected in the calendar-format life time calendar, the controller 12 arranges a display area of the date having no content in the deview-format life time calendar, displays the text message "producing new schedule" and the icon, and then focuses on the display area.

As shown in FIG. 15, Sep. 9, 2005 having no content is selected in the calendar-format life time calendar. The display area is newly arranged for Sep. 9, 2005 in the deview-format life time calendar, and then the text message "producing new schedule" and the icon are then displayed in the display area.

In step S53, the controller 12 determines whether the entry key 25 has been pressed with the focusing area focusing on the display area having the text message "producing new schedule" and the icon. The pressing of the entry key 25 means that the user desires to register a new schedule on the date having no content. The controller 12 thus proceeds to step S36 in the flowchart of FIG. 11, thereby starting the schedule management program. A new schedule production screen is thus displayed. The user can thus register the new schedule in the schedule book. The controller 12 then displays a schedule content item of the newly registered schedule in the calendar-format life time calendar or the deview-format life time calendar.

Figure 16:
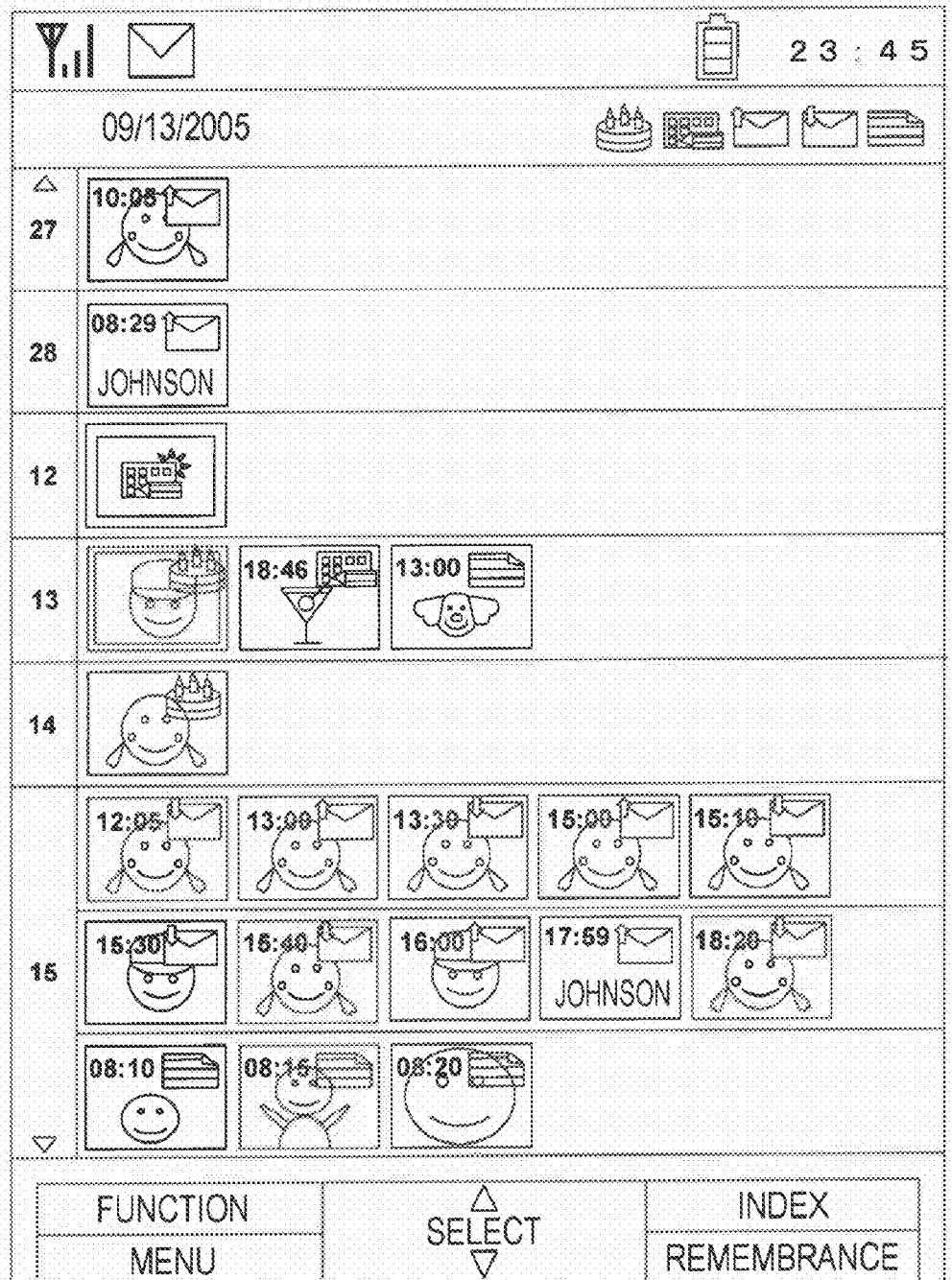
FIG. 16 illustrates the deview-format life time calendar in a thumbnail display screen displaying the new schedule content.

Even when the display screen is switched from the list display screen to the thumbnail display screen, the text message "producing new schedule" is displayed. More specifically, after displaying the text message "producing new schedule" and the icon in the deview-format life time calendar in the list display screen, the controller 12 detects the display screen switching to the thumbnail display screen in step S32 in the flowchart of FIG. 11. In step S37, the controller 12 displays the thumbnail display screen having the display area of the corresponding date corresponding to only the icon for the text message "producing new schedule" as shown in FIG. 16.

As shown in FIG. 15, the text message "producing new schedule" and the icon are displayed in the list display screen. In the thumbnail display screen, however, only the icon indicating that the content is a newly produced schedule content item is displayed as shown in FIG. 16.

The pressing of the entry key 25 might be detected with the focusing area focusing on the "producing new schedule" icon in the thumbnail display screen. The controller 12 proceeds to step S36 in the flowchart of FIG. 11. The controller 12 then starts the schedule management program, thereby displaying the new schedule production screen. The user registers the new schedule on the new schedule production screen displayed in accordance with the schedule management program. The controller 12 displays the schedule content of the newly registered schedule when one of the calendar-format life time calendar and the deview-format life time calendar is displayed.

Figure 17:
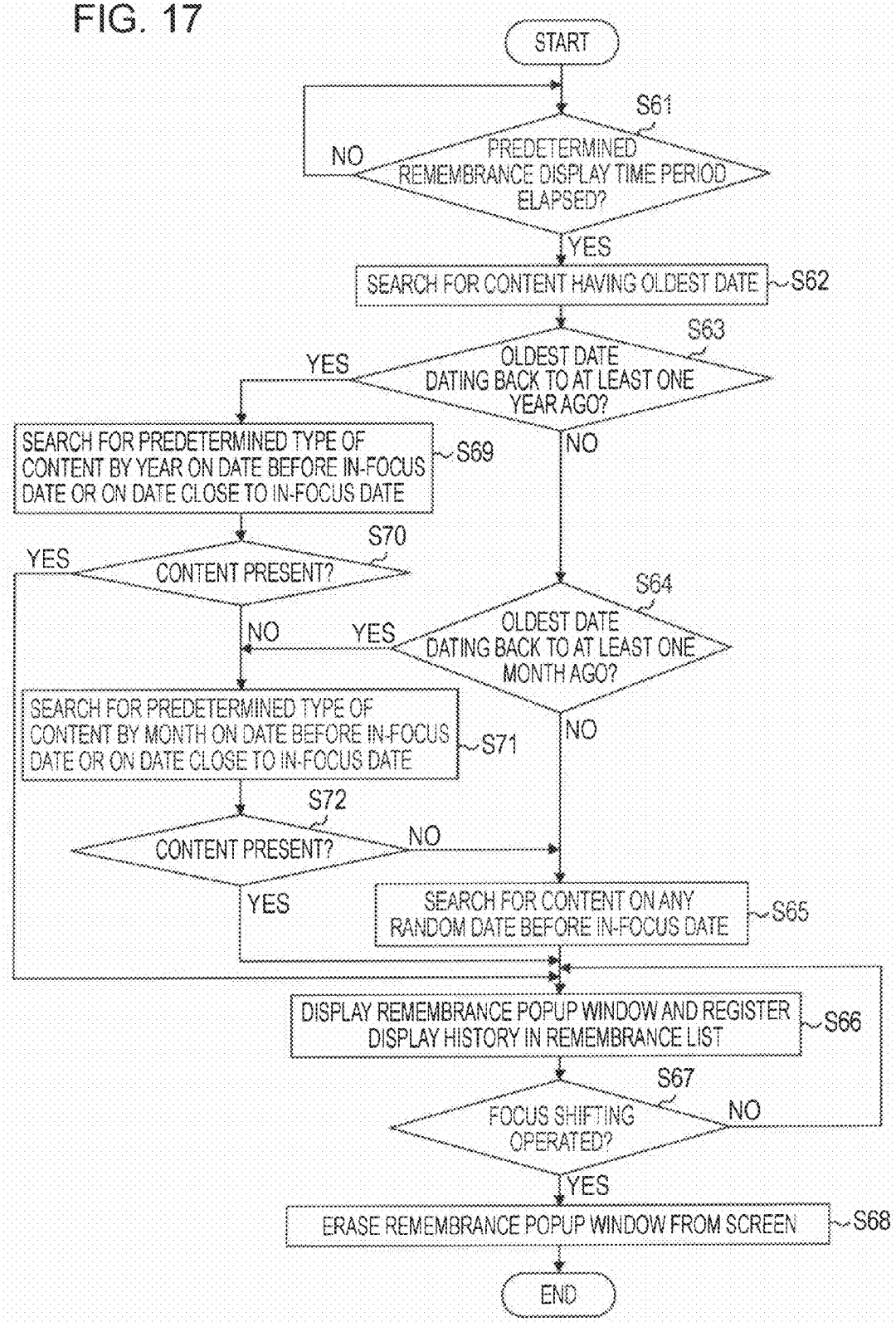
FIG. 17 is a flowchart illustrating a remembrance popup display process of the cellular phone in accordance with one embodiment of the present invention.

When any date is in focus for a predetermined time or longer in one of the calendar-format life time calendar and the deview-format life time calendar, the controller 12 displays a content item on a date before the in-focus date (in remembrance popup display function). FIG. 17 is a flowchart of a remembrance popup display function.

The controller 12 performs the process illustrated in the flowchart of FIG. 17 in accordance with the life time calendar application program stored on the memory 11. The controller 12 starts the process at the detection of the start of the stay-put period of the focusing area focusing on the display area of any date in the calendar-format life time calendar discussed with reference to FIG. 5, or at the detection of the start of the focusing area stay-put period of the focusing area focusing on the display area of any date in the deview-format life time calendar. In other words, the controller 12 starts the process illustrated in the flowchart of FIG. 17 when the controller 12 detects the start of the stay-put period of the focusing area staying put on any date in one of the calendar-format life time calendar and the deview-format life time calendar.

In step S61, the controller 12 reads a predetermined remembrance display time from the memory 11, and counts, in accordance with the timing information measured by the timer 10, time that has elapsed since the detection of the focusing area stay-put period. The controller 12 thus determines whether the counted time has exceeded the predetermined remembrance display time.

In the cellular phone of one embodiment of the present invention, the controller 12 can set time to the remembrance popup display from the "fast/standard/slow" pulldown menu as discussed with reference to FIG. 4A. When the fast setting is selected, the controller 12 displays the remembrance popup window about 5 seconds after the detection of the stopping of the focusing area shifting. When the standard setting is selected, the controller 12 displays the remembrance popup window about 7.5 seconds after the detection of the stopping of the focusing area shifting. When the slow setting is selected, the controller 12 displays the remembrance popup window about 10 seconds after the detection of the stopping of the focusing area shifting.

When the "fast" setting is selected, the controller 12 determines in step S61 whether "5 seconds" have elapsed since the detection of the stopping of the focusing area shifting. When the "standard" setting is selected, the controller 12 determines in step S61 whether "7.5 seconds" have elapsed since the detection of the stopping of the focusing area shifting. When the "slow" setting is selected, the controller 12 determines in step S61 whether "10 seconds" have elapsed since the detection of the stopping of the focusing area shifting. The controller 12 proceeds to step S62 when the time elapse from the detection of the stopping of the focus area shifting has reached the predetermined remembrance display time.

In step S62, the controller 12 searches the memory 11 for a content item having oldest time information (having the oldest date) from among a variety of content items. Processing proceeds to step S63.

In step S63, the controller 12 compares the time information attached to the content having the oldest date detected in step S62 with the time information indicating the present date acquired from the timer 10. The controller 12 thus determines whether the oldest date of the content detected in step S62 is at least one year or more before the present date. If it is determined in step S63 that the oldest date of the content detected in step S62 is at least one year or more before the present date, processing proceeds to step S69. If it is determined in step S63 that the oldest date of the content detected in step S62 is within one year old from the present date, processing proceeds to step S64.

In step S69, the controller 12 searches the memory 11 for a content item of a predetermined type on a date one year before the in-focus date or a date close to the date one year before the in-focus date in one of the calendar-format life time calendar and the deview-format life time calendar. If it is determined in step S69 that a content item of a predetermined type on a date one year before the in-focus date or a date close to the date one year before the in-focus date is not detected from the memory 11, the controller 12 searches the memory 11 for a content item of a predetermined type on a date two years before the in-focus date or a date close to the date two years before the in-focus date.

In the cellular phone of one embodiment of the present invention, the content items are displayed in the remembrance popup display function with the following priority order:
1. the still image content photographed by the camera 8,
2. one of the received e-mail content and transmitted e-mail content protected,
3. the schedule content,
4. the still image content downloaded via a network, and
5. one of the received e-mail content and transmitted e-mail content unprotected.

The controller 12 searches the memory 11 for a variety of content items in accordance with this priority order when the remembrance popup displaying is performed.

The content detection process performed in step S69 is described more in detail below. The controller 12 detects the presence or absence of a content item on a date one year before the in-focus date. If any content item on the date one year before the in-focus date cannot be detected, the controller 12 detects the presence or absence of a content item on a date two years before the in-focus date. In this way, the controller 12 detects the presence or absence of a content item year by year in retrospect until the year to which the oldest content item belongs.

For example, a content item dated Jul. 10, 2003 may be detected as the oldest content item, and the in-focus date in one of the calendar-format life time calendar and the deview-format life time calendar may be Sep. 13, 2005. The controller 12 searches the memory 11 for a content item on Sep. 13, 2004, one year before the in-focus date.

If there is no content item on the date one year before the in-focus date, the controller 12 cannot detect any content on the date one year before the in-focus date. The controller 12 then searches the memory 11 for a content item falling within a date range one week before to one week after the date one year before the in-focus date, namely, Sep. 13, 2004 (i.e., September 6 through Sep. 12, 2004 and September 14 through Sep. 20, 2004).

If no content is detected in these dates one year before the in-focus date, the controller 12 searches the memory 11 for a content item on a date two years before the in-focus date, namely, Sep. 13, 2003.

If there is no content item on the date two years before the in-focus date, the controller 12 cannot detect any content on the date two years before the in-focus date. The controller 12 then searches the memory 11 for a content item falling within a date range one week before to one week after the date two years before the in-focus date, namely, Sep. 13, 2003 (i.e., September 6 through Sep. 12, 2003 and September 14 through Sep. 20, 2003).

In this way, the controller 12 detects the presence or absence of a content item year by year in retrospect until the year to which the oldest content item belongs.

In step S70, the controller 12 determines the presence or absence of each content item by year. When the controller 12 detects a content item of a predetermined type, processing proceeds to step S66. If the controller 12 fails to detect a content item of a predetermined type, processing proceeds to step S71.

If it is determined in step S63 that the oldest date is not one year older than the in-focus date, the controller 12 determines whether the oldest date is at least one month older than the in-focus date. If it is determined in step S64 that the oldest date is at least one month older than the in-focus date, processing proceeds to step S71. If it is determined in step S64 that the oldest date is not older than the in-focus date by one month, processing proceeds to step S65.

If it is determined in step S64 that the oldest date is at least one month old, or if no corresponding content is detected in the content detection by one year in steps S69 and S70, the controller 12 detects a content item by month in step S71.

In step S71, the controller 12 detects the presence or absence of a content item on a date one month before the in-focus date. If no content is detected on the date one month older that the in-focus date, the controller 12 then searches for a content item on a date two months before the in-focus date. In this way, the controller 12 detects any content item in retrospect month by month until the date to which the oldest content item belongs to.

A content item dated Nov. 10, 2004 might be detected as the one having the oldest date, and an in-focus date in one of the calendar-format life time calendar and the deview-format life time calendar might be Sep. 13, 2005. The controller 12 searches the memory 11 for a content item falling on a date one month before the in-focus date, namely, Aug. 13, 2005, and falling within a day range extending from one week before August 13 to Aug. 13, 2005 (August 6 through Aug. 12, 2005), and a day range extending from August 13 to one week after Aug. 13, 2005 (August 14 through Aug. 20, 2005).

If no content item is detected in these day ranges one month before, the controller 12 searches the memory 11 for a content item falling on a date two months before the in-focus date, namely, Jul. 13, 2005, and falling within a day range extending from one week before July 13 to Jul. 13, 2005 (July 6 through Jul. 12, 2005), and a day range extending from July 13 to one week after Jul. 13, 2005 (July 14 through Jul. 20, 2005).

The controller 12 detects the presence or absence of a content item in retrospect month by month until the month to which the oldest content item belongs. In step S72, the controller 12 detects the presence or absence of any content item detected by month. If a content item of any predetermined type is detected, processing proceeds to step S66 at the detection timing. If it is determined in step S72 that no content item is detected, processing proceeds to step S65.

If it is determined in step S64 that the oldest date is within one month old, or if no corresponding content is detected in the content search by month in steps S71 and S72, processing proceeds to step S65. In step S65, the controller 12 determines any date between the oldest date and the in-focus date using a random number, and detects the content item on the determined date. Processing proceeds to step S66.

In step S66, the controller 12 displays in the popup display window any content item that might be detected in the detection process by year, by month, or randomly. The controller 12 also registers history information indicating the thus displayed content item in a remembrance list stored on the memory 11 of FIG. 1.

Figure 18:
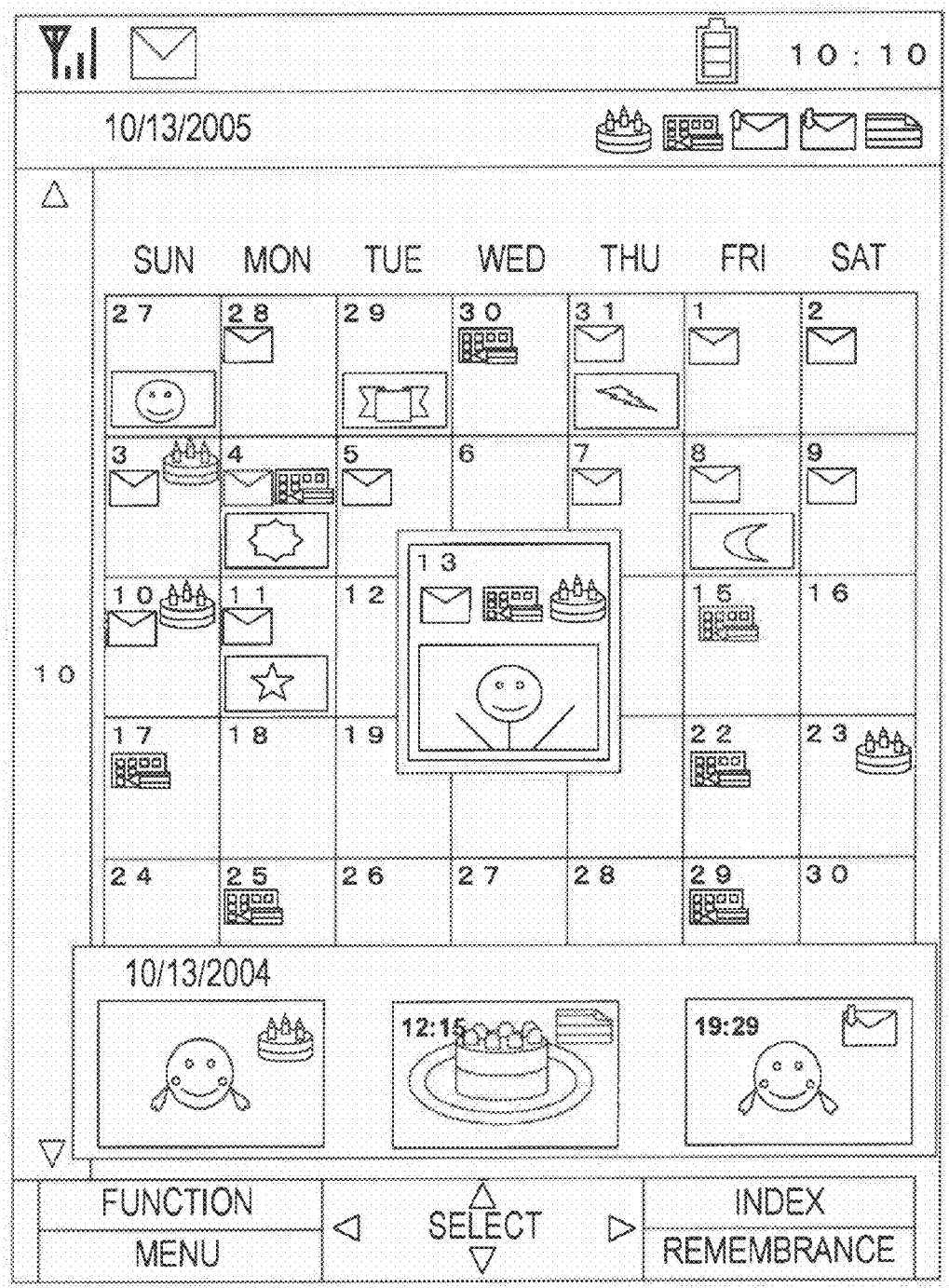
FIG. 18 illustrates a content display example displayed in a remembrance popup window in the calendar-format life time calendar.
Figure 19:
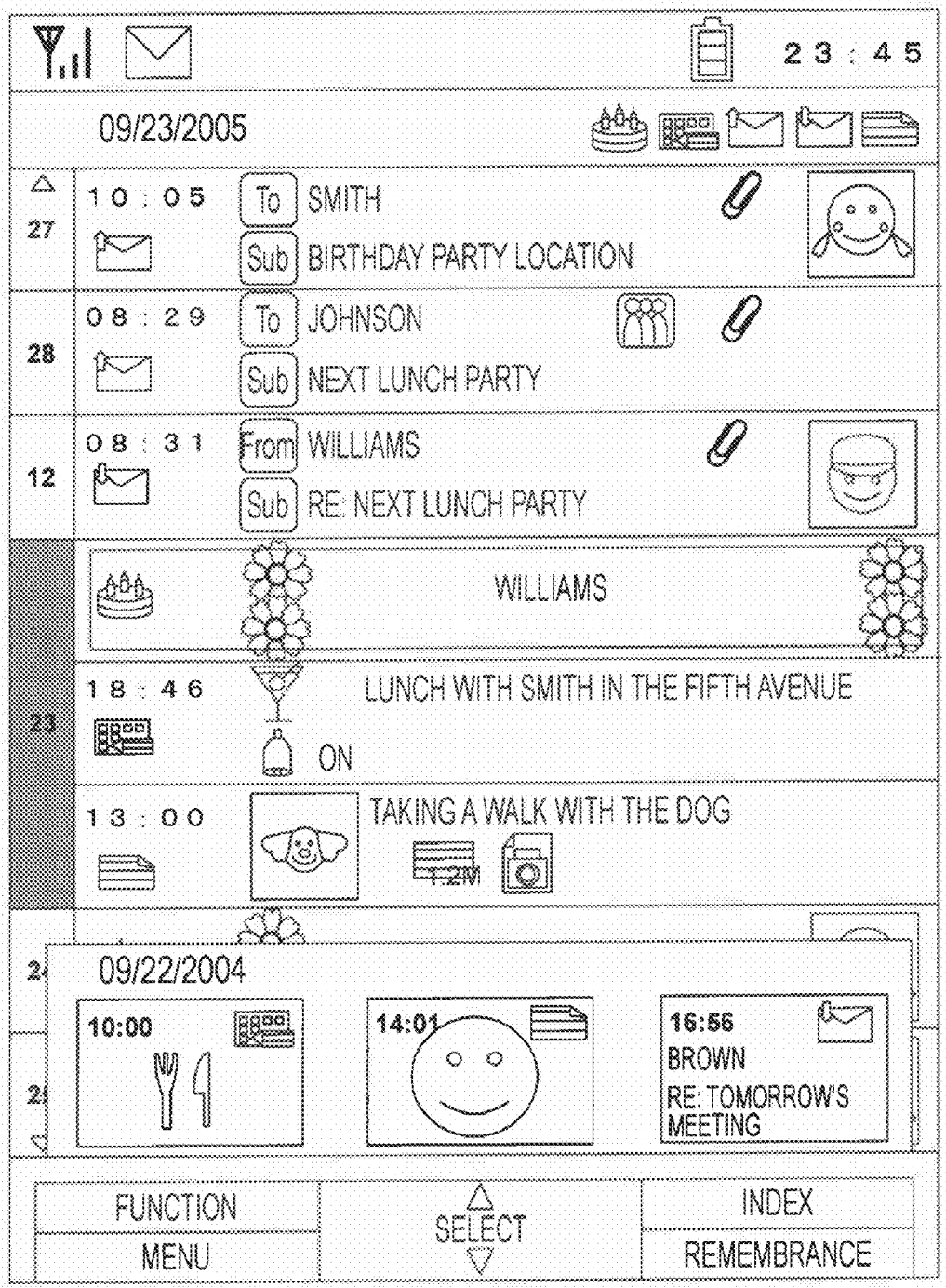
FIG. 19 illustrates a content display example displayed in the remembrance popup window on the deview-type life time calendar in the list display screen.
Figure 20:
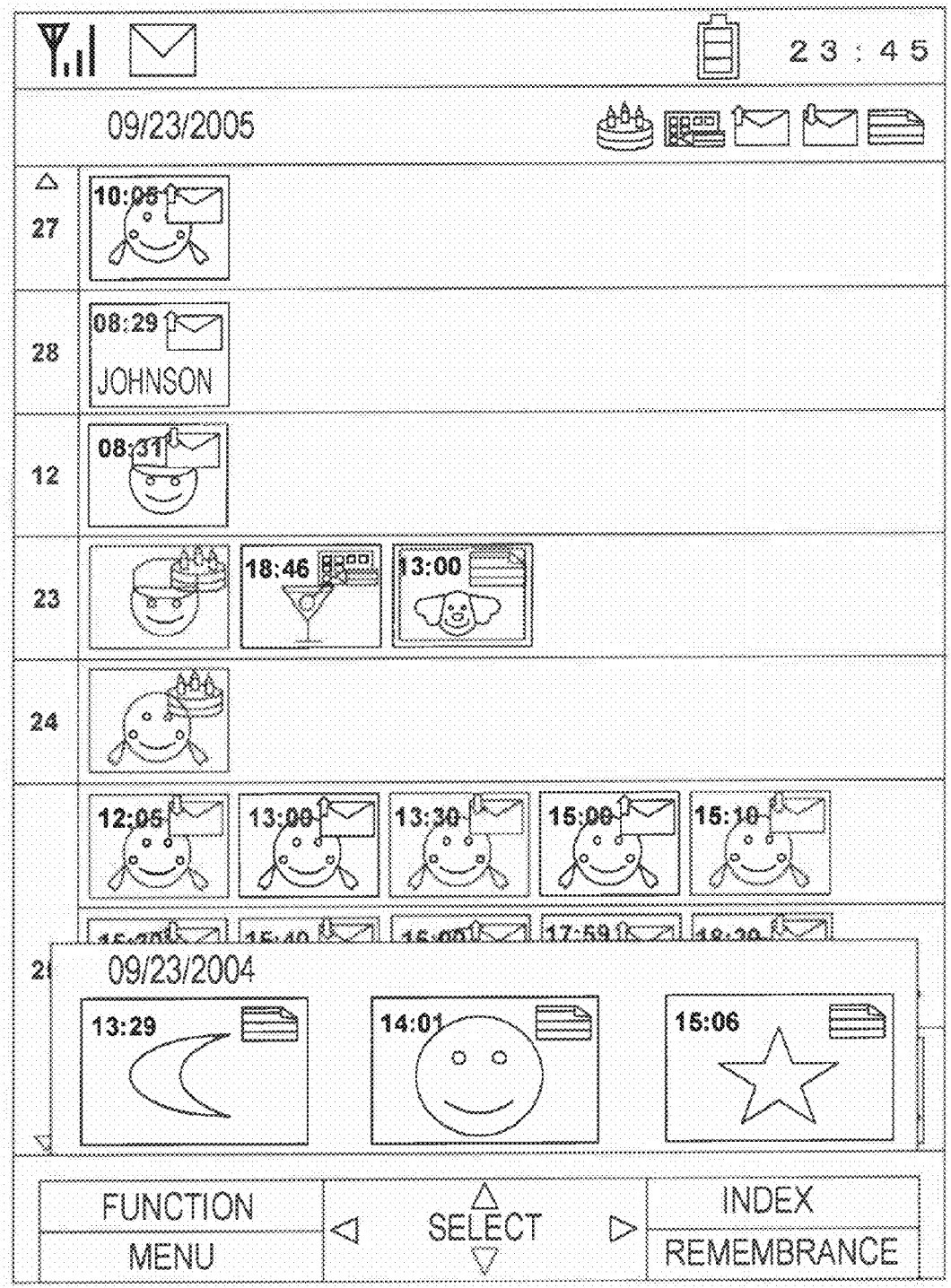
FIG. 20 illustrates a content display example displayed in the remembrance popup window on the deview-format life time calendar in the thumbnail display screen.

FIGS. 18 through 20 illustrate display examples of the content items displayed in a popup display. FIG. 18 illustrates a content item displayed in a popup display in the calendar-format life time calendar. As shown in FIG. 18, the focusing area focuses on October 13 (today) in the calendar-format life time calendar of October 2005. The controller 12 detects content items on Oct. 13, 2004 one year before Oct. 13, 2005.

FIG. 19 illustrates a display example of content items displayed in a popup display in the deview-format life time calendar in the list display screen. As shown in FIG. 19, the focusing area is focusing on a birthday content item on Sep. 23, 2005. The controller 12 detects and displays content items on Sep. 23, 2004 in a popup display.

If any content item is found in retrospect on Sep. 23, 2004 one year before Sep. 23, 2005, that content item should be displayed in a popup display. Since no such content item is present, a content dated Sep. 22, 2004 falling within one week range before and after Sep. 23, 2004 is displayed instead.

FIG. 20 illustrates a display example of content items displayed in a popup display in the deview-format life time calendar in the thumbnail display screen. As shown in FIG. 20, the focusing area is focusing on a thumbnail image of a still image content item dated Sep. 23, 2005. The controller 12 also displays content items dated Sep. 23, 2004 in a popup display.

The controller 12 displays such a remembrance popup window in a manner that the display area of the in-focus date is not hidden by the popup display. As shown in FIG. 18, the focusing area is focusing on the content items on October 13 displayed in the center of the display 5. The controller 12 displays the popup display in the lower portion of the display 5 (or in the upper portion of the display 5) in a manner not to hide the display area of the in-focus content items.

The controller 12 displays three content items horizontally across the display 5 in the remembrance popup display. As shown in FIG. 18, the controller 12 detects at least three content items In accordance with the content priority order, and thus displays a birthday content item, a still image content item (thumbnail image) photographed by the camera 8, and a protected received e-mail content item protected from left to right in the popup display area. If the number of content items is two or less, the controller 12 leaves a surplus portion of the display area blank.

If the number of detected content items is four or more, the controller 12 displays in the remembrance popup display a content item other than previously displayed content items. More specifically, as shown in FIG. 18, the controller 12 detects six still image content items dated Oct. 13, 2004, and displays threes of the six items in the remembrance popup display. The controller 12 then stores information relating to the three still image content items displayed in the remembrance popup display (such as identification information of each still image content item). When the content dated Oct. 13, 2004 is displayed in the remembrance popup display next time, the controller 12 displays the three content items in the remembrance popup display different from the three content items previously displayed. In this way, when the content on the same date is displayed in the remembrance popup display, displayed content items are set to be different from popup display to popup display.

In step S67 in the flowchart of FIG. 17, after the remembrance popup display, the controller 12 monitors the operational status of the operation unit 6 to determine whether the focusing area shifting operation is performed. The controller 12 continuously displays the content items in the remembrance popup display until the detection of the focusing area shifting operation. At the detection of the focusing area shifting operation, processing proceeds to step S68.

In step S68, the controller 12 erases the remembrance popup display because the focusing area shifting operation is detected. The entire process illustrated in the flowchart of FIG. 17 is thus completed. In other words, the remembrance popup display is continuously displayed while the focusing area remains stationary and is stopped at the detection of the focusing area shifting operation. In this way, the remembrance popup display is displayed only while the user stops shifting the focusing area. This arrangement eliminates the inconvenience that the remembrance popup display impedes the user operation.

Figure 21:
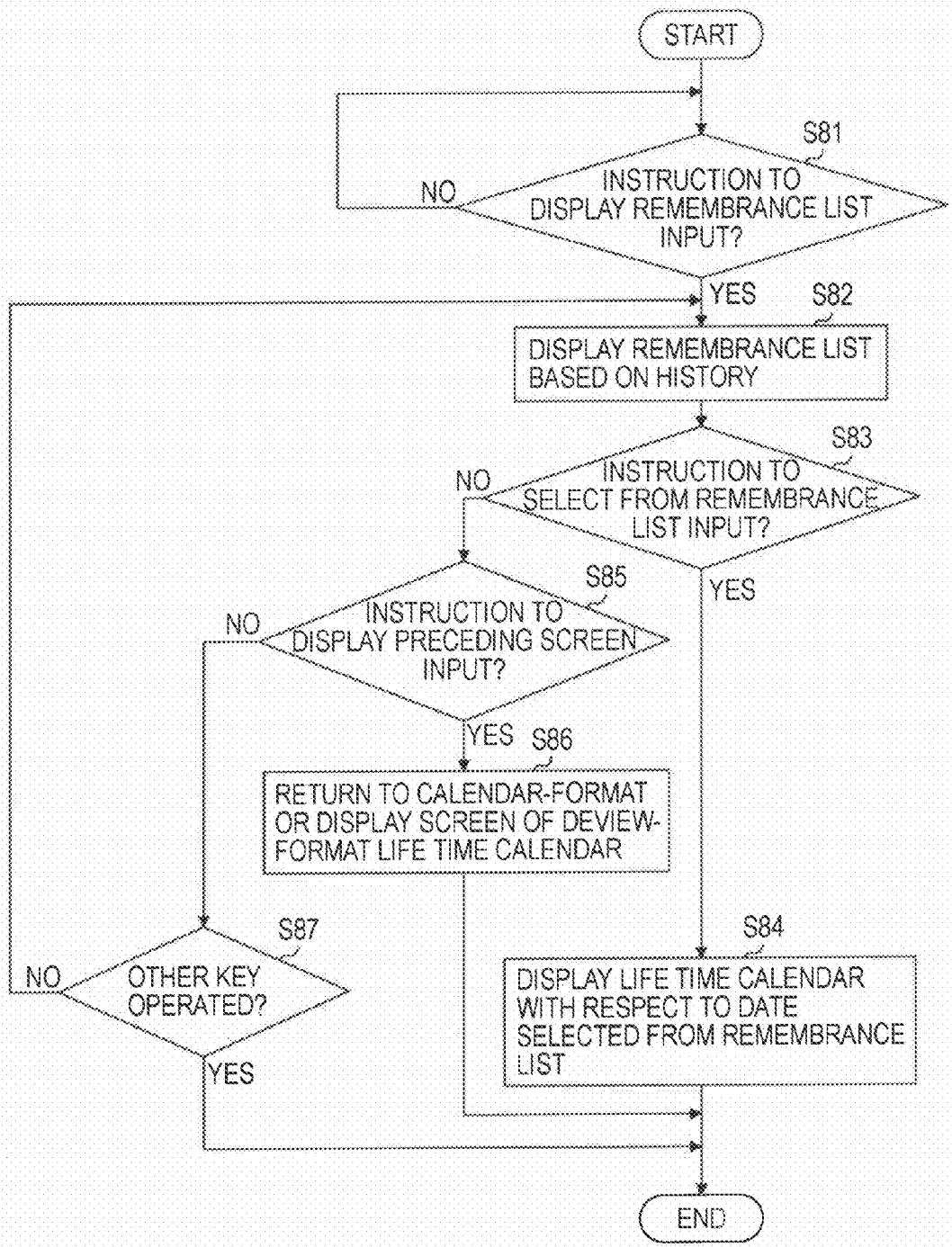
FIG. 21 is a flowchart illustrating a display process of a remembrance list in the cellular phone in accordance with one embodiment of the present invention.

As described above, information relating to the content displayed in the remembrance popup display is registered as history in the remembrance list on the memory 11 when the remembrance popup display is displayed. The remembrance list is displayed in response to a predetermined user operation. When a date of a desired content item is selected from the remembrance list, the controller 12 displays the deview-format life time calendar corresponding to the selected date. Such a process is illustrated in a flowchart of FIG. 21. The process illustrated in the flowchart of FIG. 21 is started in accordance with the life time calendar application program when the controller 12 displays one of the calendar-format life time calendar and the deview-format life time calendar on the display 5.

In step S81, the controller 12 monitors the operational status of the operation unit 6, thereby determining whether an instruction to display the remembrance list is issued. To display the remembrance list, the user presses the fourth soft key 29 of FIG. 2A when one of the calendar-format life time calendar and the deview-format life time calendar is displayed. In step S81, the controller 12 monitors the pressing of the fourth soft key 29 to determine whether the user has issued an instruction to display the remembrance list. At the detection of the pressing of the fourth soft key 29, processing proceeds to step S82.

Figure 22:
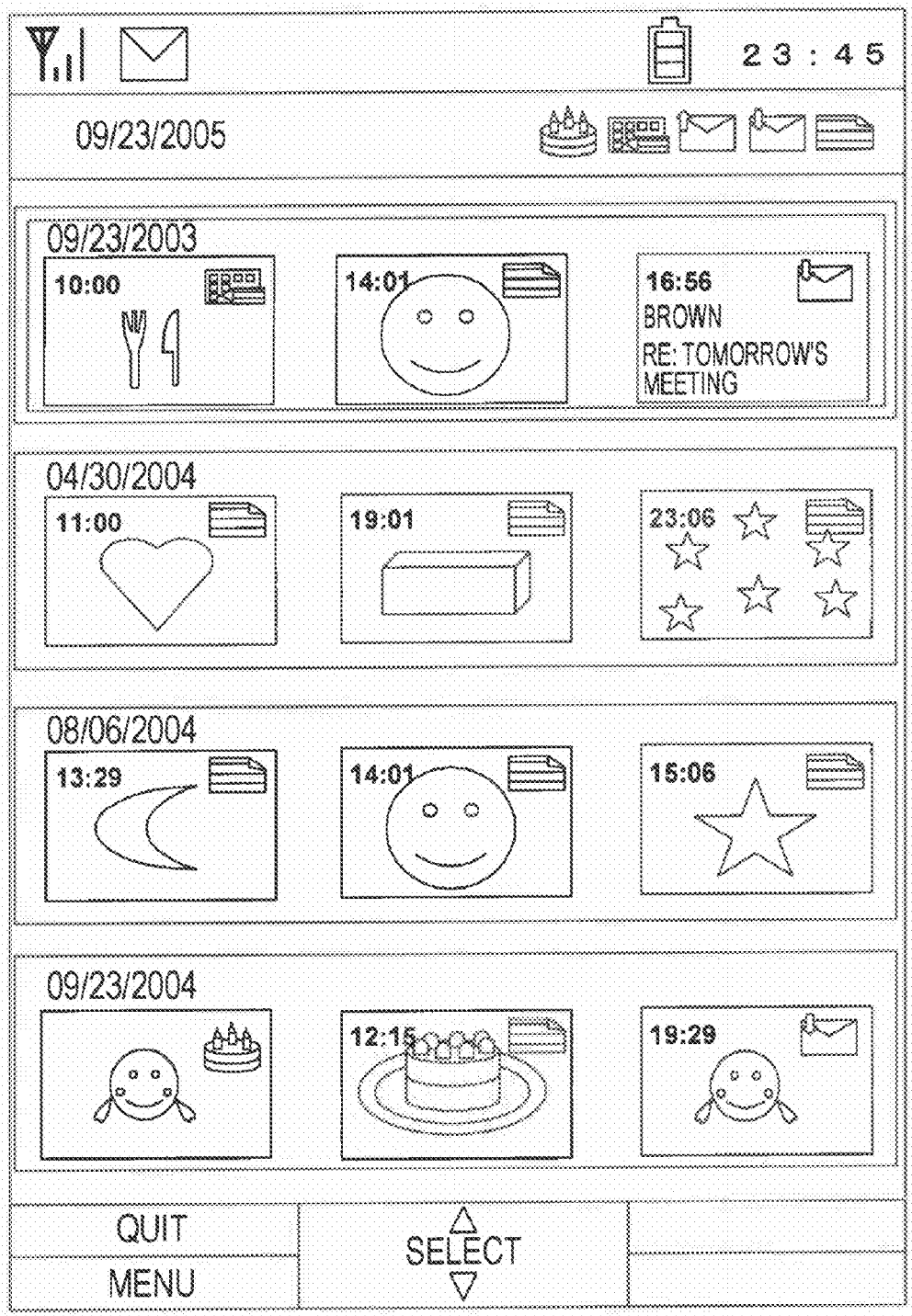
FIG. 22 illustrates a display example of the remembrance list.

In step S82, the controller 12 displays the remembrance list stored on the memory 11 on the display 5. For example, the remembrance list stored on the memory 11 permits a history of four remembrance popup displays to be listed therein. As shown in FIG. 22, the remembrance list stored on the memory 11 lists a history of remembrance popup displays dated Sep. 23, 2003, Apr. 30, 2004, Aug. 6, 2004, and Sep. 23, 2004.

The controller 12 focuses on the latest display in the history of the remembrance list in a default setting. The user can shift the focusing area by pressing the cross key 24, and presses the entry key 25 with the focusing area focusing on a desired display in the history to select the desired display. In step S83, the controller 12 detects the operational status of the entry key 25, thereby determining whether the desired history is selected from the remembrance list. Upon detecting the pressing of the entry key 25, the controller 12 proceeds to step S84. If the pressing of the entry key 25 is not detected, the controller 12 proceeds to step S85.

In step S84, the controller 12 detects the in-focus date in the remembrance list in the history, and displays the deview-format life time calendar with respect to that date on the display 5. The entire process illustrated in the flowchart of FIG. 21 is thus completed.

More specifically, when the pressing of the entry key 25 is detected with the focusing area focusing on Sep. 23, 2003, the controller 12 displays on the display 5 the deview-format life time calendar in the list display screen discussed with reference to FIG. 12. In this case, the controller 12 displays the deview-format life time calendar with each content item on September 23 centered on the display area of the display 5. In this way, the user recognizes the detailed history of display from the remembrance list on the deview-format life time calendar.

When the history is selected from the remembrance list, the deview-format life time calendar in the list display screen corresponding to the date of the selected history is displayed. Alternatively, the deview-format life time calendar in the thumbnail display screen corresponding to the selected history may be displayed (see FIG. 13).

If it is determined in step S83 that the pressing of the entry key 25 is not detected, processing proceeds to step S85. In step S85, the controller 12 determines whether an operation to return the display screen to a previous screen displayed immediately prior to the displaying of the remembrance list is performed. In the cellular phone of one embodiment of the present invention, the controller 12 returns the display screen to the previous screen displayed immediately prior to the displaying of the remembrance list if the pressing of the clear key 32 of FIG. 2A is detected during the displaying of the remembrance list.

In step S85, the controller 12 determines whether the clear key 32 has been pressed, thereby determining whether the operation to return the display screen to the previous screen has been performed. If the controller 12 detects the pressing of the clear key 32, processing proceeds to step S86. The controller 12 displays one of the calendar-format life time calendar and the deview-format life time calendar on the display 5, and completes the entire process illustrated in the flowchart of FIG. 21.

When the pressing of the clear key 32 is not detected in step S85, the controller 12 monitors the pressing of another key other than the clear key 32 in step S87. If none of the keys is pressed, processing returns to step S82. The controller 12 continuously displays the remembrance list. If the controller 12 has detected the pressing of any of the keys, the controller 12 completes the entire process illustrated in the flowchart of FIG. 21 at the detection timing, and performs a process responsive to the pressed key.

In the cellular phone of one embodiment of the present invention, the controller 12 displays a main menu if the third soft key 28 is pressed during the displaying of the remembrance list. If the on-hook key 31 is pressed, the life time calendar application program is quit. In step S87, the controller 12 monitors the pressing of one of the third soft key 28 and the on-hook key 31. At the detection of the pressing of one of the third soft key 28 and the on-hook key 31, the controller 12 completes the process illustrated in the flowchart of FIG. 21. The controller 12 thus controls the displaying of the main menu and the quitting of the life time calendar application program.

The remembrance popup display is displayed with respect to the date one year before the in-focus date or the date one month before the in-focus date. Alternatively, the remembrance popup display may be displayed with reference to the "number of past content items."

Figure 23:
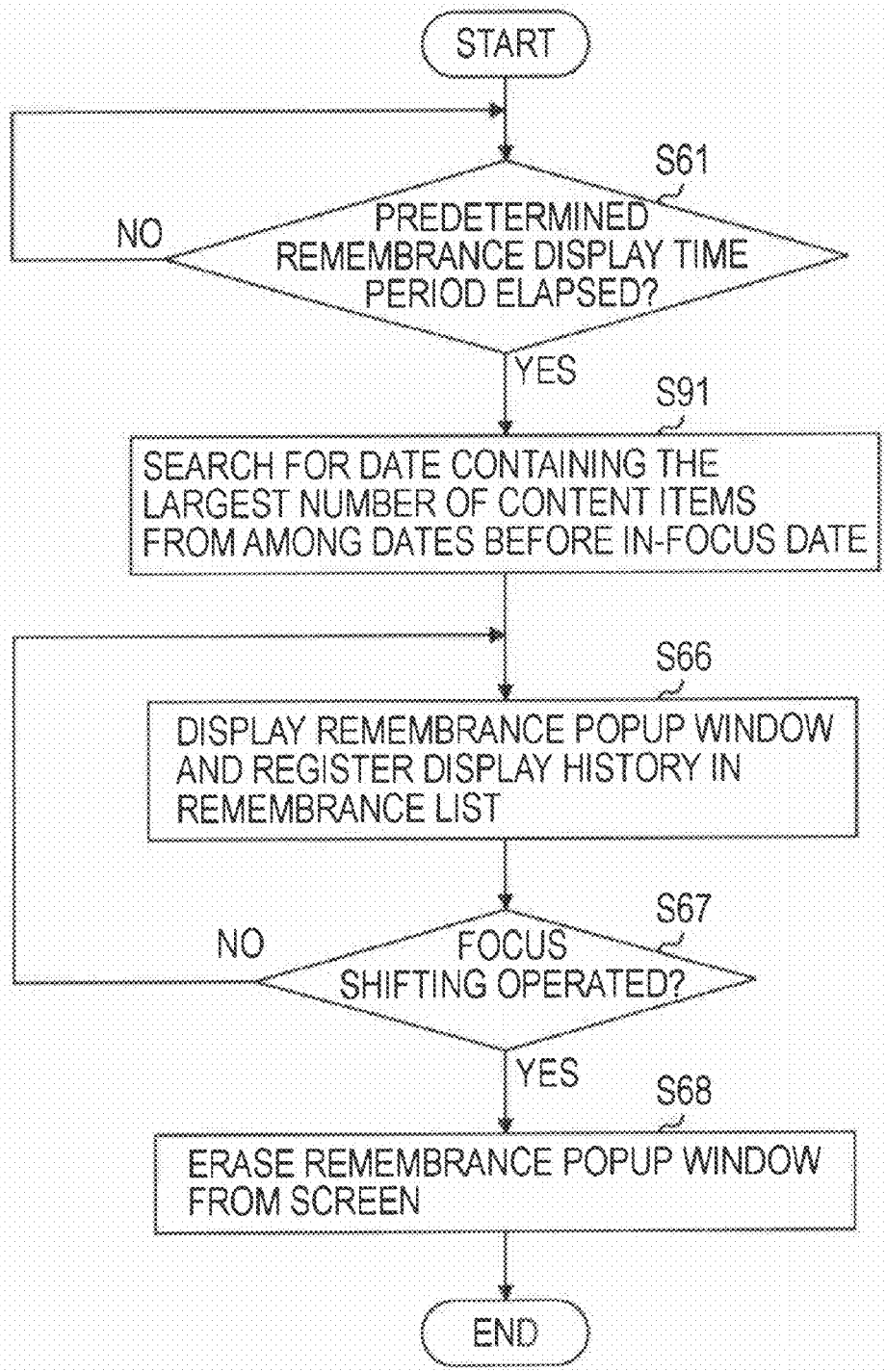
FIG. 23 is a flowchart illustrating a remembrance popup display process based on the number of past content items in the cellular phone in accordance with one embodiment of the present invention.

FIG. 23 is a flowchart illustrating a remembrance popup display process performed with reference to the number of past content items. In FIG. 23, steps identical to those described with reference to FIG. 17 are designated with the same step numbers, and the discussion thereof is omitted herein.

When the start of the focusing area stay-put period in one of the calendar-format life time calendar and the deview-format life time calendar is detected in the flowchart of FIG. 23, the controller 12 monitors the elapse of a predetermined remembrance display time in step S61. At the moment the predetermined remembrance display time has elapsed, the controller 12 proceeds to step S91.

In step S91, the controller 12 detects a content item of a past date having the largest number of content items from among the past dates with respect to the in-focus date based on the time information attached to each content item stored on the memory 11.

More specifically, the focusing area might be currently focusing on Sep. 13, 2005 in one of the calendar-format life time calendar and the deview-format life time calendar. The controller 12 then searches the memory 11 for content items on any date before Sep. 13, 2005. The controller 12 then detects any date before Sep. 13, 2005 having the largest number of content items, and handles the content items on that date as content items to be displayed in the remembrance popup display.

In step S66, the content items on the date having the largest number of content items are displayed in the remembrance popup display until the focusing area shifting is detected in step S67 as previously discussed with reference to the flowchart of FIG. 17.

For example, when the user has traveled or has attended a wedding ceremony, the number of still image content items increases. When business has been talked via e-mail or a plan has been prepared via e-mail, the number protected e-mail content items increases. An increase in the number of content items means that that date is important to the user.

The controller 12 thus detects a date having the largest number of content items before the in-focus date in one of the calendar-format life time calendar and the deview-format life time calendar and displays the content items on that date in the remembrance popup display. The controller 12 thus displays in the remembrance popup display the content on the past date likely to be important to the user.

Figure 24:
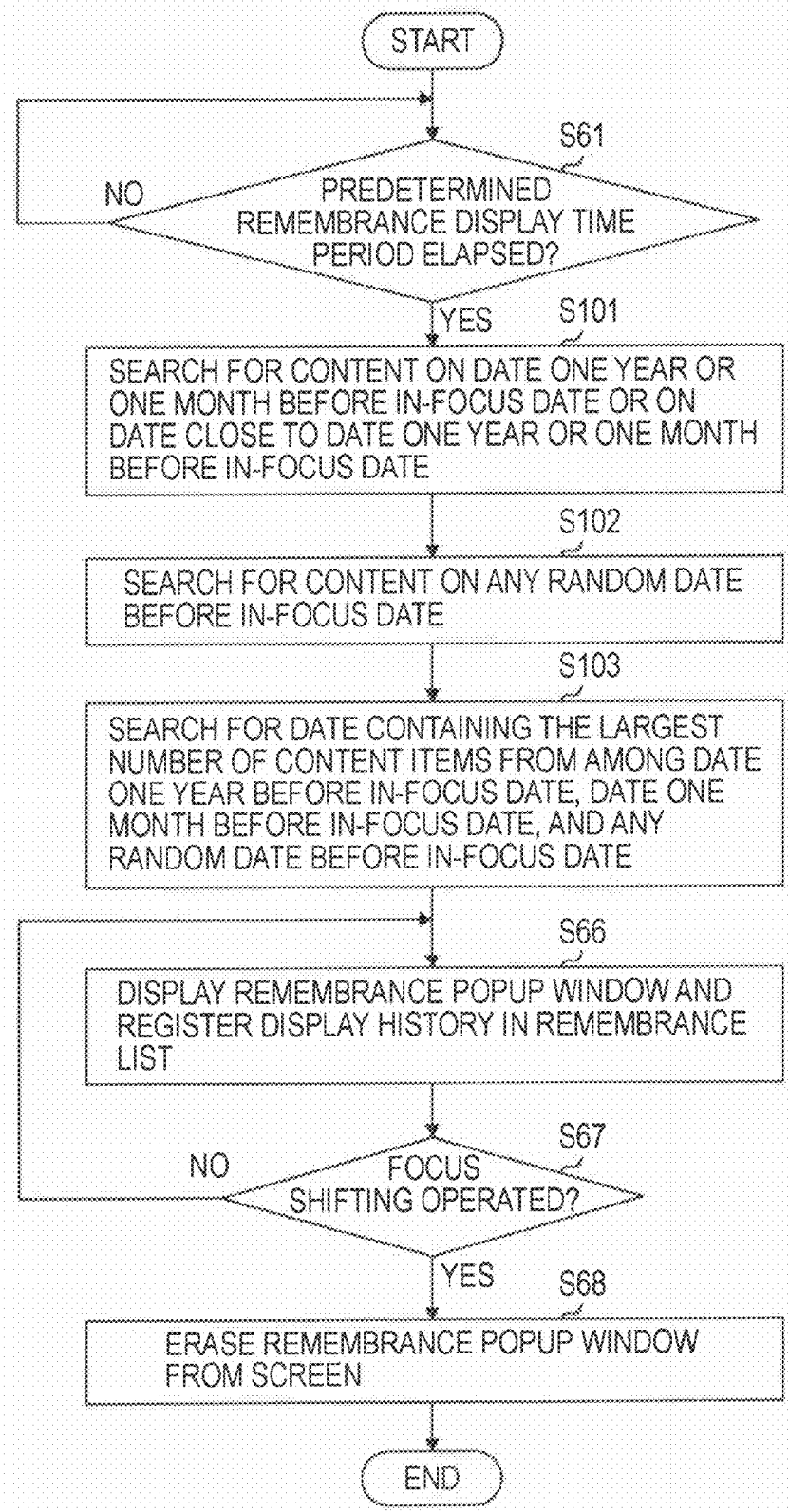
FIG. 24 is a flowchart illustrating the remembrance popup display process based on the number of past content items and past dates in the cellular phone in accordance with one embodiment of the present invention.

The remembrance popup display may be displayed with respect to the "past date" and the "number of past content items." FIG. 24 is a flowchart illustrating the remembrance popup display displayed based on the past date and the number of past content items. In the flowchart of FIG. 24, steps identical to those described with reference to FIG. 17 are designated with the same step numbers, and the discussion thereof is omitted herein.

When the start of the focusing area stay-put period in one of the calendar-format life time calendar and the deview-format life time calendar is detected in the flowchart of FIG. 24, the controller 12 monitors the elapse of a predetermined remembrance display time in step S61. At the moment the predetermined remembrance display time has elapsed, the controller 12 proceeds to step S101.

In step S101, the controller 12 detects a content item on a date one year before the in-focus date (and on a date close to the date one year before the in-focus date) and a content item on a date one month before the in-focus date (and on a date close to the date one month before the in-focus date) in one of the calendar-format life time calendar and the deview-format life time calendar.

In step S102, the controller 12 randomly searches for a date before in-focus date in one of the calendar-format life time calendar and the deview-format life time calendar, and then searches for a content item on that date.

In step S103, the controller 12 searches for a date having the largest number of content items from among the date one year before the in-focus date (and the date close to the date one year before the in-focus date), the date one month before the in-focus date (and the date close to the date one month before the in-focus date) detected in step S101, and the randomly searched date detected in step S102.

In step S66, the controller 12 continuously displays the content items of the date having the largest number of content items until the focusing area shifting operation is detected in step S67 as discussed with reference to the flowchart of FIG. 17.

The user can thus display in the remembrance popup display the content on the past date that could be important to the user, related to the in-focus date in one of the calendar-format life time calendar and the deview-format life time calendar.

The user may select one of the "search by year," the "search by month," and the "random search" in a random fashion or with a predetermined probability, and then display the thus selected content of a predetermined type in the remembrance popup display. Such a remembrance popup display process is illustrated in a flowchart of FIG. 25. In FIG. 15, steps identical to those discussed with reference to the flowchart of FIG. 17 are designated with the same step numbers and the discussion thereof is not repeated herein.

Figure 25:
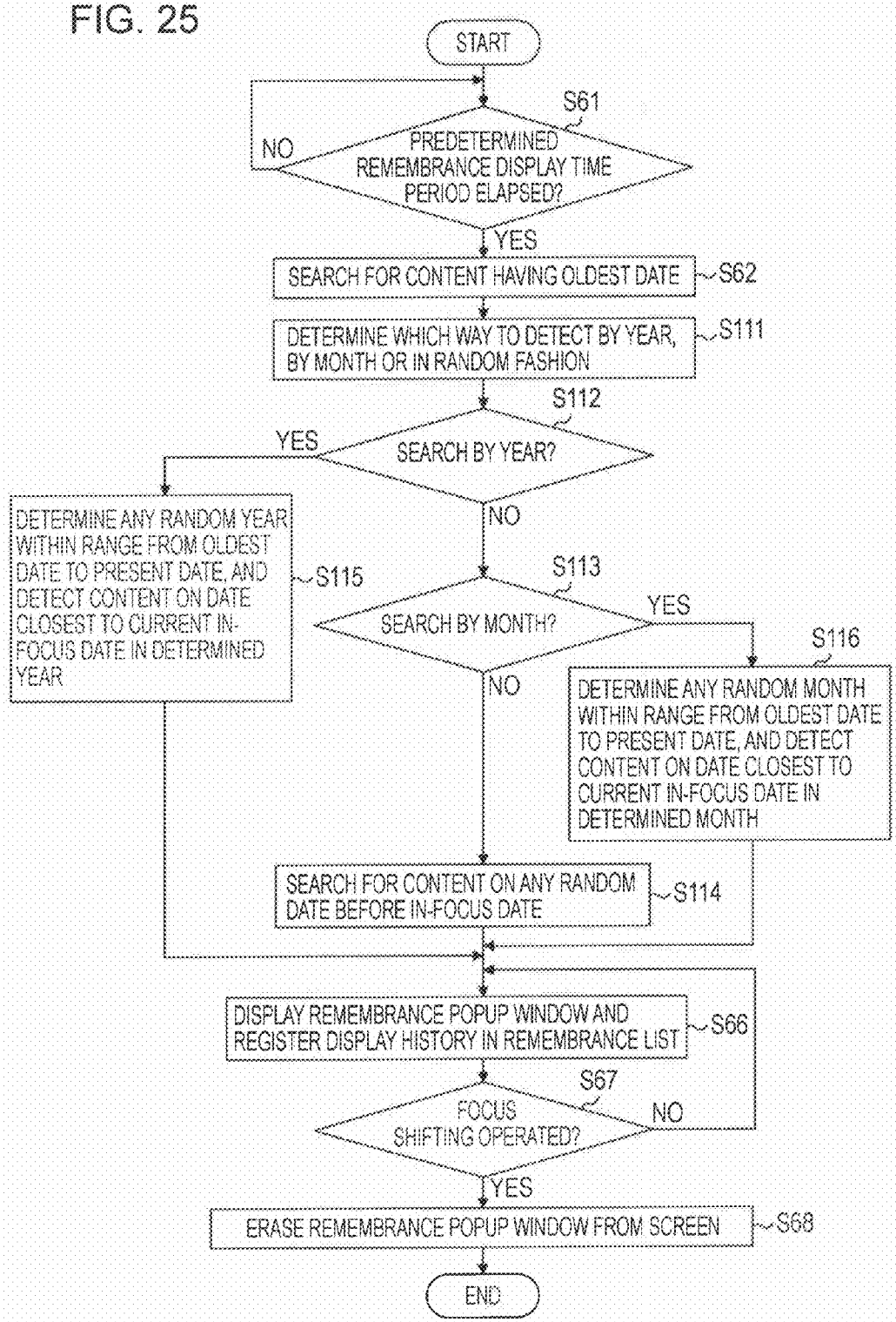
FIG. 25 is a flowchart illustrating the remembrance popup display process in which content items are detected by selecting one of "search by year," "search by month," and "random search" in a random fashion or with a predetermined probability in the cellular phone in accordance with one embodiment of the present invention.

When the stopping of the focusing area shifting is detected with one of the calendar-format life time calendar and the deview-format life time calendar displayed in the flowchart of FIG. 25, the controller 12 detects the elapse of a predetermined remembrance display time in step S61. At the moment the predetermined remembrance display time has elapsed, the controller 12 proceeds to step S62. In step S62, the controller 12 searches for a content item having the oldest date, and then proceeds to step S111.

In step S111, the controller 12 selects one of the search by year, the search by month, and the random search with a predetermined probability. For example, the cellular phone of one embodiment of the present invention provides 33% for the search by year, 33% for the search by month, and 33% for the random search. In other words, the search by year, the search by month, the random search are performed with equal probability.

The search may be prioritized with 60% for the probability of the search by year, 30% for the probability of the search by month, and 10% for the random search. In this case, the probability of the content selection using the search by year becomes highest. Alternatively, the user can set manually the probabilities for the search by year, the search by month, and the random search.

In step S112 or S113, the controller 12 determines whether to perform the search by year or the search by month. If it is determined in step S113 that the search by month is to be performed, processing proceeds to step S115. If it is determined in step S115 that the search by month is to be performed, processing proceeds to step S116. If it is determined that neither the search by year nor the search by month is to be performed, the controller 12 determines to perform the random search, and then proceeds to step S114.

In step S115, the controller 12 determines a year in a random fashion between the oldest date and the present date, and searches for content item on a date closest to an in-focus date as a reference date in one of the calendar-format life time calendar and the deview-format life time calendar of the determined year.

A content item on the date three days older than the reference date and a content item on the date three days younger than the reference data can be detected as the content of the date closest to the reference date. If content items are detected on the dates away by the same number of days in the past and in the future from the reference date in this way, the controller 12 detects the content item on the date away in the past from the reference date as the content item on the date closest to the reference date.

In step S116, the controller 12 determines a month in a random fashion between the date one year before the present date and the present date, and searches for a content item on a date closest to an in-focus date as a reference date in one of the calendar-format life time calendar and the deview-format life time calendar of the determined month.

If content items are detected on the dates away by the same number of days in the past and in the future from the reference date, the controller 12 detects the content item on the date away in the past from the reference date as the content item on the date closest to the reference date.

In step S114, the controller 12 searches for a content item on a past date before an in-focus date in the one of the calendar-format life time calendar and the deview-format life time calendar, and then proceeds to step S66.

The controller 12 displays in the remembrance popup display one of the content item hit in the search by year in step S115, the content item hit in step S116 and the content item hit in the random search, and registers the content item in the history of displayed content items in the remembrance list on the memory 11. The controller 12 continuously displays the remembrance popup display until the focusing area shifting operation is detected.

One of the search by year, the search by month, and the random search is detected in a random fashion or with a predetermined probability. The thus detected content item is displayed in the remembrance popup display. The user can thus enjoy the remembrance popup display with some degree of regularity and randomness at the same time.

Figure 26:
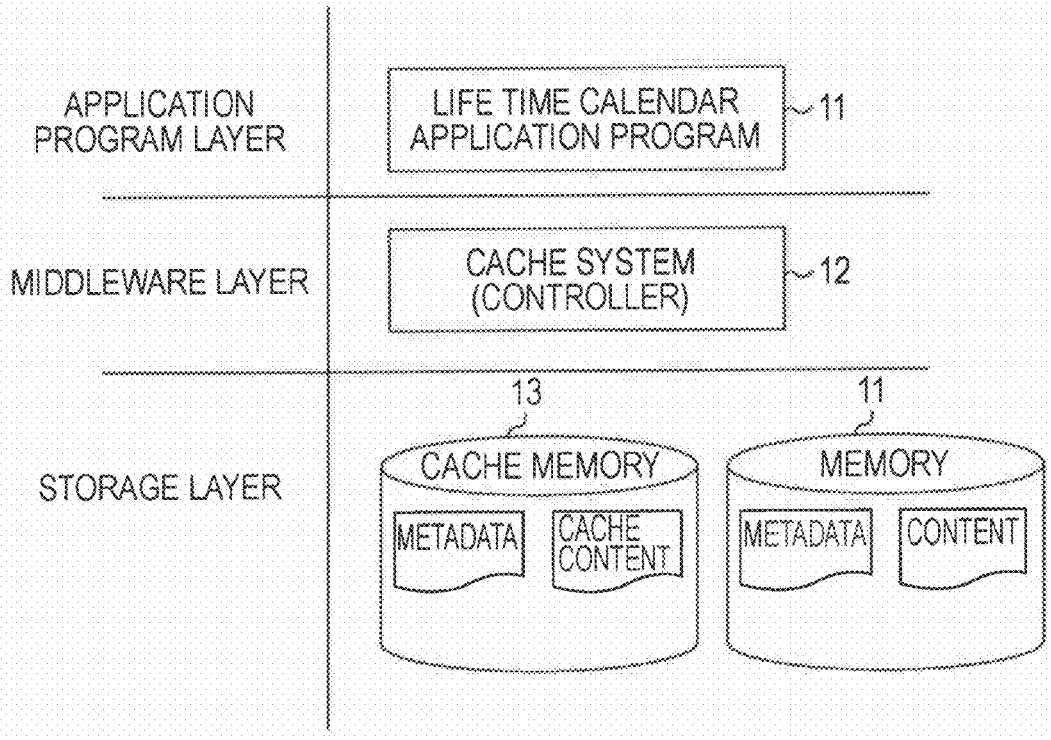
FIG. 26 illustrates a content high-speed reproducing process in the cellular phone in accordance with one embodiment of the present invention.

The user selects a desired content item in the deview-format life time calendar and presses the entry key 25 in the cellular phone of one embodiment of the present invention as described with reference to step S36 in the flowchart of FIG. 11. The controller 12 then starts the application program responsive to the selected content, thereby reproducing the content. FIG. 26 illustrates a configuration of the cellular phone of one embodiment of the present invention for reproducing the content.

When a desired content item is selected from the deview-format life time calendar displayed in accordance with the life time calendar application program at an application program layer, the controller 12 reproduces the selected content from the cache memory 13 at a storage layer in accordance with the cache system at a middleware layer.

The controller 12 operates based on the cache system. The controller 12 thus retrieves from the memory 11 the content having the time information falling with a time range with respect to the date having the content in focus in the deview-format life time calendar and the metadata of the content, and then stores the content and the metadata thereof on the cache memory 13. When an instruction to reproduce the content falling within the time range indicated by the time information is provided, the content cached on the cache memory 13 is reproduced. The content is thus reproduced at a high speed.

Figure 27:
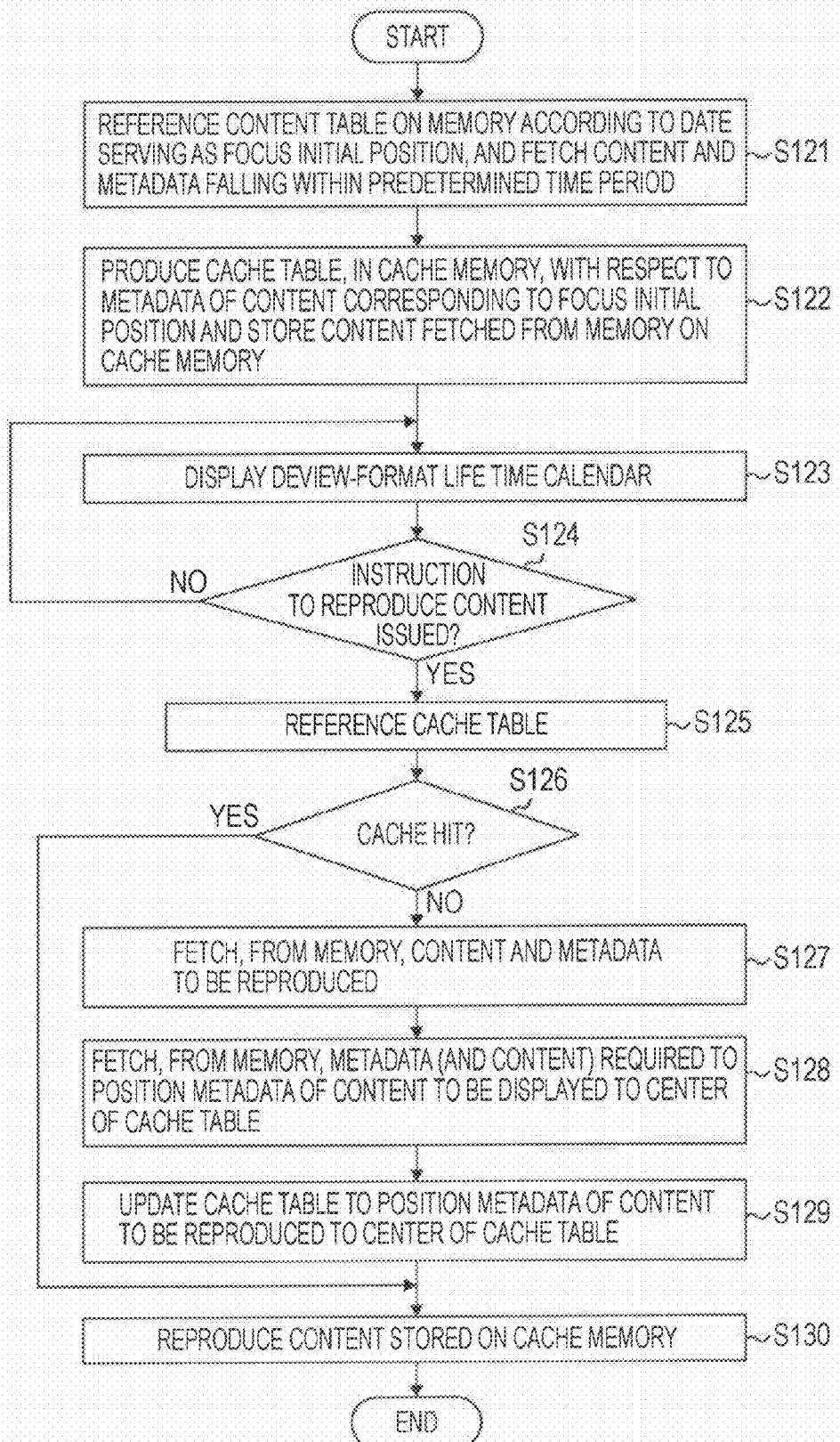
FIG. 27 is a flowchart illustrating a cache process in the cellular phone in accordance with one embodiment of the present invention.

The reproducing process of the content using the cache process is illustrated in a flowchart of FIG. 27. When the entry key 25 is pressed with a desired date selected in the calendar-format life time calendar, the controller 12 displays the deview-format life time calendar. The controller 12 starts the process illustrated in the flowchart of FIG. 27 in accordance with the life time calendar application program at the timing the deview-format life time calendar is displayed.

Figure 28:
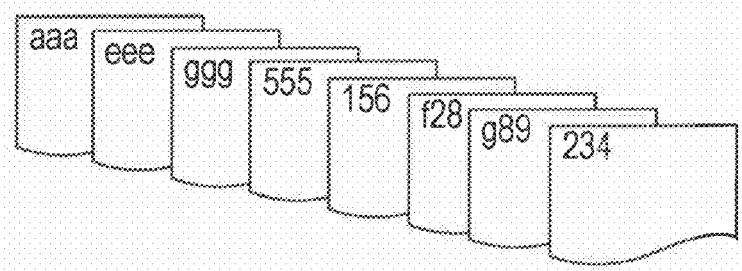
FIG. 28 illustrates an example of a content table arranged on a per content item basis in a memory of the cellular phone in accordance with one embodiment of the present invention.

In step S121, the controller 12 references the content table stored on the memory 11 in accordance with a date serving as an initial position of the focusing area when the deview-format life time calendar is displayed. FIG. 28 illustrates, as an example of the content table, a still image content table from among the tables arranged for respective content. The structure of the content table is described below with reference to the still image content table of FIG. 28. Each content table lists an identification (ID) number of each content item, time information of the content item, a title of the content item, a type of the content item, and a pointer indicating an address of the content item stored on the memory 11.

In step S121, the controller 12 references the content table, thereby fetching from the content table the metadata of each content item corresponding to the date serving as an initial focusing area position, and the content corresponding to the fetched metadata from the memory 11. The controller 12 also fetches from the content table the metadata of a content item on a date within a range of several days before and after the in-focus date and the content corresponding to the fetched metadata from the memory 11. Processing proceeds to step S122.

If the initial focusing area position is Oct. 27, 2005, the controller 12 fetches from each content table the metadata of the content item having the time information dated Oct. 27, 2005, and also fetches the content item corresponding to the fetched metadata from the memory 11. As shown in FIG. 28, the controller 12 fetches from the still image content table the metadata of a still image content item having an ID number "S-001" and fetches the still image content having a title "eee" (the still image content having time information Oct. 27, 2005) from the memory 11.

In step S122, the controller 12 produces on the cache memory 13 a cache table having the metadata of the content corresponding to the focusing area initial position while storing each content item fetched from the memory 11 onto the cache memory 13. Processing proceeds to step S123.

Figure 29:
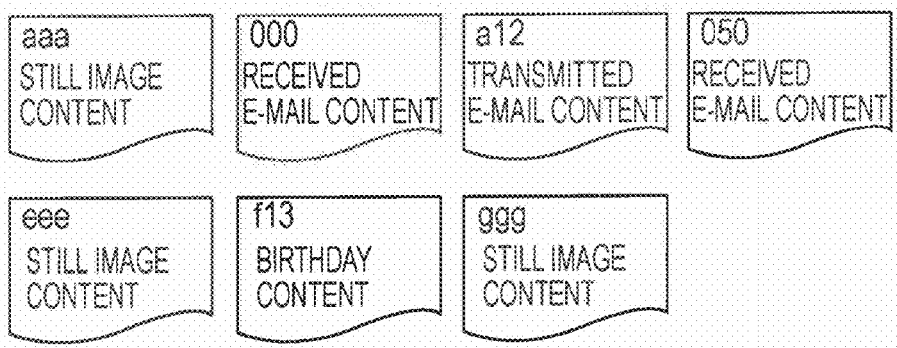
FIG. 29 illustrates an example of a cache table arranged in a cache memory of the cellular phone in accordance with one embodiment of the present invention.

FIG. 29 illustrates an example of a cache table produced on the cache memory 13.

As shown in FIG. 29, the focusing area initial position is Oct. 27, 2005. The controller 12 fetches metadata of a transmitted e-mail content item having an ID number "SD-005" from a transmitted e-mail content table on the memory 11, metadata of a received e-mail content item having an ID number "JD-004" from a received e-mail content table on the memory 11, metadata of a still image content item having an ID number "S-001" from a still image content table on the memory 11, and stores the metadata of these content items dated Oct. 27, 2005 on the cache table.

As shown in FIG. 29, the controller 12 fetches metadata of a still image content item having an ID number "S-000" and time information dated on October 26, one day before Oct. 27, 2005, and metadata of a received e-mail content item having an ID number "JD-003" and time information dated October 26 from a received e-mail content table on the memory 11. The controller 12 arranges the metadata of each content item having the time information dated Oct. 26, 2005 on top of (prior to) the metadata of the content items dated Oct. 27, 2005 in the center of the cache table.

As shown in FIG. 29, the controller 12 fetches, from a birthday content table on the memory 11, metadata of a birthday content item having an ID number "T-005" and time information dated October 28 one day after Oct. 27, 2005, and arranges the fetched metadata below (subsequent to) the metadata having time information dated Oct. 27, 2005 in the center of the cache table.

As shown in FIG. 29, the controller 12 fetches, from a still image content table on the memory 11, metadata of a still image content item having an ID number "S-002" and time information dated October 29, two days younger than Oct. 27, 2005, and then arranges the fetched metadata of the still image content item below (subsequent to) metadata of a birthday content item having time information dated Oct. 28, 2005.

In other words, in step S122, the controller 12 fetches the metadata of the content item corresponding to the in-focus date, and the metadata of the content item having the time information several days older or younger than the in-focus date, and arranges these pieces of metadata in the cache table in the order specified by the time information. In this way, the cache table is arranged with the metadata of the content item with respect to the in-focus date centered therein.

The controller 12 fetches the content item together with the metadata thereof from the memory 11 and then stores the content item on the cache memory 13. As shown in FIG. 29, the controller 12 fetches from the memory 11 a still image content item having a title "aaa," a received e-mail content item having a title "000," a transmitted e-mail content item having a title "a12," a received e-mail content item having a tile "050," a still image content item having a tile "eee," a birthday content item having a tile "f13," and a still image content item having a title "ggg" and then stores the fetched content items on the cache memory 13.

As shown in FIG. 29, the cache table lists an identification (ID) number of each content item, time information of the content item, a title of the content item, a type of the content item, and a pointer indicating an address of the content item stored on the cache memory 13.

Upon storing each content item and the metadata of the content item on the cache memory 13, the controller 12 proceeds to step S123. The controller 12 displays on the display 5 the deview-format life time calendar discussed with reference to FIG. 12 (or FIG. 13) while focusing on a content item of a predetermined date. The user reproduces a predetermined content item by pressing the entry key 25 with the focusing area focusing on the predetermined content item. In step S124, the controller 12 determines whether an instruction to reproduce the content is provided (whether the entry key 25 has been pressed). If the controller 12 detects the instruction to reproduce the content in step S123, processing proceeds to step S125.

In step S125, the controller 12 references the cache table on the cache memory 13 in accordance with the metadata of the content that is to be reproduced in the deview-format life time calendar. In step S126, the controller 12 determines whether any content item is hit. If it is determined in step S126 that any content item is hit, processing proceeds to step S130. The controller 12 reads the content item stored on the cache memory 13 (the content specified to be reproduced in accordance with the instruction), and reproduces the content item in accordance with the application program for the content.

More specifically, the instruction to reproduce a still image content item dated Oct. 27, 2005 might be issued in the deview-format life time calendar. In response to the instruction, the controller 12 searches for the metadata of the still image content item to be reproduced, and then checks the metadata against the metadata stored in the cache table. The still image content item to be reproduced may now be the one having an ID number "S-001." As shown in FIG. 29, the cache table lists the metadata of the still image content item having the time information dated Oct. 27, 2005, the ID number "S-001," and the title "eee." The cache table stores a storage position (address=pointer to the cache content) of the still image content item corresponding to the metadata stored on the cache memory 13.

In accordance with the pointer to the cache content, the controller 12 reads the still image content item having the ID number "S-001" and the title "eee" stored on the cache memory 13, and displays the still image content item on the display 5 in accordance with the viewer function of the camera control program.

If it is determined in step S126 that the cache memory 13 is mishit, i.e., if the metadata of the content to be reproduced fails to match any of the metadata in the cache table, the controller 12 proceeds to step S127.

For example, the metadata of the content to be reproduced may fail to match any of the metadata stored in the cache table in the case discussed below. As shown in FIG. 29, the user shifts the focusing area in the deview-format life time calendar to November 1, having no metadata in the cache table, and issues an instruction requesting a reproducing process. In such a case, the cache table lists no metadata matching the metadata of the content requested to be reproduced. The controller 12 then mishits and then proceeds to step S127. The cache table is updated in steps S127 and S128.

In step S127, the controller 12 fetches from the memory 11 the content to be reproduced and also fetches, from the content table for the content stored on the memory 11, the metadata of the content. Processing proceeds to step S128.

In step S128, the controller 12 fetches from the memory 11 the metadata of the content (and the content) required to place the metadata of the content to be reproduced in the center of the cache table, and proceeds to step S129.

In step S129, the controller 12 reorganizes the cache table having the metadata of the reproducing content arranged in the center thereof, and proceeds to step S130. In step S130, the controller 12 reproduces the reproducing content, fetched from the memory 11, in accordance with the application program of the content. The entire process illustrated in the flowchart of FIG. 27 is thus completed.

FIG. 30A illustrates an example of a pre-update cache table, and FIG. 30B illustrates an example of an updated cache table. As shown in FIG. 30A, the pre-update cache table lists the metadata of content items for October 26 through Oct. 29, 2005. If an instruction to reproduce a still image content item dated Nov. 1, 2005 is input in the deview-format life time calendar, the metadata of the still image content item dated Nov. 1, 2005 is not recorded in the cache table, and the still image content item dated November 1 is naturally not recorded on the cache memory 13. The controller 12 fetches from the memory 11 the still image content item and the metadata thereof dated November 1 (step S127).

The controller 12 then fetches from the memory 11 metadata of a content item and the content item required to place the metadata of the still image content item dated November 1.

In the updated cache table shown in FIG. 29B, the metadata of the still image content item dated November 1 is placed in the center of the cache table. Three storage areas for three pieces of metadata are provided for metadata on dates prior to November 1. The controller 12 lists the metadata of the still image content item dated Oct. 27, 2005 prior to November 1 having the ID "S-001" and the title "eee," the metadata of the birthday content item dated Oct. 28, 2005 having the title "f13," and the metadata of the still image content item dated Oct. 29, 2005 having the ID number "S-002" and the title "ggg" in the order of dates.

The controller 12 places the metadata of the still image content dated November 1 in the center of the cache table. The controller 12 selects three pieces of metadata on the dates closest to November 1, out of the metadata stored in the cache table before updating, and arranges, in the order of dates, the three pieces of metadata above (prior to) the metadata of the still image content item dated November 1 arranged in the center of the cache table. The controller 12 deletes all the metadata other than the selected metadata and all the content of the metadata other than the selected metadata, out of the metadata and the content stored in the cache table before updating.

This deletion process causes storage empty areas for three pieces of metadata after November 1 serving as the center of the cache table. By referencing the content table of each content item stored on the memory 11, the controller 12 fetches the metadata in the order of proximity to November 1 out of the metadata on the dates close to November 1 (step S128). The controller 12 arranges the fetched metadata below (subsequent to) the metadata of the still image content item dated November 1 serving as the center of the cache table (step S129).

More specifically, the content table of the still image content items of FIG. 28 shows the metadata dated November 3 through November 5 (metadata of ID numbers "S-004" through "S-007") as the metadata on the close dates after November 1. Since three metadata storage areas are available, the controller 12 fetches three still image content items dated November 3 having ID numbers "S-004" through "S-006" and arranged the fetched items in the cache table.

Upon fetching three pieces of metadata for the three blank area, the controller 12 fetches the still image content items corresponding to the fetched metadata from the memory 11, and stores the fetched content items on the cache memory 13.

The update process of the cache table is summarized as below. If the metadata of the content item to be reproduced in response to the reproducing instruction is not present in the cache table, the cache table is reorganized so that units of metadata are arranged in the date order with the metadata of the content item to be reproduced centered in the cache table. The content items corresponding to the units of metadata stored in the reorganized cache table are also re-stored on the cache memory 13.

Content items on the date close to the date having the content to be reproduced and metadata of the content items are also cached together with the content items to be reproduced and the metadata thereof on the cache memory 13.

The metadata of each content item is arranged in accordance with the time information of the content item in the life time calendar. The metadata of another content item is thus arranged adjacent to the metadata of the target content item to be reproduced. It is likely that another content item that is expected to be reproduced next in response to a reproducing instruction is selected from among metadata of content items displayed adjacent to the current target content item.

The content items on the date close to the date having the current reproducing target content item and the metadata thereof are thus cached together with the current reproducing target content item and the metadata thereof. This arrangement allows a content item likely to be specified by a next reproducing instruction and metadata thereof to be stored on the cache memory 13 for a next possible reproducing process. If an instruction to reproduce the content item cached in the cache memory 13 is issued (cache hit), that content item can reproduced at a high speed.

The cellular phone of embodiments of the present invention searches for content items falling within the same time range based on the time information contained in a variety of content items different in type, and then displays, in a time-series fashion, information relating to the content items falling within the same time range. In other words, the cellular phone displays information, such as icons and thumbnail images, relating to the content items having the time information indicating that the content items fall within the time range of each date, in the life time calendar. Each life time calendar is partitioned by the time range of date.

Content items of different types are displayed in groups on a per date basis in the life time calendar. The user can thus recognize at a glance the content items different in type within a long time range, such as one month or one year. The user can easily and quickly searches for a desired content item from among a plurality of content items different in type.

Since content items different in type can be displayed in groups on a per date basis in the life time calendar, the user may recall a then friend of the user's from a thumbnail image of a still image content item or an e-mail content item transmitted or received. The recall of such a past event may serve as a trigger to a subsequent action to the friend again, such as sending an e-mail.

The content items are automatically sorted according to the time information of the content items and then displayed in the life time calendar. The user simply performs standard operations, such as transmitting an e-mail or picture taking using the camera 8, and is free from any particular operation and any particular care. The content items are automatically displayed in the life time calendar.

Since the content items different in type are collectively displayed on a per date basis, the user can use the life time calendar as an operation history or a diary.

If the still image of a user's face is registered in one of the telephone book and the personal information registration box with one of a transmitted e-mail content item, a received e-mail content item and a birthday content item displayed in the deview-format life time calendar, the thumbnail image of the still image is displayed in the deview-format life time calendar. The user can thus easily recognize a person as a transmission source or destination of an e-mail or a person who is going to have his or her birthday.

Since information relating to the content items to be displayed in the life time calendar is set beforehand in accordance with the display setting and the filter setting, only information relating to a desired content item can be displayed in the life time calendar. The cellular phone can thus allow only the content items of the type desired by the user to be displayed in the life time calendar. The user can easily and quickly search for the desired content.

The cellular phone displays, in the deview-format life time calendar in the list display screen, the content using text information, icons, and thumbnail images corresponding to the content, thereby allowing the user to recognize the content of each content item. The cellular phone displays, in the deview-format life time calendar in the thumbnail display screen, mainly icons and thumbnail images corresponding to the content, thereby allowing the user to recognize a number of content items at a time.

In the deview-format life time calendar, any date having no content is eliminated. In other words, the content items are displayed with dates having respective content items adjacent to each other. In this way, more content items are displayed in the deview-format life time calendar.

A display area of a date having a plurality of still image content items is displayed in the calendar-format life time calendar. One still image content item is selected from among the still image content items in a random fashion, and the selected still image content item is displayed on the display area. At regular intervals, for example, every 3 hours, 6 hours, or 12 hours, a still image content item other than the still image content item of the currently displayed thumbnail image is selected from among the plurality of still image content items and the thumbnail image of the selected still image content item is displayed on the display area of the date. In this way, the thumbnail image is updated on the display area of the date having the plurality of still image content items in the calendar-format life time calendar. Upon viewing the calendar-format life time calendar every predetermined time, the user can recognize a new thumbnail image each time.

If the focusing area continuously focuses on the display area of a date having a plurality of still image content items to be displayed in the calendar-format life time calendar for 3 seconds or longer, the thumbnail image of the still image content item displayed on the display area of the date is updated to the thumbnail image of a new still image content item throughout the focusing period. In this way, the thumbnail images of the still image content items corresponding to the in-focus date are successively updated and displayed. By simply keeping focusing on the display area of the desired date, the user can view all still image content items corresponding to that date.

By shifting the focusing area to the year index, to the month index, or to the day index, the content items are switched by year, by month, or by day. A desired content item is easily and quickly searched from among a great deal of content items stored by year, by month, or by day.

If the display area of a date having no content is specified in the calendar-format life time calendar to switch to the deview-format life time calendar, a newly produced schedule content for specifying a registration of a new schedule is displayed on the display area of the date specified in the deview-format life time calendar. By specifying the date having no content, the user can easily register a new schedule.

When the cellular phone of embodiments of the present invention detects the focusing area stay-put period longer than a predetermined time in one of the calendar-format life time calendar and the deview-format life time calendar, the controller 12 detects a content item corresponding to a past in-focus date by year, by month, or in a random fashion. The controller 12 displays the detected content item on one of the calendar-format life time calendar and the deview-format life time calendar on a superimposed fashion.

When one of the calendar-format life time calendar and the deview-format life time calendar is displayed, the present or future date tends to draw the user's attention. The remembrance popup display function displays content items one year before or one month before, thereby helping the user to pay attention to a past date as well. The user can recall past remembrance forgotten with time, thereby recognizing overlooked past content items with new light.

The remembrance popup display, which is displayed when the stopping of the focusing area shifting is detected, does not impede the user operation. Since the remembrance popup display is automatically appears when the focusing area stayput state is detected, it is not necessary for the user to perform any particular operation.

When there is a plurality of content items to be displayed at a time, a different content item is displayed each time the remembrance popup display is displayed. The user has more chance to recognize the past content item or new content item.

The content items are displayed in the remembrance popup display function with the following priority order:
1. the still image content photographed by the camera 8,
2. one of the received e-mail content and transmitted e-mail content protected,
3. the schedule content,
4. the still image content downloaded via a network, and
5. one of the received e-mail content and transmitted e-mail content unprotected. A content item that is likely to help the user to recall is displayed in the remembrance popup display with priority. Useful information is thus displayed.

Information relating to the content item displayed in the remembrance popup display is registered in the remembrance list as a history. To learn the detailed content items listed in the remembrance list, the user simply selects the date corresponding to the content of interest from the remembrance list. The deview-format life time calendar corresponding to the date having the content displayed in the remembrance popup display is displayed. The user recognizes the detail of the content displayed in the remembrance popup display in the deview-format life time calendar.

The cellular phone of embodiments of the present invention caches on the cache memory 13 the content item specified as a target content item to be reproduced and the metadata of the content item together with the content item the metadata thereof on dates close to the date having the target content item. Since the metadata of the content items is displayed in the order specified in the time information of each content item, the metadata of the target content item is displayed with the metadata of the other content items close thereto. Another content item expected to be specified as a next content item to be reproduced is likely to be selected from the other content items arranged close to the current target content item.

Content items on the date close to the date having the content to be reproduced and metadata of the content items are also cached together with the content items to be reproduced and the metadata thereof on the cache memory 13. The content item likely to be specified as a next target reproducing content item and the metadata thereof are stored on the cache memory 13 for possible next instruction. If an instruction to reproduce the content item cached in the cache memory 13 is issued (cache hit), that content item can reproduced at a high speed.

The metadata of the content items is arranged and displayed in the life time calendar in accordance with the time information of each content item. The content item and the metadata thereof on a date close to the date having the content item specified as a target reproducing content item from the life time calendar are cached on the cache memory 13. The cache memory 13 is effectively used.

In the above discussion, the present invention is applied to the cellular phone. The present invention may be applicable to any type of apparatuses as long as the apparatuses handle a plurality of content items different in type. For example, the present invention is applicable to a personal handy phone (PHS) system, a personal digital assistant (PDA), a notebook personal computer, a desk-top personal computer, a mobile gaming machine, etc. The above-described advantages are provided in any of these apparatuses.

Figure 31:
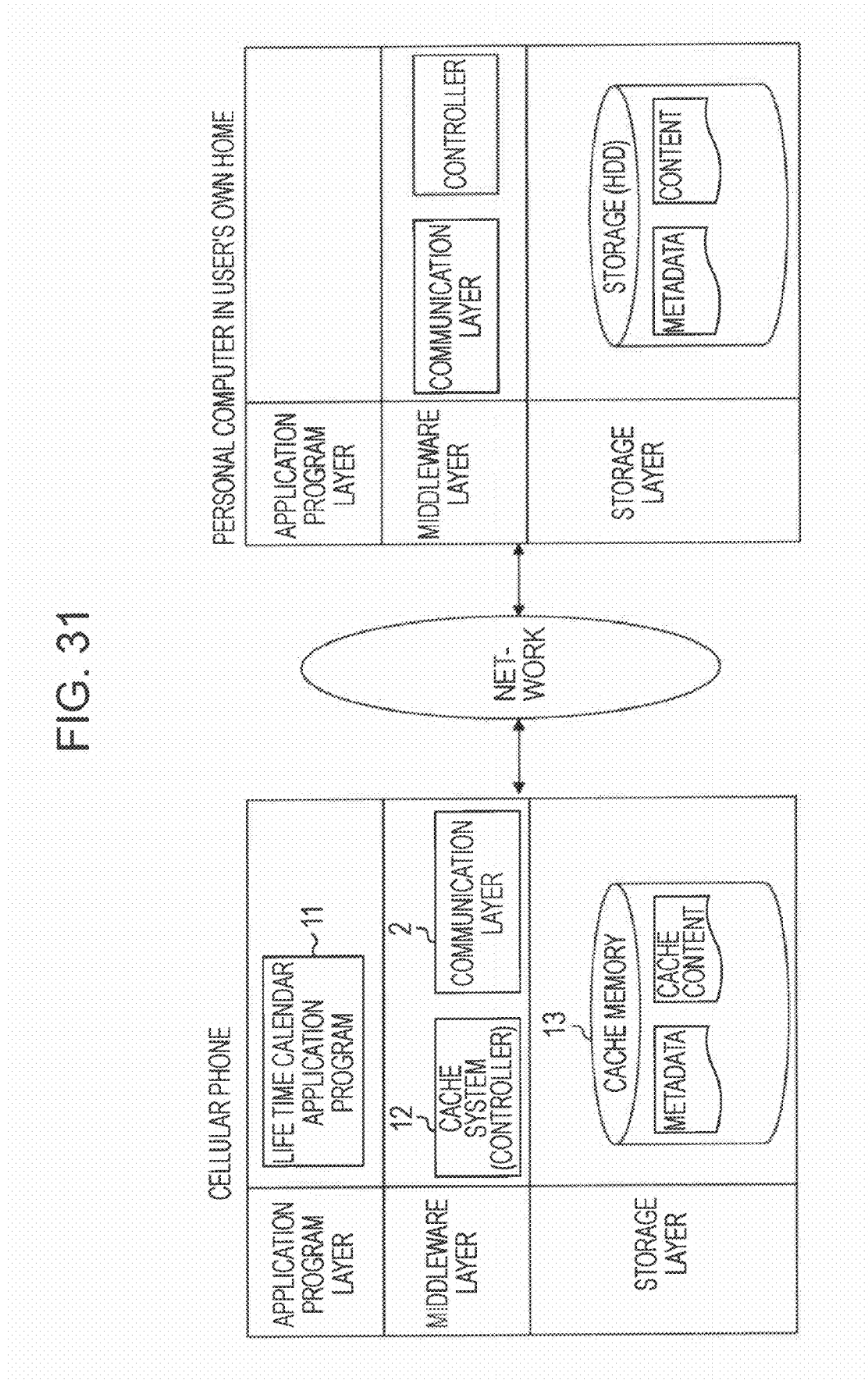
FIG. 31 illustrates another cache process in the cellular phone in accordance with one embodiment of the present invention.

In accordance with the above-described embodiments, the content item and the metadata fetched from the memory 11 in the cellular phone are cached on the cache memory 13. As shown in FIG. 31, a content item and metadata thereof fetched from an external memory may also be cached on the cache memory 13.

As shown in FIG. 31, the external memory is a hard disk drive (HDD) arranged in a home personal computer. An instruction to reproduce a content item is issued from the deview-format life time calendar, and the controller 12 in the cellular phone communicates with the personal computer at the user's home via the communication unit 2 (communication layer) and a predetermined network such as the Internet or a communication network of a telecommunications firm of the cellular phone. The controller 12 fetches the content item to be reproduced from the HDD in the personal computer.

A moving image content item containing a recorded television program is typically large in data size, and consumes a vast amount of storage capacity of the memory 11. As shown in FIG. 31, the moving image content item is stored on the personal computer at the user's home, and is acquired as necessary from the personal computer for reproducing. This arrangement prevents the vast amount of date from consuming the storage capacity of the memory 11, and the above-described advantages are still achieved.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for processing information, comprising:
   a memory configured to store a plurality of content items and a metadata element associated with each of the content items, the metadata element including time information;
   a processor configured to:
      fetch, from the memory, a first content item and a first metadata element including first time information associated with the first content item;
      store the first content item and the first metadata element at a cache memory;
      fetch metadata elements indicating time information immediately prior to and subsequent to the first time information of the first metadata element; and
      store the metadata elements and the content items associated with the metadata elements at the cache memory;
   a user interface configured to:
      display the metadata elements of the content items from the cache memory, the metadata elements being arranged in accordance with time information; and
      receive an input selecting one of the displayed metadata elements; and
   the processor configured to fetch, from the cache memory, a content item corresponding to the selected metadata element.

2. The apparatus according to claim 1, further comprising:
   a communication unit configured to communicate via a network, wherein content items and metadata elements to be stored at the cache memory by the processor are stored at a communication apparatus connected to the network, and the processor fetches the content items and the metadata elements via the communication unit from the communication apparatus connected to the network.

3. The apparatus according to claim 1, wherein the displayed metadata elements of the content items from the cache memory are thumbnail images corresponding to the content items.

4. The apparatus according to claim 3, wherein the user interface is configured to receive an input selecting a displayed thumbnail image as the input selecting one of the displayed metadata elements.

5. The apparatus according to claim 1, wherein the content processor is configured to perform a process responsive to the fetched content item.

6. The apparatus according to claim 5, wherein the process includes launching an application.

7. A method of processing information, comprising:
storing, at a memory, a plurality of content items and a metadata element associated with each of the content items, the metadata element including time information;
fetching, from the memory, a first content item and a first metadata element including first time information associated with the first content item;
storing the first content item and the first metadata element at a cache memory;
fetching metadata elements indicating time information immediately prior to and subsequent to the first time information of the first metadata element;
storing the metadata elements and the content items associated with the metadata elements at the cache memory;
displaying, at a user interface, the metadata elements of the content items from the cache memory, the metadata elements being arranged in accordance with time information;
receiving, at the user interface, an input selecting one of the displayed metadata elements; and
fetching a content item corresponding to the selected metadata element.

8. The method according to claim 7, wherein the displayed metadata elements of the content items from the cache memory are thumbnail images corresponding to the content items.

9. The method according to claim 8, wherein the receiving an input selecting one of the displayed metadata elements includes receiving an input selecting a displayed thumbnail image.

10. The method according to claim 7, further comprising:
performing a process responsive to the fetched content item.

11. The method according to claim 10, wherein the process includes launching an application.

12. A non-transitory computer-readable medium including computer program code, which when executed by the computer, causes the computer to perform a method of processing information comprising:
storing, at a memory, a plurality of content items and a metadata element associated with each of the content items, the metadata element including time information;
fetching, from the memory, a first content item and a first metadata element including first time information associated with the first content item;
storing the first content item and the first metadata element at a cache memory;
fetching metadata elements indicating time information immediately prior to and subsequent to the first time information of the first metadata element;
storing the metadata elements and the content items associated with the metadata elements at the cache memory;
displaying the metadata elements of the content items from the cache memory, the metadata elements being arranged in accordance with time information;
receiving an input selecting one of the displayed metadata elements; and
fetching a content item corresponding to the selected metadata element.

13. The non-transitory computer-readable medium according to claim 12, wherein the displayed metadata elements of the content items from the cache memory are thumbnail images corresponding to the content items.

14. The non-transitory computer-readable medium according to claim 13, wherein the receiving an input selecting one of the displayed metadata elements includes receiving an input selecting a displayed thumbnail image.

15. The non-transitory computer-readable medium according to claim 12, further comprising:
performing a process responsive to the fetched content item.

16. The non-transitory computer-readable medium according to claim 15, wherein the process includes launching an application.

17. An apparatus for processing information, comprising:
a first memory configured to store a plurality of content items and a metadata element associated with each of the content items, the metadata element including time information;
means for fetching, from the first memory, a first content item and a first metadata element including first time information associated with the first content item;
means for storing the first content item and the first metadata element at a second memory;
means for fetching metadata elements indicating time information immediately prior to and subsequent to the first time information of the first metadata element;
means for storing the metadata elements and the content items associated with the metadata elements at the second memory;
means for displaying the metadata elements of the content items from the second memory, the metadata elements being arranged in accordance with time information;
means for receiving an input selecting one of the displayed metadata elements; and
means for fetching a content item corresponding to the selected metadata element.

18. An apparatus for processing information, comprising:
a first memory configured to store a plurality of content items and a metadata element associated with each of the content items, the metadata element including time information;
a processor configured to:
fetch, from the first memory, a first content item and a first metadata element including first time information associated with the first content item;
store the first content item and the first metadata element at a second memory;
fetch metadata elements indicating time information immediately prior to and subsequent to the first time information of the first metadata element; and store the metadata elements and the content items associated with the metadata elements at the second memory;
a user interface configured to:
    display the metadata elements of the content items from the second memory, the metadata elements being arranged in accordance with time information; and
    receive an input selecting one of the displayed metadata elements; and
the processor configured to fetch a content item corresponding to the selected metadata element.

* * * * *